US012700649B2

(12) United States Patent
    Kawanishi et al.

(10) Patent No.: US 12,700,649 B2
(45) Date of Patent: Aug. 4, 2026

(54) SINGLE CONDUCTOR LAYER CELL-TO-CELL INTERCONNECT FOR ELECTRIC VEHICLE POWER SUPPLY OR OTHER POWER SUPPLY

(71) Applicant: Canoo Technologies Inc., Torrance, CA (US)

(72) Inventors: Kenneth Kawanishi, Whittier, CA (US); Deborah A. Bourke, San Diego, CA (US); Seth Lewis, Monrovia, CA (US); Cody J. Rhebergen, Lomita, CA (US); Berton Vite, Huntington Beach, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 856 days.

(21) Appl. No.: 17/812,939

(22) Filed: Jul. 15, 2022

(65) Prior Publication Data

US 2023/0048671 A1    Feb. 16, 2023

Related U.S. Application Data

(60) Provisional application No. 63/233,134, filed on Aug. 13, 2021.

(51) Int. Cl.
    *H01M 50/507* (2021.01)
    *B60L 50/64* (2019.01)
    (Continued)

(52) U.S. Cl.
    CPC ........... *H01M 50/507* (2021.01); *B60L 50/64* (2019.02); *H01M 50/213* (2021.01);
    (Continued)

(58) Field of Classification Search
    CPC .... H01M 50/50; H01M 50/64; H01M 50/507; H01M 50/502; H01M 50/509; H01M 50/213
    See application file for complete search history.

(56) References Cited

U.S. PATENT DOCUMENTS

| 8,852,772 B2 | 10/2014 | McDonald |
| 9,065,103 B2 | 6/2015 | Straubel et al. |
| | (Continued) | |

FOREIGN PATENT DOCUMENTS

| CN | 105990620 A | 10/2016 |
| JP | 2015053205 A | 3/2015 |
| | (Continued) | |

OTHER PUBLICATIONS

International Search Report and Written Opinion dated Oct. 19, 2022 in connection with International Patent Application No. PCT/US22/37341, 13 pages.
(Continued)

*Primary Examiner* — Kenneth J Douyette
(74) *Attorney, Agent, or Firm* — ALLEN, DYER, DOPPELT, + GILCHRIST, P.A.

(57) ABSTRACT

An apparatus includes an interconnect assembly configured to receive and retain multiple batteries. The interconnect assembly includes a retainer configured to receive portions of the batteries, a conductive interconnect layer carried by the retainer, and a terminal bar configured to transport electrical currents to and from the conductive interconnect layer. The conductive interconnect layer includes a conductive layer positioned between first and second insulative layers, where the conductive layer has a first thickness that is less than a thickness of the terminal bar. The conductive layer includes multiple interconnects configured to be coupled to cathodes and anodes of the batteries.

13 Claims, 61 Drawing Sheets

(51) Int. Cl.

| | |
|---|---|
| *H01M 50/213* | (2021.01) |
| *H01M 50/509* | (2021.01) |
| *H01M 50/514* | (2021.01) |
| *H01M 50/526* | (2021.01) |

(52) U.S. Cl.
CPC ....... *H01M 50/509* (2021.01); *H01M 50/514* (2021.01); *H01M 50/526* (2021.01); *H01M 2220/20* (2013.01)

(56) References Cited

U.S. PATENT DOCUMENTS

| | | | |
|---|---|---|---|
| 9,147,875 | B1 | 9/2015 | Coakley et al. |
| 9,947,912 | B2 | 4/2018 | Nakamura et al. |
| 10,720,626 | B2 | 7/2020 | Harris et al. |
| 2006/0019155 | A1 | 1/2006 | Seman, Jr. et al. |
| 2010/0075205 | A1 | 3/2010 | Kwag et al. |
| 2011/0135975 | A1 | 6/2011 | Fuhr et al. |
| 2011/0223468 | A1 | 9/2011 | Ferber, Jr. |
| 2013/0130074 | A1 | 5/2013 | Timmons et al. |
| 2013/0189560 | A1 | 7/2013 | Widhalm |
| 2013/0295426 | A1* | 11/2013 | Halavart ............. H01M 50/271 429/99 |
| 2014/0212695 | A1 | 7/2014 | Lane et al. |
| 2014/0255748 | A1 | 9/2014 | Jan et al. |
| 2014/0335381 | A1 | 11/2014 | Krolak |
| 2015/0214586 | A1 | 7/2015 | Yeow et al. |
| 2015/0280295 | A1 | 10/2015 | Bhunia et al. |
| 2015/0325824 | A1 | 11/2015 | Hasegawa et al. |
| 2016/0380319 | A1 | 12/2016 | Rhein et al. |
| 2017/0005316 | A1 | 1/2017 | Harris et al. |
| 2017/0047574 | A1 | 2/2017 | Fees et al. |
| 2017/0125773 | A1 | 5/2017 | Liu |
| 2017/0301968 | A1* | 10/2017 | Cooney ............... H01M 50/457 |
| 2018/0097265 | A1 | 4/2018 | Tarlau et al. |
| 2018/0145382 | A1 | 5/2018 | Harris et al. |
| 2018/0212222 | A1 | 7/2018 | Barton et al. |
| 2019/0081308 | A1 | 3/2019 | Capati et al. |
| 2019/0081370 | A1 | 3/2019 | Capati et al. |
| 2020/0144676 | A1 | 5/2020 | Tsuruta et al. |
| 2020/0274184 | A1 | 8/2020 | Eichhorn et al. |
| 2021/0098765 | A1 | 4/2021 | Weinberger et al. |

FOREIGN PATENT DOCUMENTS

| | | |
|---|---|---|
| JP | 2015099726 A | 5/2015 |
| JP | 2015144054 A | 8/2015 |
| WO | 2018094187 A1 | 5/2018 |
| WO | 2018126136 A1 | 7/2018 |

OTHER PUBLICATIONS

Cadex, "Powering BioMedical Devices," Battery University, Nov. 2020, 25 pages.

Dyson, "The Dyson Battery Electric Vehicle," Dyson Newsroom, Jun. 2020, 13 pages.

Kwai, "Illustration of a Wire Bonding Process," YouTube Video, Jan. 2014, https://www.youtube.com/watch?v=FRvECYvlaT0.

MarkLines Automotive Industry Portal, "Tesla Model 3 Teardown; Motor, Inverter, and Battery," Information Platform, Mar. 2019, 8 pages.

MunroLive, "Tesla 4680 Battery Pack Prophecy," YouTube Video, Nov. 2020, https://www.youtube.com/watch?v=KJIEiZpJg2cv.

Sunstone Welders/Orion Welders, "Resistance Welding with CD600DPA 0.005" Nickel to 18650 Battery," YouTube Video, Mar. 2021, https://www.youtube.com/watch?v=FC0GpZ_W7MY.

Woodbury, "Wire bonding Tango Battery Module," YouTube Video, Aug. 2018, https://www.youtube.com/watch?v=flU1ivte0bc.

Wu, "(Laser Welding) 250PPM 18650 Laser Welding," YouTube Video, Dec. 2018, https://www.youtube.com/watch?v=JJlurLKAJzM.

International Search Report and Written Opinion dated Nov. 21, 2022 in connection with International Patent Application No. PCT/US2022/037336, 14 pages.

* cited by examiner 304      306

1002a 1002a-1002b

1102

204

11E

1610

1610'

116a'-116b'

1806

116a-116b

1802

114a-114b 114a-114b

2102

SINGLE CONDUCTOR LAYER CELL-TO-CELL INTERCONNECT FOR ELECTRIC VEHICLE POWER SUPPLY OR OTHER POWER SUPPLY

CROSS-REFERENCE TO RELATED APPLICATION AND PRIORITY CLAIM

This application claims priority under 35 U.S.C. § 119(e) to U.S. Provisional Patent Application No. 63/233,134 filed on Aug. 13, 2021. This provisional application is hereby incorporated by reference in its entirety.

TECHNICAL FIELD

This disclosure relates generally to power supplies. More specifically, this disclosure relates to a single conductor layer cell-to-cell interconnect for an electric vehicle power supply or other power supply.

BACKGROUND

An electric vehicle includes a power supply that provides electrical power to one or more electric motors and other components of the electric vehicle. In some cases, the power supply may include a large number of battery cells (referred to as "batteries") that are connected in various series and parallel combinations. During operation, the batteries collectively operate to provide the electrical power for the electric vehicle. Unfortunately, electric vehicle power supplies can suffer from a number of shortcomings in their designs.

SUMMARY

This disclosure provides a single conductor layer cell-to-cell interconnect for an electric vehicle power supply or other power supply.

In a first embodiment, an apparatus includes an interconnect assembly configured to receive and retain multiple batteries. The interconnect assembly includes a retainer configured to receive portions of the batteries, a conductive interconnect layer carried by the retainer, and a terminal bar configured to transport electrical currents to and from the conductive interconnect layer. The conductive interconnect layer includes a conductive layer positioned between first and second insulative layers, where the conductive layer has a first thickness that is less than a thickness of the terminal bar. The conductive layer includes multiple interconnects configured to be coupled to cathodes and anodes of the batteries.

In a second embodiment, a system includes one or more power supply modules configured to provide electrical power. Each power supply module includes an interconnect assembly configured to receive and retain multiple batteries. The interconnect assembly includes a retainer configured to receive portions of the batteries, a conductive interconnect layer carried by the retainer, and a terminal bar configured to transport electrical currents to and from the conductive interconnect layer. The conductive interconnect layer includes a conductive layer positioned between first and second insulative layers, where the conductive layer has a first thickness that is less than a thickness of the terminal bar. The conductive layer includes multiple interconnects configured to be coupled to cathodes and anodes of the batteries.

In a third embodiment, a method includes inserting multiple batteries into an interconnect assembly that is configured to receive and retain the batteries. The interconnect assembly includes a retainer configured to receive portions of the batteries, a conductive interconnect layer carried by the retainer, and a terminal bar configured to transport electrical currents to and from the conductive interconnect layer. The conductive interconnect layer includes a conductive layer positioned between first and second insulative layers, where the conductive layer has a first thickness that is less than a thickness of the terminal bar. The method also includes attaching interconnects of the conductive interconnect layer to cathodes and anodes of the batteries.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1A:
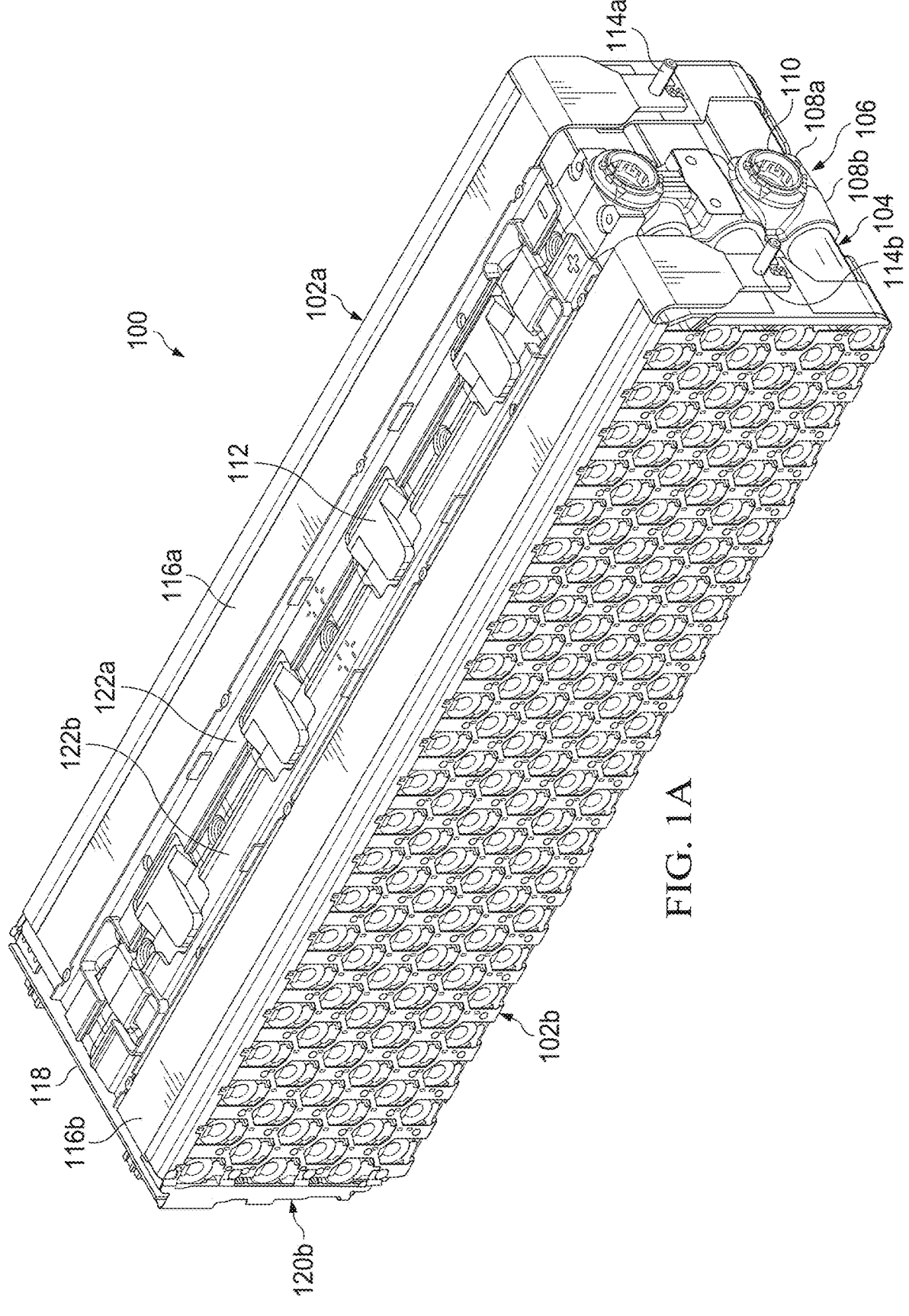
FIGS. 1A through 1C illustrate an example interconnect assembly for use in an electric vehicle or other system according to this disclosure.

FIGS. 1A through 22, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, an electric vehicle includes a power supply that provides electrical power to one or more electric motors and other components of the electric vehicle. In some cases, the power supply may include a large number of battery cells (referred to as "batteries") that are connected in various series and parallel combinations. During operation, the batteries collectively operate to provide the electrical power for the electric vehicle. Unfortunately, electric vehicle power supplies can suffer from a number of shortcomings in their designs.

As particular examples of various shortcomings, an electric vehicle power supply needs to ensure that electrical isolation exists between positive and negative pathways to and from the batteries in order to avoid the creation of short circuits. However, electric vehicle power supplies often have tight clearances and limited visibility, which can make it difficult to properly couple electrical pathways to the batteries (such as via laser welding). Also, certain types of batteries (such as lithium ion batteries) are temperature-sensitive, and some electric vehicle power supplies may allow batteries to reach significantly different temperatures, which can negatively impact power supply performance. Further, electric vehicle power supplies may often include temperature and voltage sensors to monitor characteristics of the batteries, but the temperature and voltage sensors often use different harnesses and wiring. Moreover, electric vehicle power supplies may be implemented using multiple modules, where each module includes a number of batteries and the modules themselves can be coupled in series and parallel arrangements to provide desired electrical power.

However, connection points for the modules may be complex, which increases the size, weight, and cost of the power supplies. In addition, electric vehicle power supplies may lack adequate structural integrity in some cases. Finally, electric vehicle power supplies may suffer from various uniformity issues, such as electrical current or resistance network uniformity issues, that can negatively affect the operation of the power supplies.

This disclosure describes various embodiments of a single conductor layer cell-to-cell interconnect for an electric vehicle power supply or other power supply. As described in more detail below, an interconnect or interconnect assembly couples multiple batteries together in series and parallel arrangements as needed or desired to form a power supply module. One or more instances of the power supply module may be used to form a power supply for an electric vehicle or other larger system that uses electrical power. Each battery has a cathode and an anode that couple to a single conductive layer in an interconnect assembly, and the conductive layer includes series connectors coupling neighboring batteries and various positive and negative interconnects or connection tabs at appropriate locations to form series and parallel connections with the batteries. Terminal connectors are also provided for convenient coupling of each interconnect assembly to other interconnect assemblies or other components of a larger system.

The embodiments of the interconnect assemblies described below may substantially or completely overcome many of the shortcomings discussed above. For example, the interconnect assemblies help to ensure that electrical isolation exists between positive and negative pathways to and from the batteries, even in the presence of tight clearances. Also, the interconnect assemblies may provide improved visibility, which can help to support operations such as laser welding. Moreover, various improvements may be used to help batteries maintain more consistent temperatures within the interconnect assemblies, and integrated temperature and voltage sensing can be used to monitor the characteristics of the batteries. Further, multiple interconnect assemblies may be used to form multiple modules of a power supply, and the interconnect assemblies provide for simple connections of the modules in series and parallel arrangements. In addition, the interconnect assemblies may provide for improved structural integrity, and various uniformity issues (such as electrical current or resistance network uniformity issues) can be improved in the interconnect assemblies.

Figure 1B:
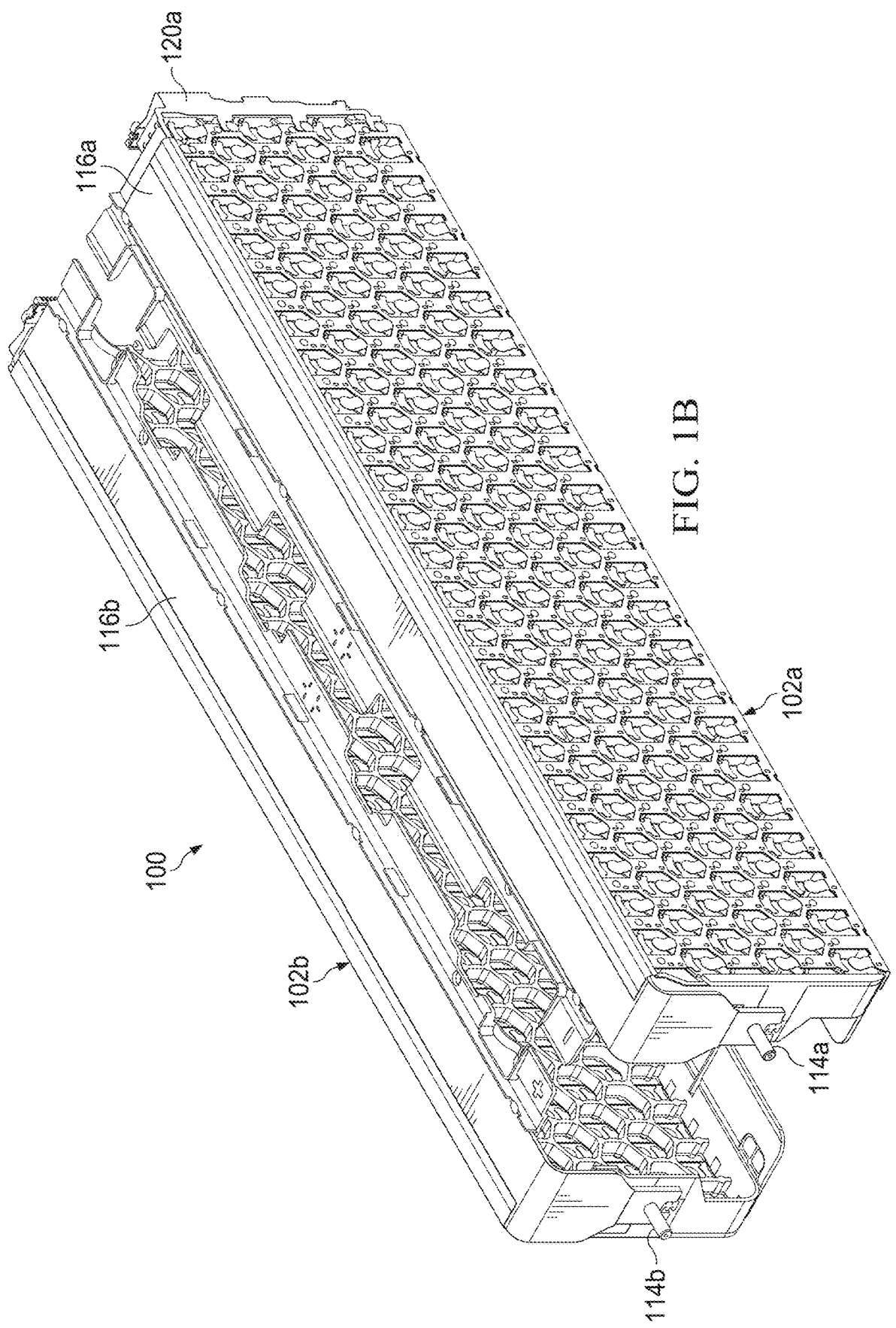
Figure 1C:
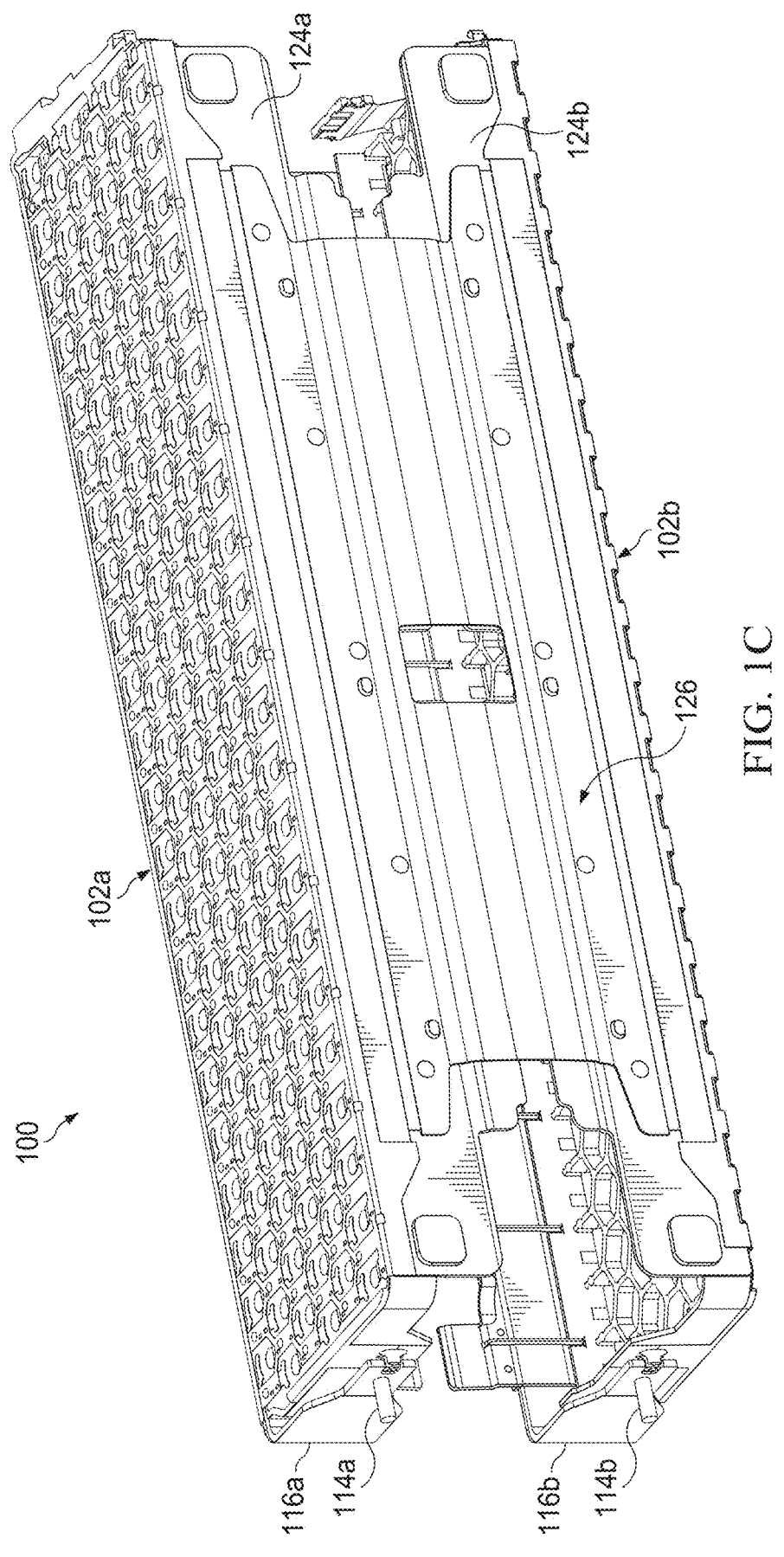

FIGS. 1A through 1C illustrate an example interconnect assembly 100 for use in an electric vehicle or other system according to this disclosure. The interconnect assembly 100 may, for example, represent or form one power supply module, and one or more power supply modules may be used to form a power supply for an electric vehicle or other system. Note that various components shown in FIG. 1A have been removed in FIGS. 1B and 1C for ease of illustration and explanation.

As shown in FIGS. 1A through 1C, the interconnect assembly 100 includes two sub-modules 102*a*-102*b*, where each sub-module 102*a*-102*b* is used to receive and form electrical connections with a number of batteries 104. Each sub-module 102*a*-102*b* may receive and form electrical connections with any suitable number of batteries 104. In some cases, for instance, each sub-module 102*a*-102*b* may receive and retain one hundred and thirty two batteries 104, and the interconnect assembly 100 collectively may receive and retain two hundred and sixty four batteries 104 (although this is for illustration only). Also, any suitable series and parallel connections may be defined by the interconnect assembly 100 for the batteries 104. In some cases, for example, the interconnect assembly 100 may define a "6S44P" configuration, meaning the interconnect assembly 100 includes six series-coupled collections of forty four batteries 104 coupled in parallel. In that example, each sub-module 102a-102b may define a "3S44P" configuration, meaning each sub-module 102a-102b includes three series-coupled collections of forty four batteries 104 coupled in parallel. However, other arrangements of batteries 104 may be used in each sub-module 102a-102b and in the interconnect assembly 100. For example, the interconnect assembly 100 may define a "6S22P" configuration (six series-coupled collections of twenty two batteries 104 coupled in parallel), and each sub-module 102a-102b may define a "3S22P" configuration (three series-coupled collections of twenty two batteries 104 coupled in parallel).

Each battery 104 may represent a cylindrical battery having both positive and negative terminals of the battery (meaning a cathode and an anode of the battery) at one end of the battery. For instance, each battery 104 may include a cathode forming a raised central portion of one end of the battery 104 and an anode forming a thin annular region around the cathode. Note, however, that the size and shape of the batteries 104 may vary as needed or desired.

A coldplate 106 is used to help cool the batteries 104 and other components of the interconnect assembly 100. The coldplate 106 may be formed from any suitable material, such as one or more materials having high thermal conductivity. The coldplate 106 may also be formed in any suitable manner. In this example, the coldplate 106 includes or is thermally coupled to a cell retainer 108a forming part of the sub-module 102a and a cell retainer 108b forming part of the sub-module 102b. Each cell retainer 108a-108b represents a structure that is configured to receive portions of multiple batteries 104 and to retain the batteries 104 within the cell retainer 108a-108b. In this way, the cell retainers 108a-108b help to maintain the batteries 104 at desired positions within the interconnect assembly 100. Each cell retainer 108a-108b may be formed from any suitable material, such as one or more materials having high thermal conductivity, and in any suitable manner.

In this example, multiple quick-connect coolant interfaces 110 allow for input and output of a cooling fluid to and from the coldplate 106. For example, the coolant interfaces 110 may be coupled to hoses or other structures that deliver a cooler fluid to the coldplate 106 and that provide a warmer fluid from the coldplate 106. Each coolant interface 110 represents any suitable structure configured to receive a cooling fluid. Also, latches 112 can be used to couple the sub-modules 102a-102b together. Here, the latches 112 can be used along one or more sides of the interconnect assembly 100 to help couple the sub-modules 102a-102b to each other. Note, however, that other mechanisms for securing the sub-modules 102a-102b together may be used here.

Each sub-module 102a-102b also respectively includes a terminal connector 114a-114b. The terminal connectors 114a-114b represent structures that can be electrically coupled to cables, wiring, or other electrical conductors in order to electrically couple the interconnect assembly 100 to other interconnect assemblies or other components in a larger system. In this example, for instance, the terminal connector 114a represents a negative terminal, and the terminal connector 114b represents a positive terminal. Coupling the terminal connectors 114a-114b to electrical conductors allows the interconnect assembly 100 to output electrical power to the larger system. If multiple interconnect assemblies 100 are coupled together in series, the interconnect assemblies 100 can operate to collectively produce a larger electrical voltage. If multiple interconnect assemblies 100 are coupled together in parallel, the interconnect assemblies 100 can operate to collectively produce a larger electrical current. Various series and parallel arrangements of the interconnect assemblies 100 may be used to achieve the desired electrical voltage and electrical current. Each terminal connector 114a-114b represents any suitable structure configured to be coupled to an electrical conductor, such as a threaded stud or other threaded post.

The terminal connectors 114a-114b are respectively part of or coupled to terminal bars 116a-116b. Each terminal bar 116a-116b is electrically coupled to the batteries 104 in its respective sub-module 102a-102b and to the terminal connector 114a-114b of its respective sub-module 102a-102b. Each terminal bar 116a-116b is therefore able to conduct electrical currents between the batteries 104 in the sub-module 102a-102b and the terminal connector 114a-114b of the sub-module 102a-102b. Each terminal bar 116a-116b can include any suitable electrically-conductive material, such as aluminum or copper. In some embodiments, each terminal bar 116a-116b may include a stamped or other electrical conductor, a pressed-in threaded stud or other terminal connector 114a-114b, and one or more die-cut plastic films or other insulators that cover and insulate one or more surfaces of the terminal bar 116a-116b.

A control board 118 is coupled to one or more sensor assemblies 120a-120b. The one or more sensor assemblies 120a-120b may be used to sense temperature, voltage, or other characteristics in the interconnect assembly 100. In some cases, each sensor assembly 120a-120b can support integrated temperature and voltage sensing. The control board 118 may include at least one microprocessor, microcontroller, digital signal processor (DSP), application specific integrated circuit (ASIC), field programmable gate array (FPGA), or other components for processing or outputting measurements from the one or more sensor assemblies 120a-120b. For example, the control board 118 may shut down or otherwise modify the operation of the interconnect assembly 100 (or provide information to an external component that can shut down or otherwise modify the operation of the interconnect assembly 100) in response to an over-voltage or over-temperature condition. The control board 118 may also operate to pass measurements from the sensor assemblies 120a-120b to an external component, such as an external control system, for use in controlling the interconnect assembly 100.

Various stiffening plates 122a-122b and 124a-124b may be used to provide structural reinforcement and increase the structural integrity of the interconnect assembly 100. For example, the stiffening plates 122a-122b and 124a-124b may be coupled to other components of the interconnect assembly 100 (such as via an adhesive), and the stiffening plates 122a-122b and 124a-124b may operate to reduce or prevent deformations of the interconnect assembly 100 or otherwise improve the structural integrity of the interconnect assembly 100. Each stiffening plate 122a-122b and 124a-124b may be formed from any suitable material, such as one or more metals, and in any suitable manner.

A hot plate electrical connector 126 forms an electrical connection between the sub-modules 102a-102b. For example, the hot plate electrical connector 126 can be used to transport electrical currents between the sub-modules 102a-102b so that a complete electrical pathway exists between the terminal connectors 114a-114b. The hot plate electrical connector 126 can be formed from any suitable electrically-conductive material, such as aluminum or copper, and in any suitable manner. In some embodiments, the hot plate electrical connector 126 may include a stamped or other electrical conductor and one or more laminated or other insulators that cover and insulate most of the major surfaces of the hot plate electrical connector 126. Note that the electrical connector 126 is referred to as a "hot plate" connector since it can reach higher temperatures than various other components of the interconnect assembly 100 (such as the batteries 104) and can be implemented using a generally-flat structure. However, other forms of the electrical connector 126 may also be used.

Although FIGS. 1A through 1C illustrate one example of an interconnect assembly 100 for use in an electric vehicle or other system, various changes may be made to FIGS. 1A through 1C. For example, the interconnect assembly 100 and each of its individual components may have any suitable size, shape, and dimensions. Also, the interconnect assembly 100 may be used with any suitable number of batteries in any suitable arrangement to produce any suitable electrical voltage and electrical current. Various additional features and example implementations of various features of the interconnect assembly 100 are provided below.

Figure 2:
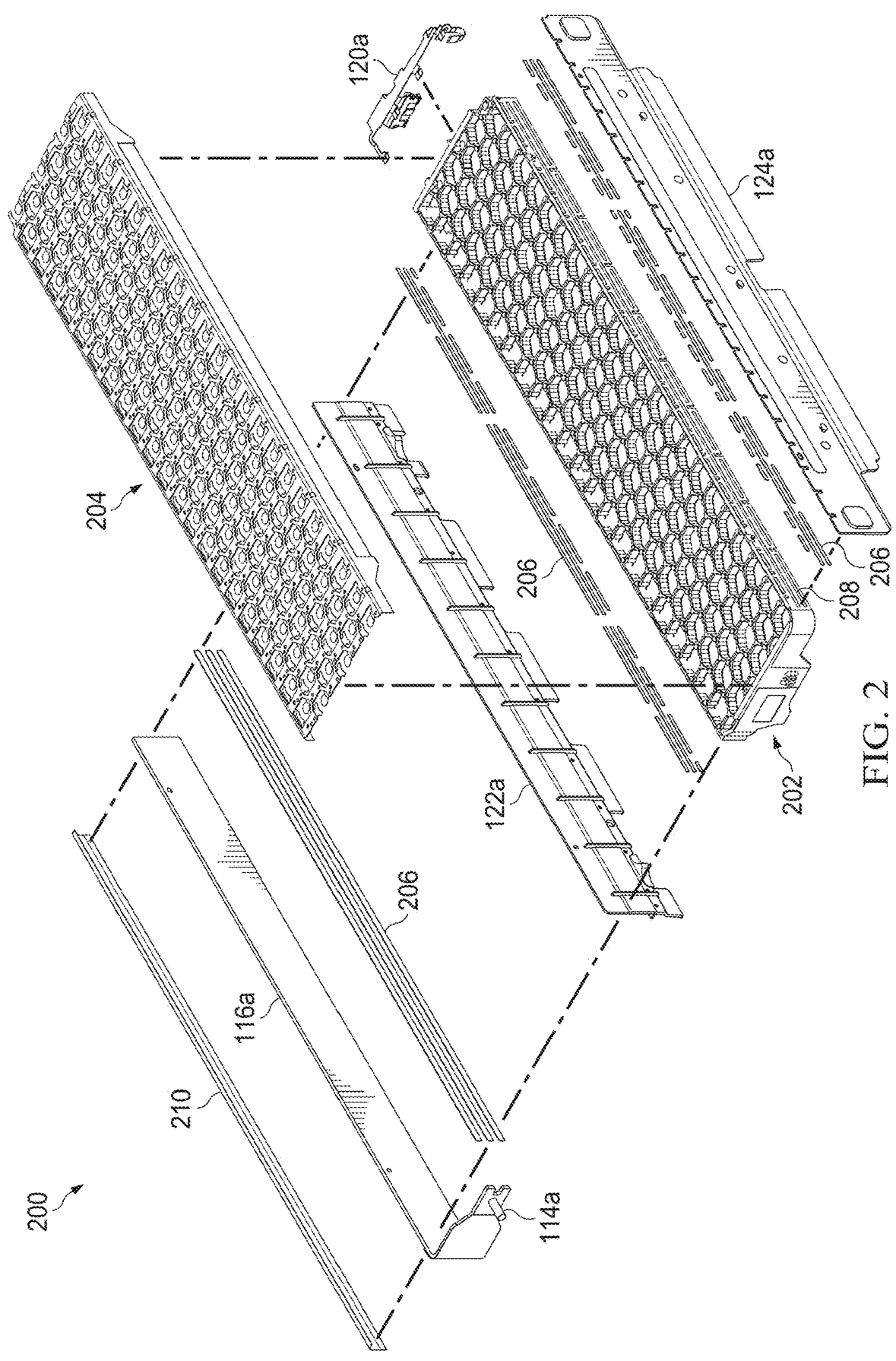
FIG. 2 illustrates an example portion of a sub-module in an interconnect assembly according to this disclosure.

FIG. 2 illustrates an example portion 200 of a sub-module 102a in an interconnect assembly 100 according to this disclosure. The portion 200 of the sub-module 102a shown in FIG. 2 includes various structures used to form electrical connections with some of the batteries 104 in the interconnect assembly 100. This portion 200 of the sub-module 102a may represent the outermost portion of the interconnect assembly 100 on the back side of the interconnect assembly 100 as shown in FIG. 1A and on the right side of the interconnect assembly 100 as shown in FIG. 1B. A similar structure may be used in the sub-module 102b to form electrical connections with other batteries 104 in the interconnect assembly 100, but the polarities of the electrical connections may be reversed as described below. The similar structure used in the sub-module 102b may represent the closest portion of the interconnect assembly 100 on the front side of the interconnect assembly 100 as shown in FIG. 1A and on the left side of the interconnect assembly 100 as shown in FIG. 1B.

As shown in FIG. 2, this portion 200 of the sub-module 102a includes an interconnect retainer 202 and a conductive interconnect layer 204. The interconnect retainer 202 generally represents a structure that cooperates with the cell retainer 108a to hold batteries 104 in place within the sub-module 102a and to hold conductive interconnects of the conductive interconnect layer 204 at suitable locations relative to the batteries 104 in the sub-module 102a. A similar interconnect retainer may cooperate with the cell retainer 108b to hold batteries 104 in place within the sub-module 102b and to hold conductive interconnects of a single conductive interconnect layer at suitable locations relative to the batteries 104 in the sub-module 102b. The interconnect retainer 202 may be formed from any suitable material, such as one or more electrically-insulative materials like plastic, and in any suitable manner.

The conductive interconnect layer 204 includes a conductive layer containing one or more conductive materials and insulating support layers. Together, the conductive layer and the support layers form a structure that is carried by the interconnect retainer 202, where the conductive layer is electrically coupled to the batteries 104 in the sub-module 102a. As described in more detail below, the conductive layer in the conductive interconnect layer 204 can transport electrical currents to and from the batteries 104 in the sub-module 102a. The conductive layer in the conductive interconnect layer 204 may be formed using any suitable conductive material, such as aluminum or copper, and in any suitable manner. The support layers in the conductive interconnect layer 204 may be formed using any suitable electrically-insulative material, such as one or more polycarbonates or other plastics, and in any suitable manner.

In some cases, the conductive layer in the conductive interconnect layer 204 may represent a layer of aluminum that is about 0.25 millimeters thick, and each of the support layers in the conductive interconnect layer 204 may represent a polycarbonate support layer that is about 0.1 millimeters to about 0.3 millimeters thick. In these or other embodiments, the conductive layer in the conductive interconnect layer 204 may represent a foil that can be easily manipulated to couple portions of the conductive layer to the batteries 104.

Various adhesive layers 206 represent layers of adhesive that can be used to secure components of the sub-module 102a together. For example, two adhesive layers 206 may be used to attach the stiffening plates 122a and 124a to the interconnect retainer 202, and an adhesive layer 206 may be used to attach the terminal bar 116a to the stiffening plate 122a. In some embodiments, one or more of the adhesive layers 206 may be placed into recesses or grooves of one component and used to couple that component to another component, such as when adhesive is placed in grooves 208 in the sides of the interconnect retainer 202. Each adhesive layer 206 includes any suitable adhesive that couples components together. Note, however, that other mechanisms may be used to secure components of the sub-module 102a together.

A tape cover 210 may be used along the upper edge of the sub-module 102 in order to protect electrical connections between the terminal bar 116a and the conductive interconnect layer 204. For example, the tape cover 210 may be formed from an electrically-insulative material and wrap around an edge of the sub-module 102a to cover a conductive part of the terminal bar 116a and a conductive part of the conductive interconnect layer 204. One example of this is shown below with respect to FIG. 11F.

Although FIG. 2 illustrates one example of a portion 200 of a sub-module 102a in an interconnect assembly 100, various changes may be made to FIG. 2. For example, the sub-module 102a and each of its individual components may have any suitable size, shape, and dimensions. Also, this portion 200 of the sub-module 102a may be modified to support use with other suitable numbers of batteries and batteries in other suitable configurations.

Figure 3A:
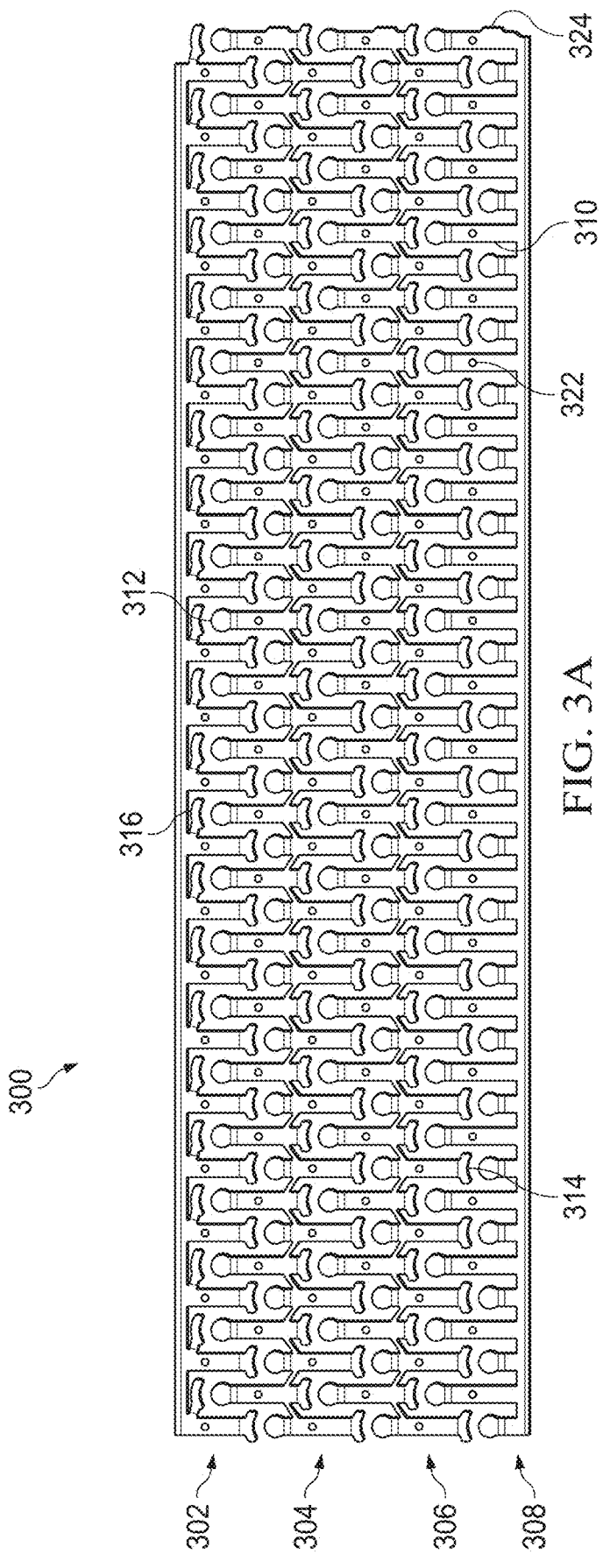
FIGS. 3A through 3E illustrate an example conductive layer in a conductive interconnect layer of a sub-module in an interconnect assembly according to this disclosure

FIGS. 3A through 3E illustrate an example conductive layer 300 in a conductive interconnect layer 204 of a sub-module 102a in an interconnect assembly 100 according to this disclosure. As shown in FIG. 3A, the conductive layer 300 is formed here using four distinct conductive structures 302-308. In this example, the conductive structure 302 represents a negative connection structure, meaning the conductive structure 302 is coupled to negative terminals of batteries 104. The conductive structure 308 represents a positive connection structure, meaning the conductive structure 308 is coupled to positive terminals of batteries 104. The conductive structures 304 and 306 represent series connection structures, meaning each conductive structure 304 and 306 is coupled to positive terminals of batteries 104 on one side of the structure and to negative terminals of batteries 104 on the other side of the structure.

Each conductive structure 302-308 here includes series connectors 310, which are used to electrically couple in series either (i) two batteries 104 or (ii) one battery 104 and a connecting conductor 320a or 320b. The series connectors 310 are electrically conductive and are able to transport electrical currents, such as between pairs of batteries 104 (in the case of the conductive structures 304 and 306) or to/from individual batteries 104 (in the case of the conductive structures 302 and 308) during use or recharging of the interconnect assembly 100.

In this example, the series connectors 310 are electrically coupled to three types of connections to the batteries 104. Positive or cathode interconnects 312 are represented using generally circular structures, and each interconnect 312 connects to a positive terminal of a battery 104. Centered negative or centered anode interconnects 314 are represented using arched structures, and each interconnect 314 connects to a negative terminal of a battery 104. Eccentric negative or eccentric anode interconnects 316 are also represented using arched structures, and each interconnect 316 connects to a negative terminal of a battery 104. The interconnects 314 and 316 differ from one another in that each interconnect 314 is connected to a series connector 310 along a middle or central portion of the interconnect 314, while each interconnect 316 is connected to a series connector 310 along one side of the interconnect 316. The use of two types of anode interconnects 314 and 316 may allow for tighter packaging of the sub-module 102a, although this is not necessarily required.

Figure 4:
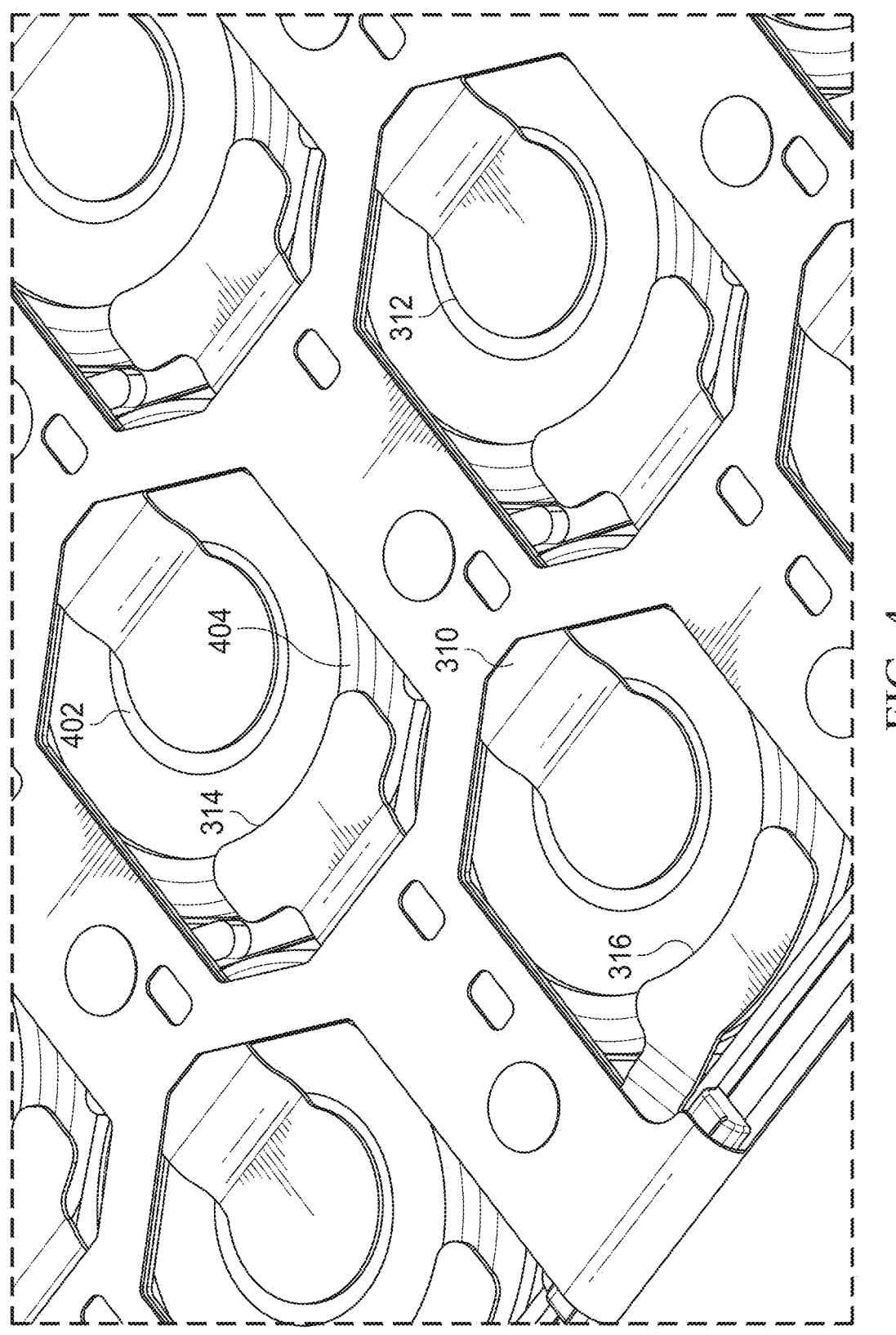
FIG. 4 illustrates example interconnects of a conductive interconnect layer to batteries in an interconnect assembly according to this disclosure.

FIG. 4 illustrates example interconnects 312-316 of a conductive interconnect layer 204 to batteries 104 in an interconnect assembly 100 according to this disclosure. As can be seen here, each battery 104 may include a raised cathode 402 and an annular anode 404. Each interconnect 312 can be sized and shaped to be coupled to the cathode 402 of a battery 104 without also contacting the anodes 404 of any batteries 104. Each interconnect 314 can be sized and shaped to be coupled to the anode 404 of a battery 104 without also contacting the cathodes 402 any batteries 104. Each interconnect 316 can be sized and shaped to be coupled to the anode 404 of a battery 104 without also contacting the cathodes 402 of any batteries 104. Bends in the interconnects 312-316 allow the interconnects 312-316 to extend from the series connectors 310 to the batteries 104. The series connectors 310 are positioned above the batteries 104 and therefore do not physically contact the cathodes 402 or anodes 404 of the batteries 104. As described below, in some embodiments, laser welding may be used to physically attach the interconnects 312-316 to the cathodes 402 and anodes 404 of the batteries 104.

Figures 3B, 3C:
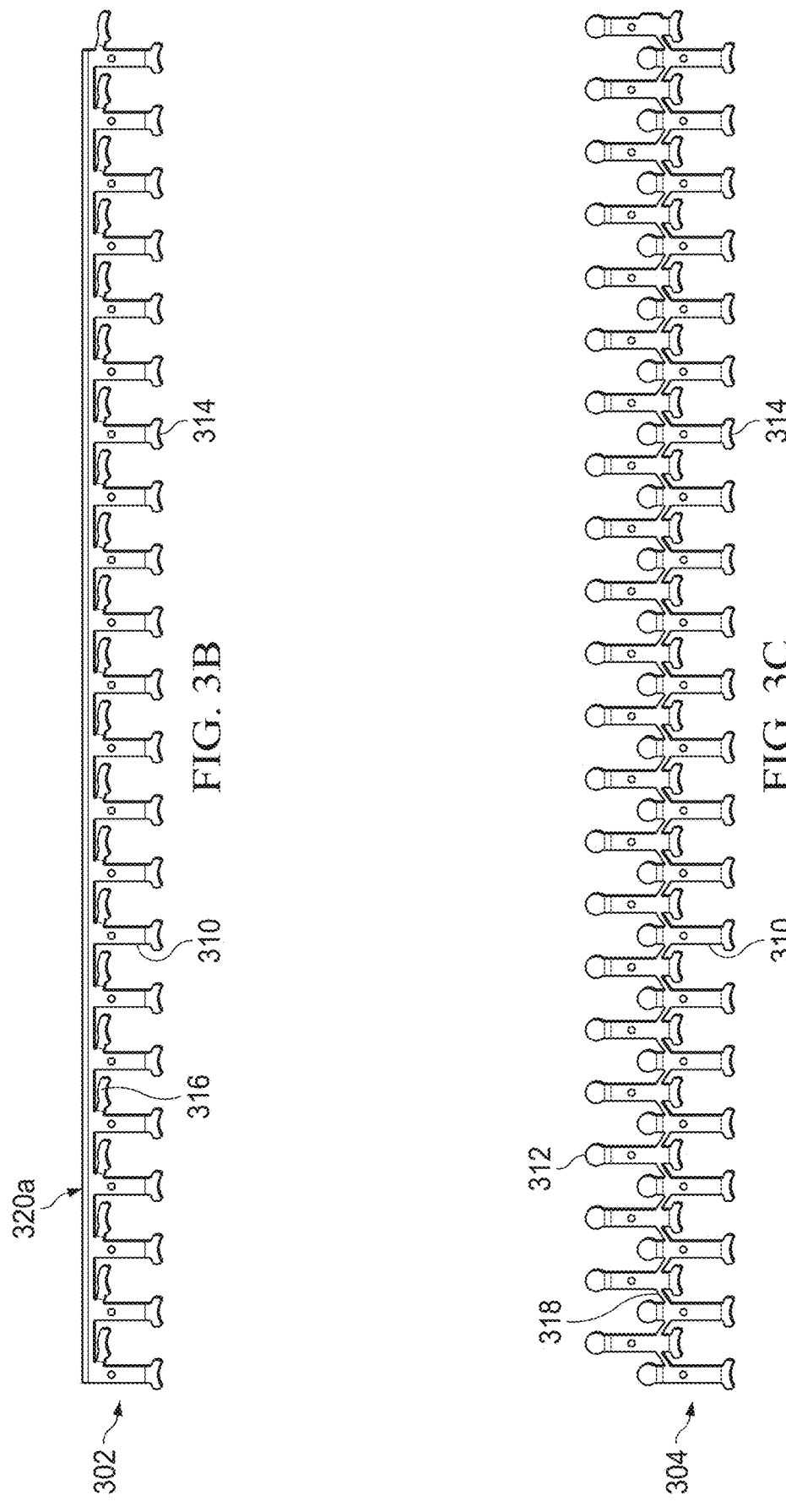
Figures 3D, 3E:
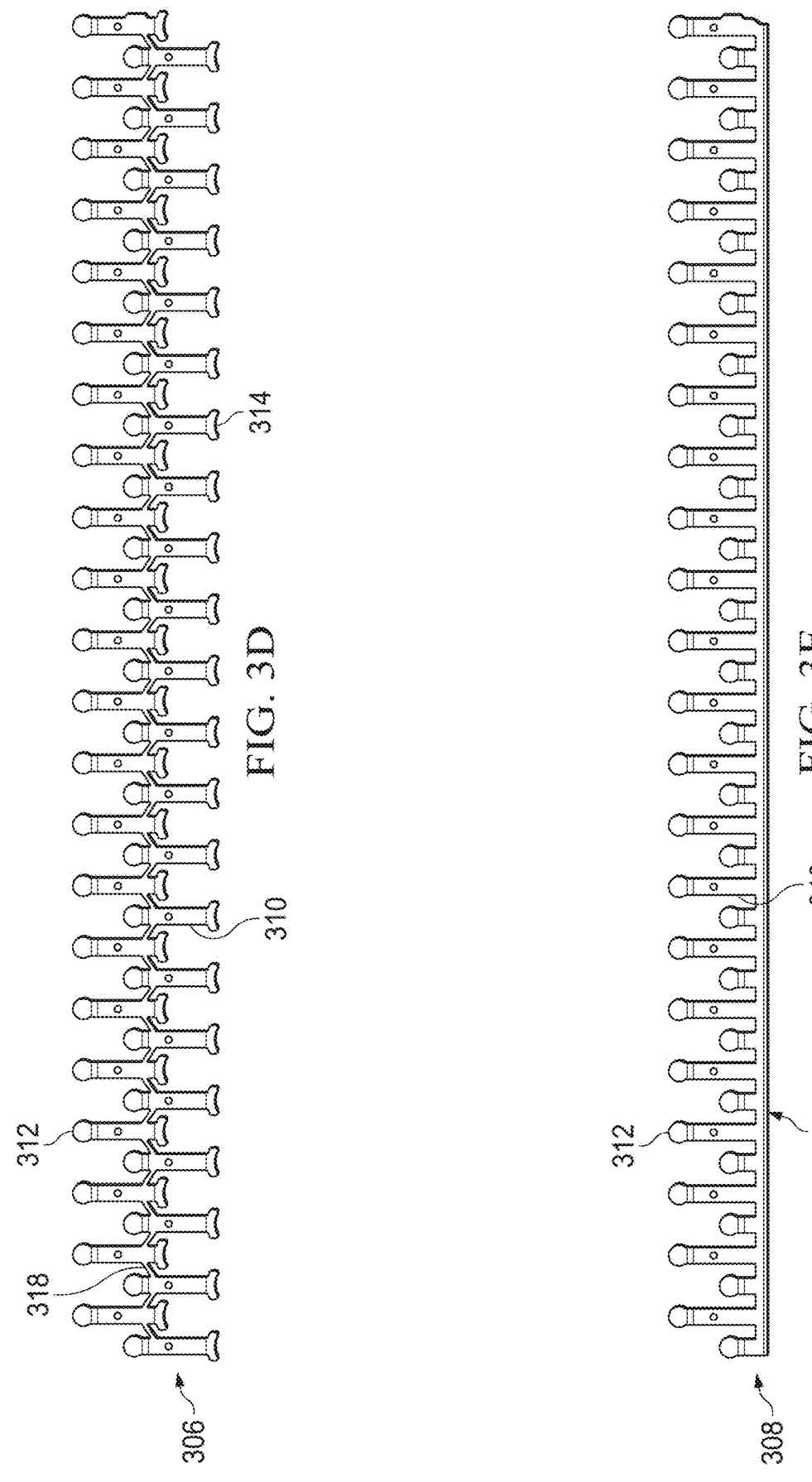

The conductive structures 304 and 306 shown in FIGS. 3A, 3C, and 3D also include balancing conductors 318. Each balancing conductor 318 electrically couples two adjacent or neighboring series connectors 310, and the balancing conductors 318 in each conductive structure 304 and 306 can electrically couple all of the series connectors 310 in that conductive structure 304 and 306 together. The balancing conductors 318 can transport electrical currents between different series connectors 310 as needed to help balance the electrical currents flowing through the batteries 104 of the sub-module 102.

The conductive structures 302 and 308 shown in FIGS. 3A, 3B, and 3E also respectively include connecting conductors 320a-320b. The connecting conductor 320a can electrically couple the conductive structure 302 to the terminal bar 116a, and the connecting conductor 320b can electrically couple the conductive structure 308 to the hot plate electrical connector 126. In some cases, each connecting conductor 320a-320b may be formed using the same material as the other components of the conductive structures 302 and 308, such as a conductive foil. The conductive structures 302-308 shown in FIGS. 3A through 3E further include various openings 322. As described below, the openings 322 can be sized, shaped, and positioned to receive pins or other connectors that couple the conductive interconnect layer 204 to the interconnect retainer 202.

In addition, various ones of the conductive structures 302-308 shown in FIGS. 3A through 3E may include conductive tabs 324, which represent locations where a sensor assembly 120a-120b can be coupled to the various ones of the conductive structures 302-308. Each conductive tab 324 allows the associated sensor assembly 120a-120b to capture voltage measurements at the location of the conductive tab 324 within the conductive interconnect layer 204. Each conductive tab 324 may be formed from any suitable conductive material, such as aluminum or copper, and in any suitable manner. Note that the number and positions of the conductive tabs 324 shown here are for illustration only and that any number of conductive tabs 324 may be used at one or more suitable locations within the interconnect assembly 100.

Figure 5A:
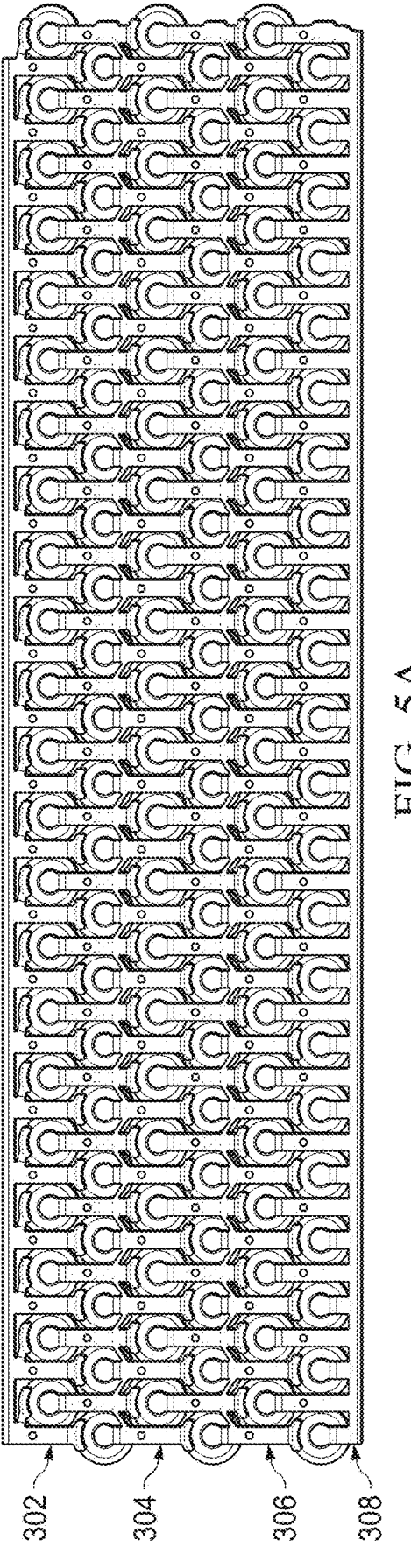
FIGS. 5A through 5D illustrate example connections formed by a conductive interconnect layer in a first sub-module of an interconnect assembly according to this disclosure.

The specific arrangement of interconnects 312-316 here supports the creation of specific series and parallel paths through the batteries 104. FIGS. 5A through 5D illustrate example connections formed by a conductive interconnect layer 204 in a first sub-module 102a of an interconnect assembly 100 according to this disclosure. In FIG. 5A, all four conductive structures 302-308 are shown as being coupled to one hundred and thirty two batteries 104 in the "3S44P" configuration. As noted above, this configuration means that each sub-module 102a-102b includes three series-coupled collections of forty four batteries 104 coupled in parallel, although other numbers of batteries 104 in series and in parallel may be used as needed or desired.

Figure 5B:
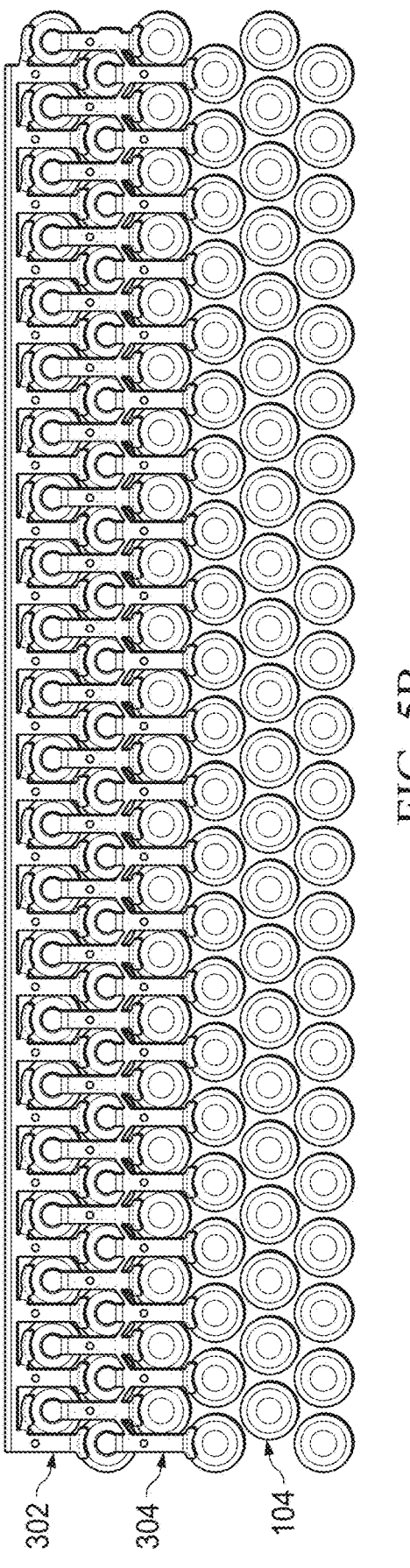

In FIG. 5B, the first collection of batteries 104 coupled in parallel is shown. Here, the conductive structure 302 is coupled to the anodes 404 of the batteries 104 using centered and eccentric anode interconnects 314 and 316. The conductive structure 304 is coupled to the cathodes 402 of the same batteries 104 using cathode interconnects 312. With these connections, the batteries 104 in the first collection are coupled in parallel with one another.

Figure 5C:
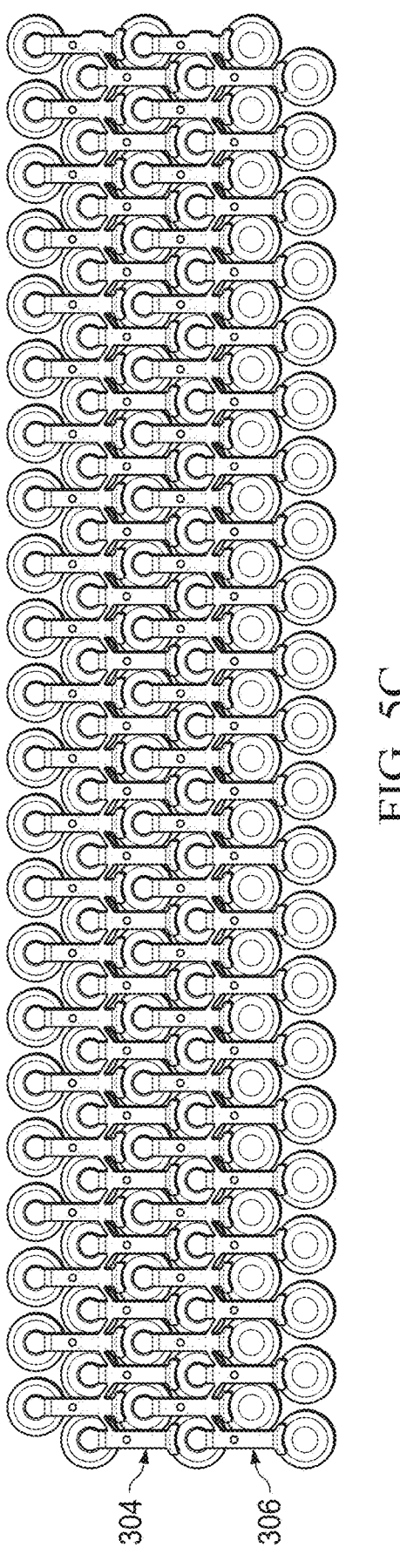

In FIG. 5C, the second collection of batteries 104 coupled in parallel is shown. Here, the conductive structure 304 is coupled to the anodes 404 of the batteries 104 using centered anode interconnects 314. The conductive structure 306 is coupled to the cathodes 402 of the same batteries 104 using cathode interconnects 312. With these connections, the batteries 104 in the second collection are coupled in parallel with one another. Also, the second collection of batteries 104 is coupled in series with the first collection of batteries 104.

Figure 5D:
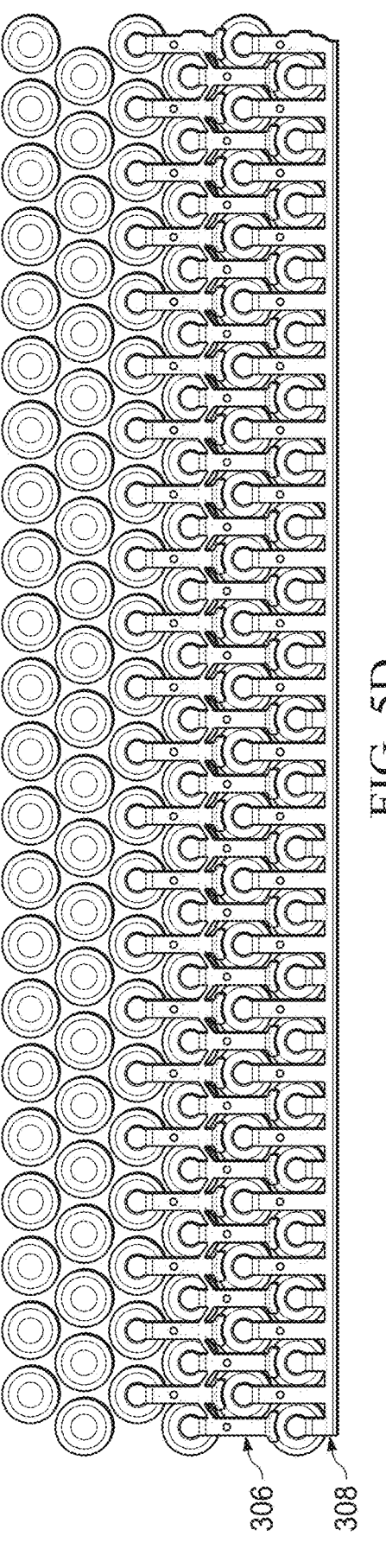

In FIG. 5D, the third collection of batteries 104 coupled in parallel is shown. Here, the conductive structure 306 is coupled to the anodes 404 of the batteries 104 using centered anode interconnects 314. The conductive structure 308 is coupled to the cathodes 402 of the same batteries 104 using cathode interconnects 312. With these connections, the batteries 104 in the third collection are coupled in parallel with one another. Also, the third collection of batteries 104 is coupled in series with the first and second collections of batteries 104.

Figure 6:
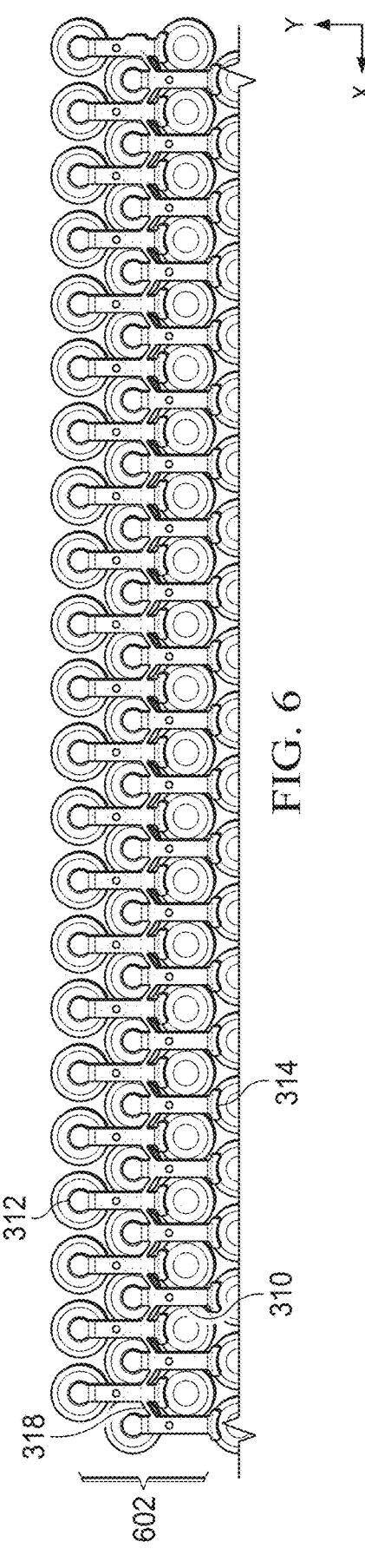
FIG. 6 illustrates an example alternating arrangement of positive and negative interconnects of a conductive interconnect layer in a sub-module of an interconnect assembly according to this disclosure.

The conductive layer 300 in the conductive interconnect layer 204 here is designed as a single-layer structure having a specialized geometry so that adjacent ones of the interconnects 312-316 have opposing polarities. FIG. 6 illustrates an example alternating arrangement of positive and negative interconnects of a conductive interconnect layer 204 in a sub-module 102a of an interconnect assembly 100 according to this disclosure. As can be seen in FIG. 6, one row 602 of interconnects (formed by interconnects 312 and 314 in this example) alternate between positive connections (interconnects 312) and negative connections (interconnects 314) to the batteries 104. This allows the positive and negative connections to mesh with each other, and access to the batteries 104 can be maintained for purposes such as welding of the interconnects 312-316 onto the batteries 104 while preventing short-circuit paths from forming. The same type of alternating arrangement of positive and negative interconnects appears in other rows of interconnects within the sub-module 102a.

The meshing of the positive and negative connections to the batteries 104 here is achieved, among other ways, by limiting the conductor pathways to direct connections between adjacent batteries 104 in the "Y" direction of FIG. 6. This is allowed here because the batteries 104 are arranged in rows with a staggered pattern, which allows the cathode 402 of one battery 104 in one row and the anode 404 of another battery 104 in another row to be connected by a single series connector 310 (which here bypasses an intervening row of batteries 104). The series connectors 310 in FIG. 6 are positioned between batteries 104 in the staggered pattern. This design arranges the parallel collections of batteries 104 in successive continuous rows of cells, which prevents adjacent interconnects 312-316 from having to occupy the same footprint in the array.

Figure 7:
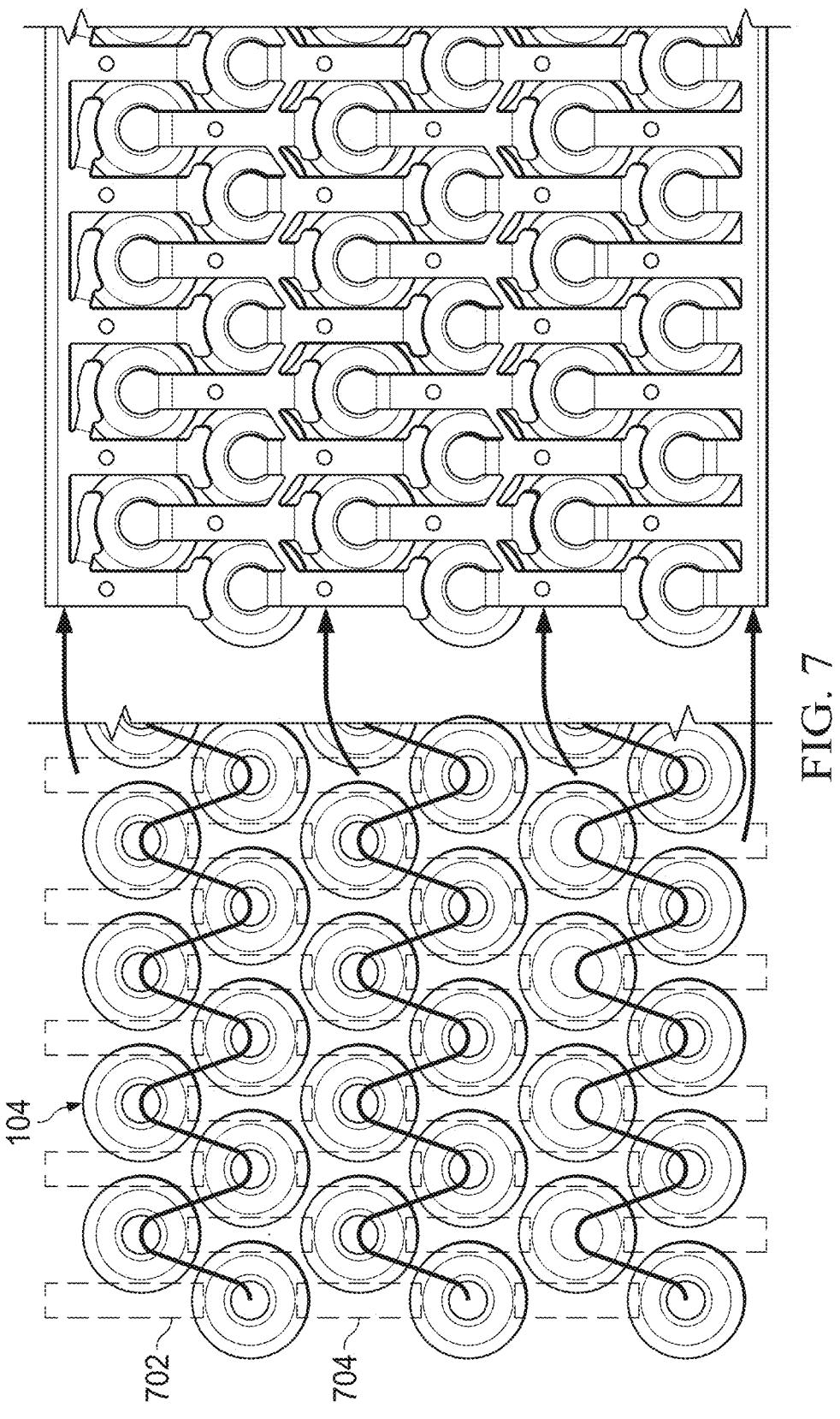
FIG. 7 illustrates one example of current paths and battery spacings in a sub-module of an interconnect assembly according to this disclosure.

Essentially, this approach forms nonlinear current paths through the batteries 104. FIG. 7 illustrates one example of current paths 702 and battery spacings 704 in a sub-module 102a of an interconnect assembly 100 according to this disclosure. As can be seen in FIG. 7, the approach shown in FIGS. 3A through 6 forms nonlinear current paths 702, where each current path 702 travels through batteries 104 in multiple offset rows. The spacings 704 are provided between the batteries 104 associated with adjacent current paths 702, and the spacings 704 are at least partially occupied by the series connectors 310. The ability to nest the series connectors 310 and the interconnects 312-316 as needed can make scaling the design for larger or smaller capacities as easy as adding or removing rows of batteries 104. Of course, adding or removing series connectors 310 will naturally change the functional voltage of the interconnect assembly 100, and a system-level design can be altered as needed to accommodate that change.

Figure 8:
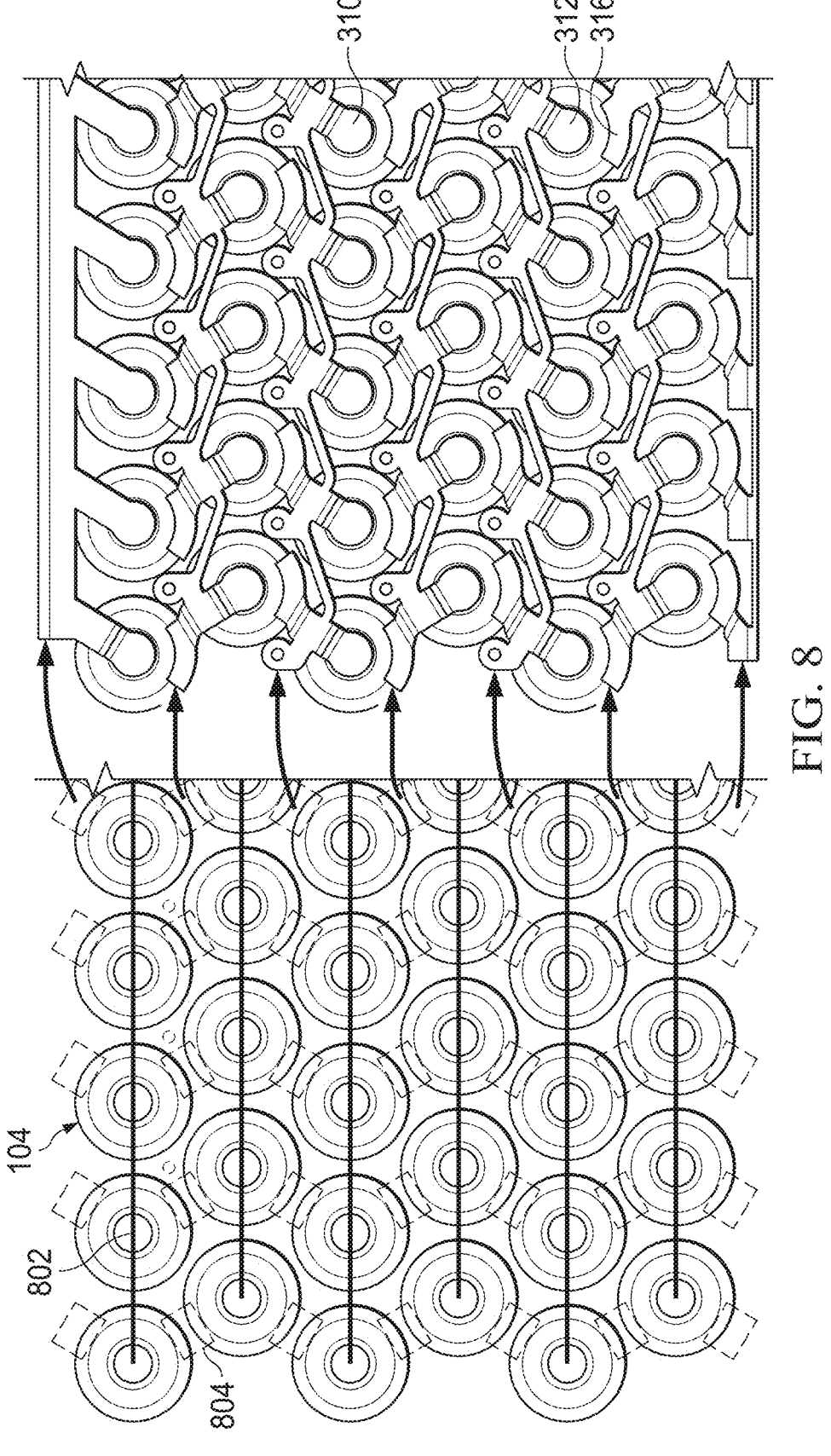
FIG. 8 illustrates another example of current paths and battery spacings in a sub-module of an interconnect assembly according to this disclosure.

Note, however, that the use of staggered rows of batteries 104 and nonlinear current paths are not required and that other arrangements of batteries 104 may be used. For instance, FIG. 8 illustrates another example of current paths 802 and battery spacings 804 in a sub-module 102a of an interconnect assembly 100 according to this disclosure. As can be seen in FIG. 8, each of multiple current paths 802 may instead involves batteries 104 in a single row, and smaller spacings 804 are provided between the batteries 104 associated with adjacent current paths 802. In FIG. 8, the longer series connectors 310 described above can be replaced with shorter series connectors 310', each of which again electrically couples two neighboring batteries 104. This is possible since the series connectors 310' are coupling adjacent batteries 104 that are closed together (without needing to skip an intervening staggered row of batteries 104). The same nesting feature can still be preserved here, even though the series connectors 310' are shorter.

Figure 9:
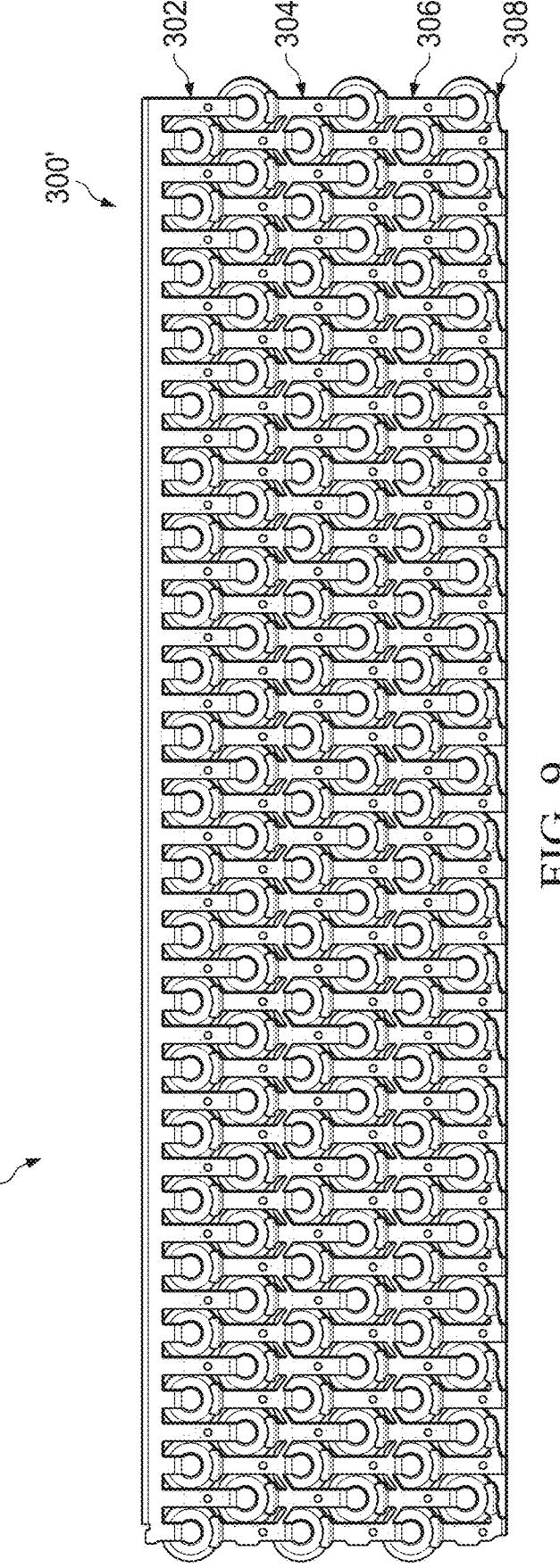
FIG. 9 illustrates example connections formed by a conductive interconnect layer in a second sub-module of an interconnect assembly according to this disclosure.

As discussed above, the sub-module 102b may include similar components as the sub-module 102a, but the polarities of the connections to the batteries 104 in the sub-module 102b can be reversed. FIG. 9 illustrates example connections formed by a conductive interconnect layer 204' in a second sub-module 102b of an interconnect assembly 100 according to this disclosure. In this example, the conductive interconnect layer 204' includes a conductive layer 300', which is formed using four distinct conductive structures 302'-308'. The conductive structures 302'-308' are similar to the conductive structures 302-308 described above (except positive connections to batteries 104 have been replaced with negative connections to batteries 104 and vice versa). This helps to provide the proper voltage change from the terminal connector 114b to the hot plate electrical connector 126 and the proper voltage change from the hot plate electrical connector 126 to the terminal connector 114a.

As can be seen in FIGS. 3A through 9, the conductive layers 300 and 300' in the conductive interconnect layers 204 and 204' of the interconnect assembly 100 allow for desired series and parallel connections to be formed with batteries 104 in both sub-modules 102a-102b. Because of this, the batteries 104 can be used to provide a desired amount of electrical power to an electric vehicle or other powered system. In other words, the conductive interconnect layers 204 and 204' of the interconnect assembly 100 can be used to clearly define a circuit that provides a desired amount of electrical power.

Although FIGS. 3A through 9 illustrate examples of conductive layers 300 and 300' in conductive interconnect layers 204 and 204' of sub-modules 102a-102b in an interconnect assembly 100, various changes may be made to FIGS. 3A through 9. For example, the conductive layers 300 and 300' can vary based on the number and arrangement of batteries being used. As a particular example, one of the conductive structures 304, 306 and one of the conductive structures 304', 306' may be omitted if each sub-module 102a-102b includes two collections of batteries in series. As another particular example, additional series connection structures may be used if each sub-module 102a-102b includes more than three collections of batteries in series. Also, the use of cathode, centered anode, and eccentric anode interconnects 312-316 is for illustration only, and each interconnect 312-316 may have any desired form.

Figure 10A:
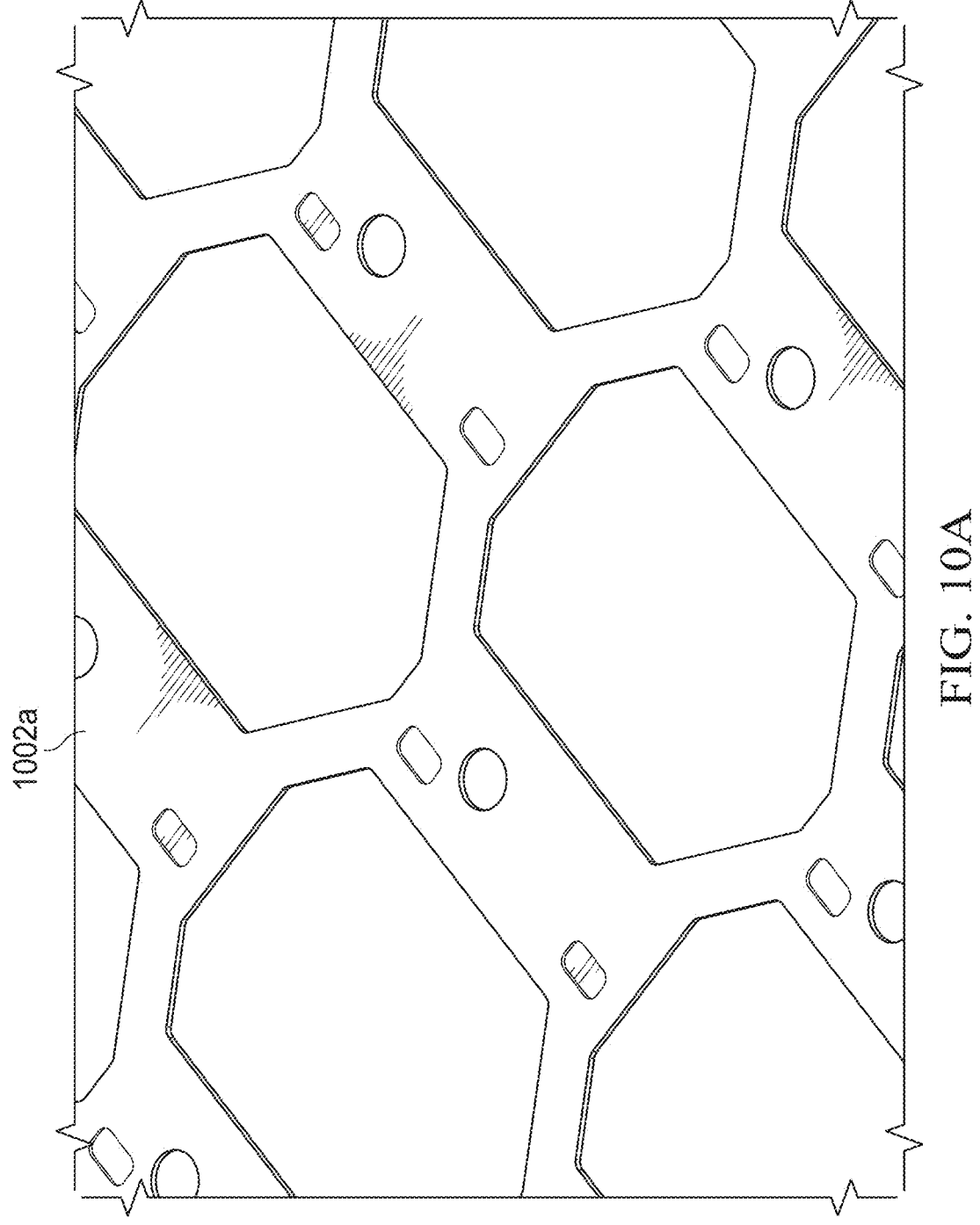
FIGS. 10A through 10C illustrate an example technique for forming a conductive interconnect layer of an interconnect assembly according to this disclosure.
Figure 10B:
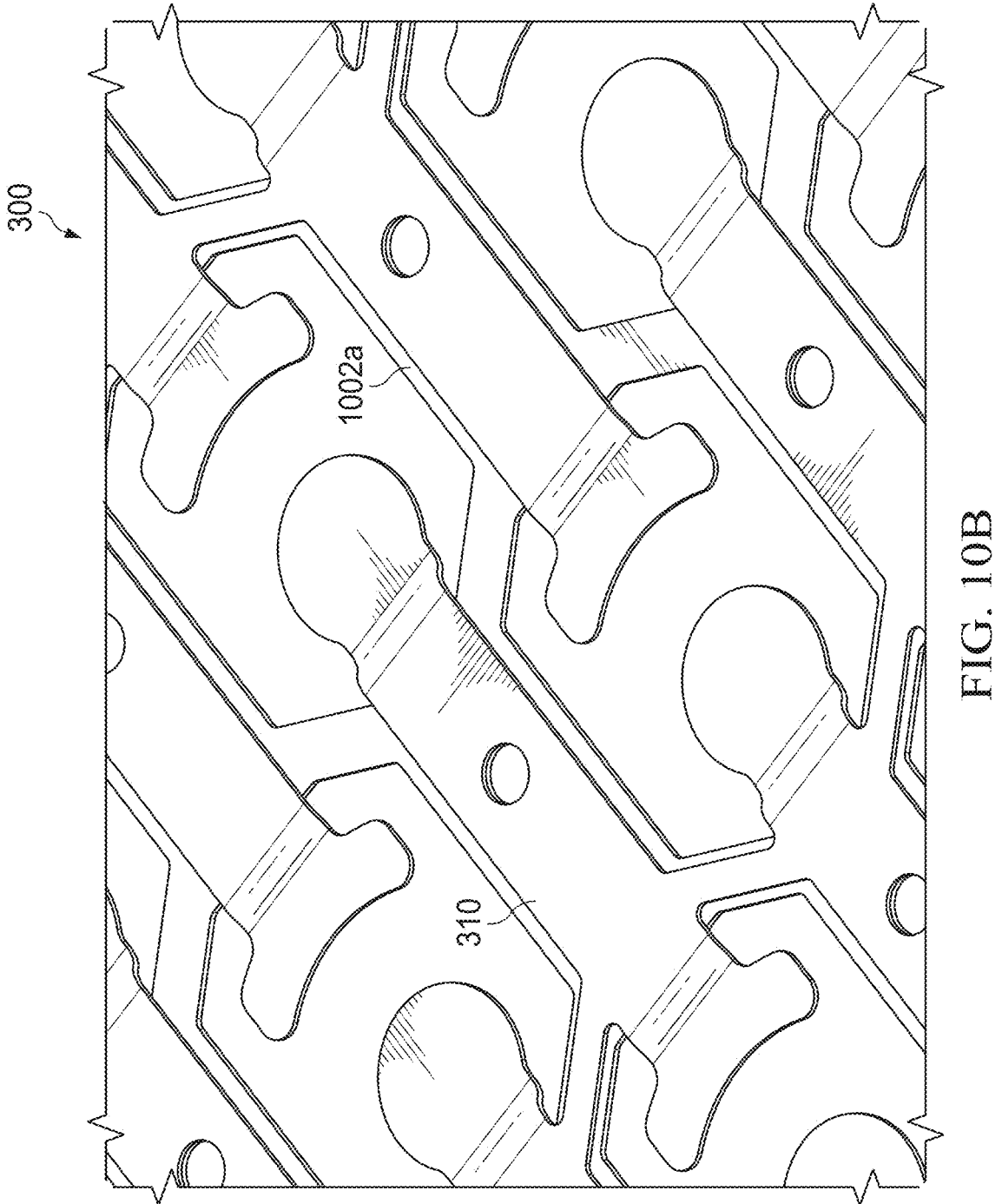
Figure 10C:
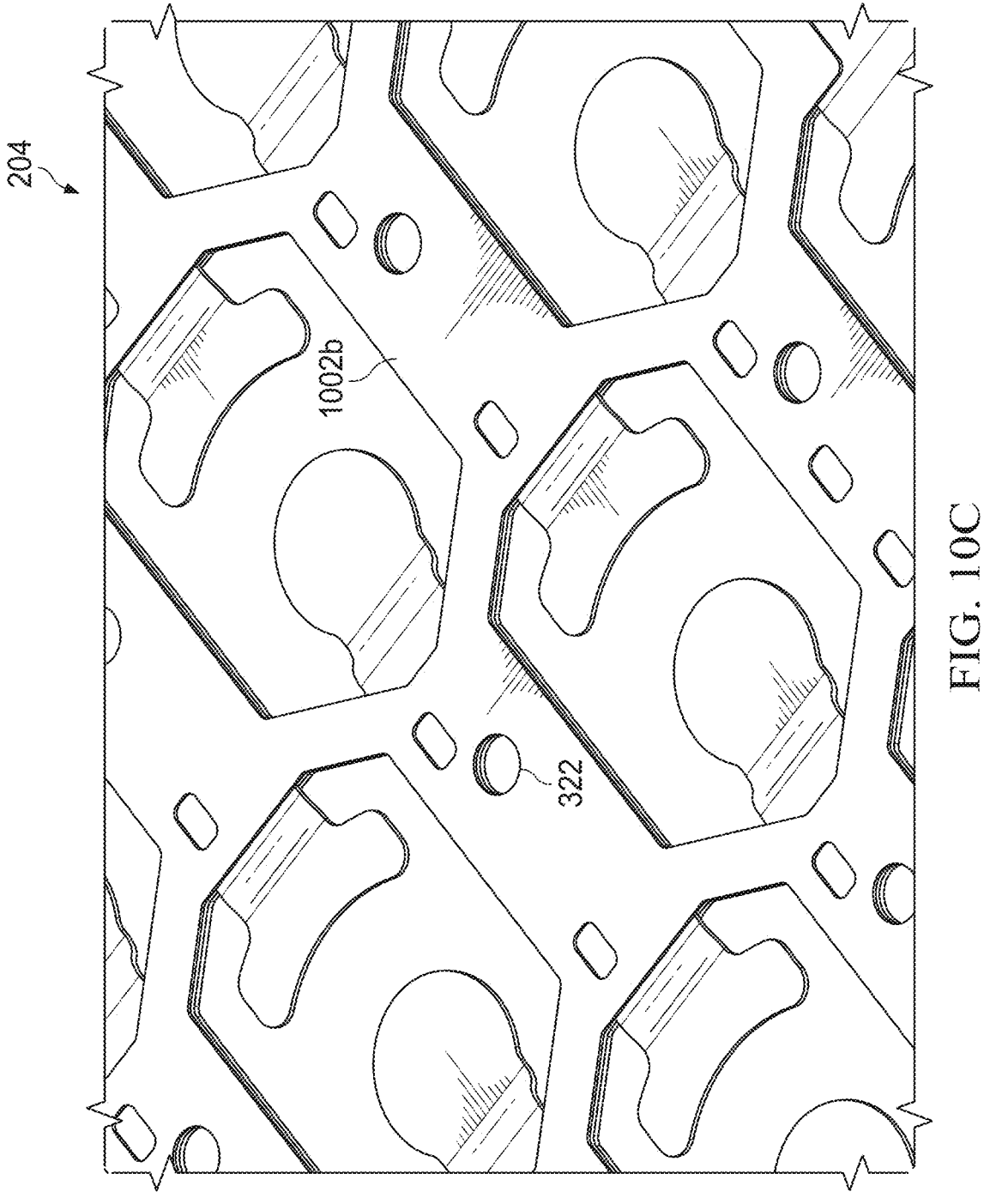

FIGS. 10A through 10C illustrate an example technique for forming a conductive interconnect layer 204 of an interconnect assembly 100 according to this disclosure. While the technique here is described as being used to form the conductive interconnect layer 204, the same type of technique may be used to form the conductive interconnect layer 204' (although different techniques may be used if needed or desired).

As shown in FIGS. 10A through 10C, the conductive layer 300 can be sandwiched or otherwise positioned between a first insulative layer 1002a and a second insulative layer 1002b to form the conductive interconnect layer 204. Each insulative layer 1002a-1002b may be formed from any suitable electrically-insulative material, such as one or more plastics like a polycarbonate. Each insulative layer 1002a-1002b may also be formed in any suitable manner, such as die stamping. In addition, the conductive layer 300 may be attached to one or more of the insulative layers 1002a-1002b, such as by using pressure-sensitive or other adhesive, or the layers 300 and 1002a-1002b may simply be stacked so that the conductive layer 300 is positioned between the insulative layers 1002a-1002b. In some embodiments, the openings 322 may be formed through both the insulative layers 1002a-1002b and the conductive layer 300 to help align the various layers 300 and 1002a-1002b.

Although FIGS. 10A through 10C illustrate one example of a technique for forming a conductive interconnect layer 204 of an interconnect assembly 100, various changes may be made to FIGS. 10A through 10C. For example, the form of the conductive interconnect layer 204 can vary based on the specific interconnections needed to form specific electrical paths through a specified number of batteries 104.

FIGS. 11A through 11F illustrate an example mechanism for electrically isolating a conductive interconnect layer 204 from batteries 104 (except through defined interconnects 312-316) according to this disclosure. While the mechanism here is described as being used in the sub-module 102a, the same type of mechanism may be used in the sub-module 102b (although different sub-modules may use different mechanisms if needed or desired).

Figure 11A:
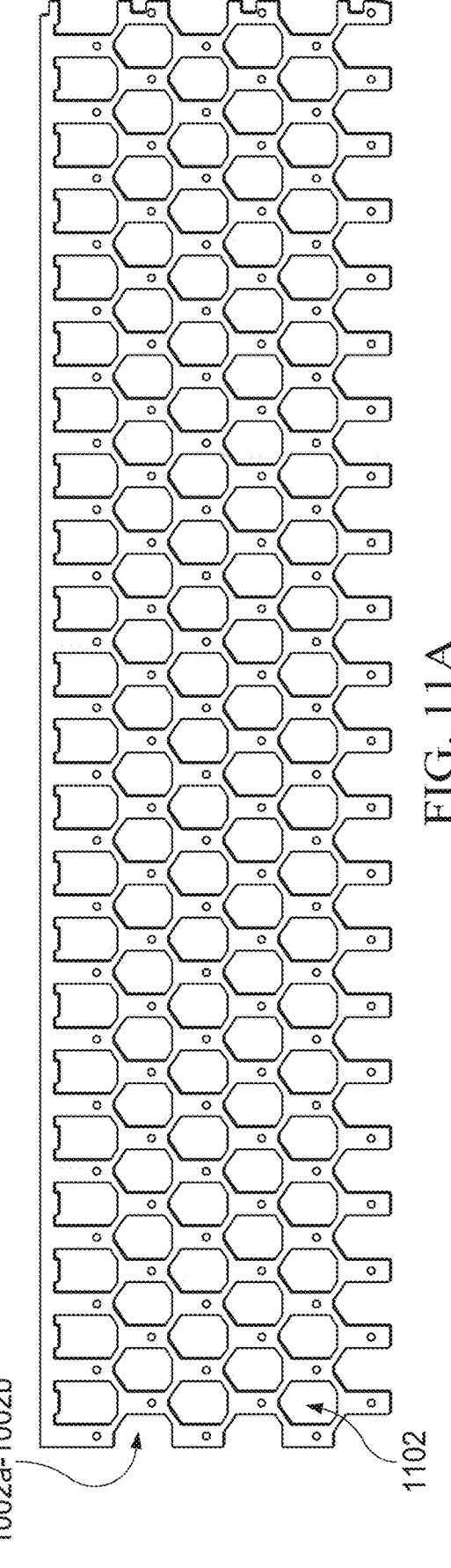
FIGS. 11A through 11F illustrate an example mechanism for electrically isolating a conductive interconnect layer from batteries (except through defined interconnects) according to this disclosure.
Figure 11B:
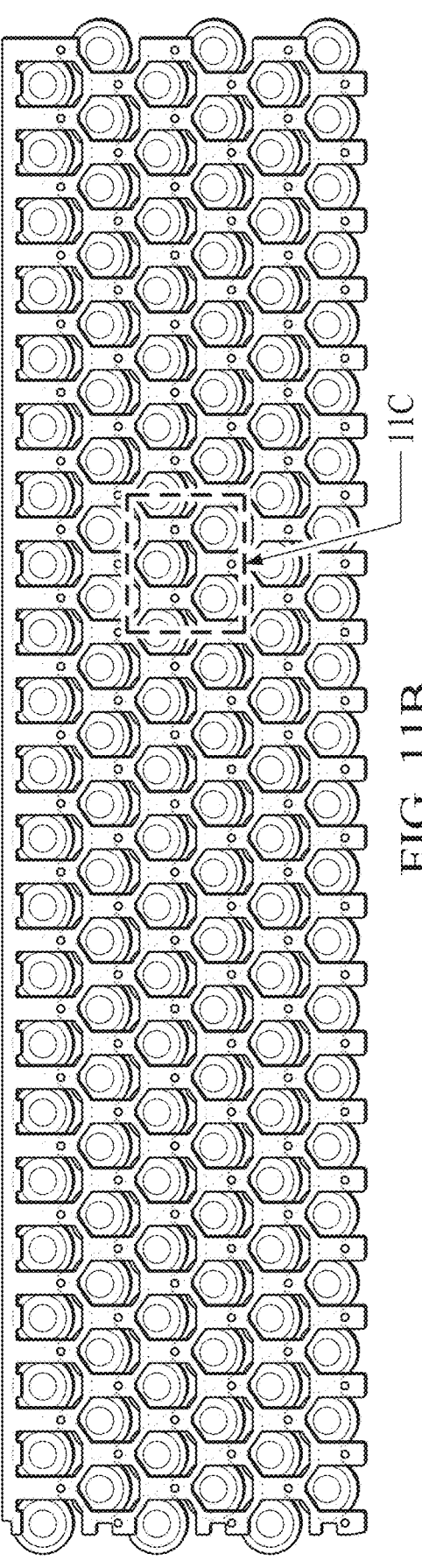
Figure 11C:
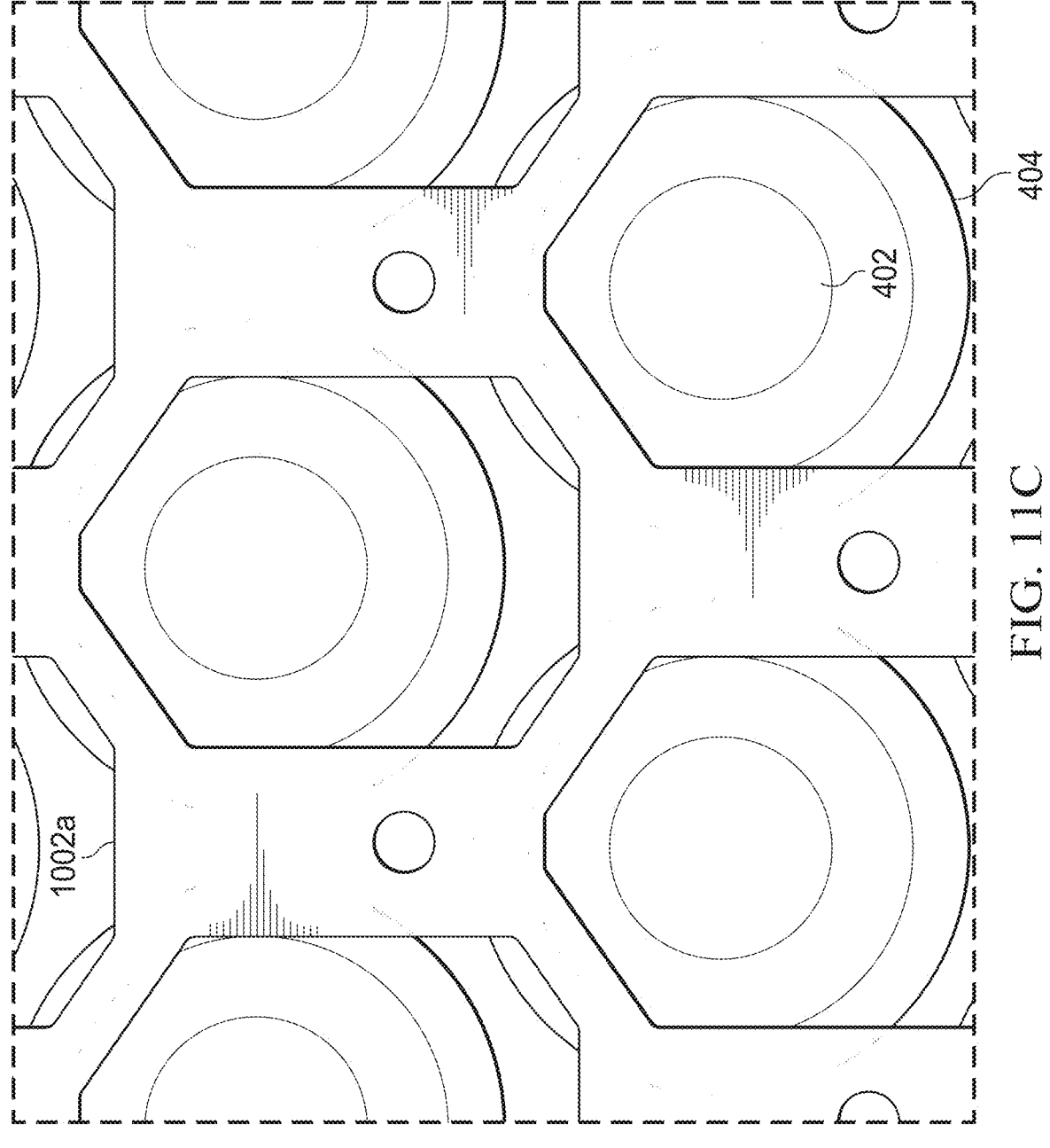
Figure 11D:
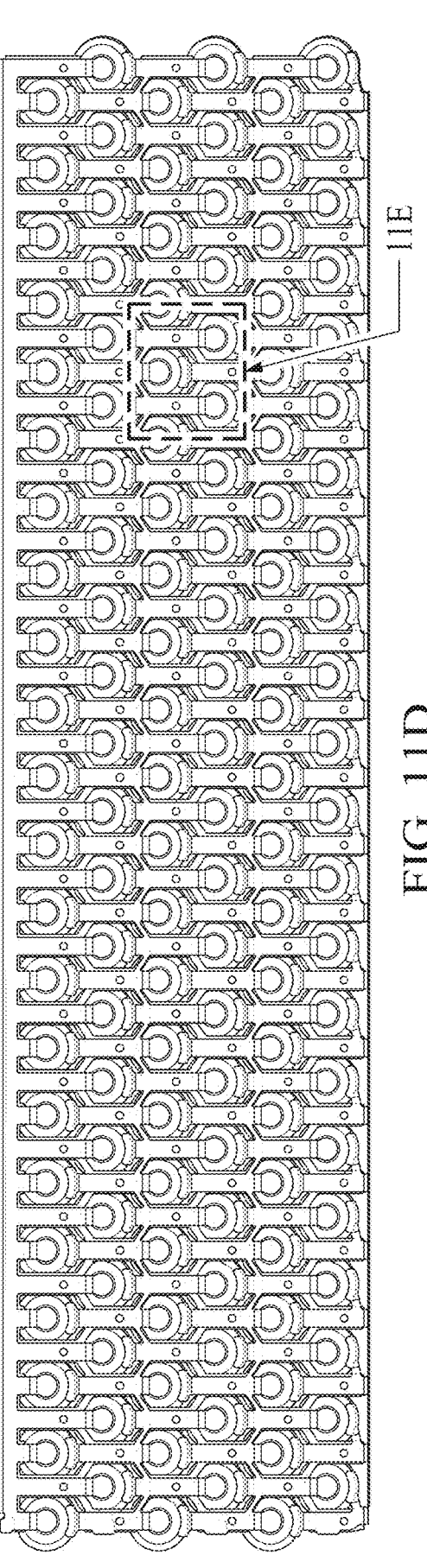
Figure 11E:
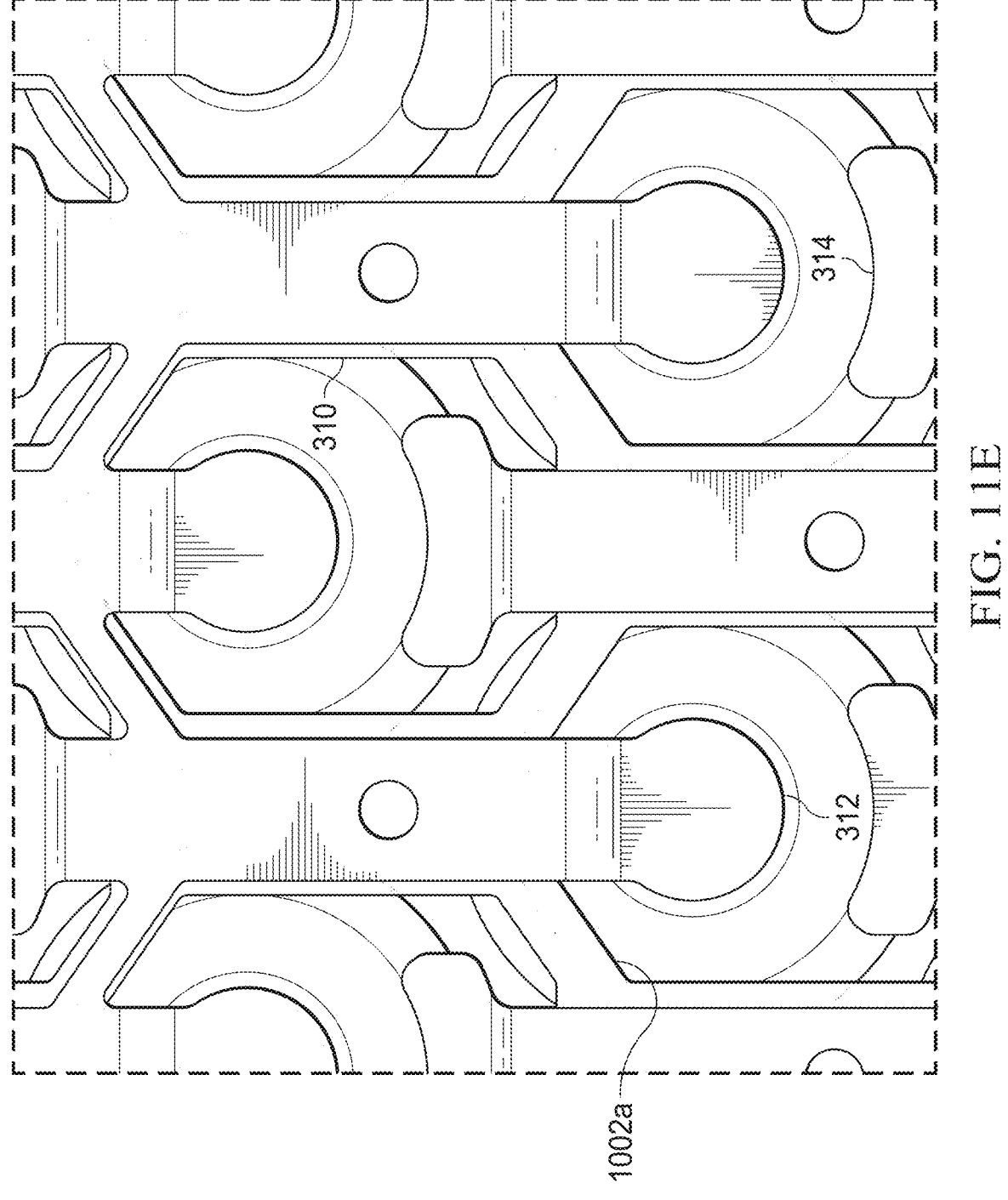

As shown in FIG. 11A, each of the insulative layers 1002a-1002b includes a number of hexagonal, honeycomb, or other openings 1102. Each opening 1102 is configured to reveal a portion of a battery 104. As shown in FIGS. 11B through 11E, the insulative layer 1002a physically separates the series connectors 310 from the batteries 104. This helps to hold the series connectors 310 above the batteries 104 so that the conductive interconnect layer 204 does not form undesired electrical connections to the batteries 104. Instead, electrical connections between the series connectors 310 and the batteries 104 are formed using the interconnects 312-316, which extend from the series connectors 310 to the batteries 104. As can be seen in FIGS. 11B through 11E, the insulative layer 1002a may cover portions of the anodes 404 of various batteries 104, which again can help to avoid undesired electrical connections to the batteries 104. In FIGS. 11D and 11E, the insulative layer 1002b has been omitted so that the positions of the series connectors 310 can be seen.

In some cases, the insulative layers 1002a-1002b may be formed from an optically transparent or semi-transparent material, which may allow the portions of the batteries 104 under the insulative layers 1002a-1002b to remain at least partially visible. This may be useful in various applications, such as to aid with quality control or other operations involving the relative positions of the insulative layers 1002a-1002b and the series connectors 310. As a particular example, optical comparators or other vision systems may be used to help ensure proper electrical isolation overlap is achieved for a given operating voltage.

Note that while being constructed of foil or other thin layer of conductive material, the conductive layer 300 of the conductive interconnect layer 204 is able to avoid excessive Joule heating due to relatively low current densities afforded by the design of the interconnect assembly 100. More specifically, each of the series connectors 310 may only be required to transport an electrical current over a short distance between two batteries 104 or a short distance between one battery 104 and one connecting conductor 320a or 320b. While the balancing conductors 318 may allow small amounts of electrical current to be shared among multiple series connectors 310, this will not cause excessive heating of those series connectors 310.

Figure 11F:
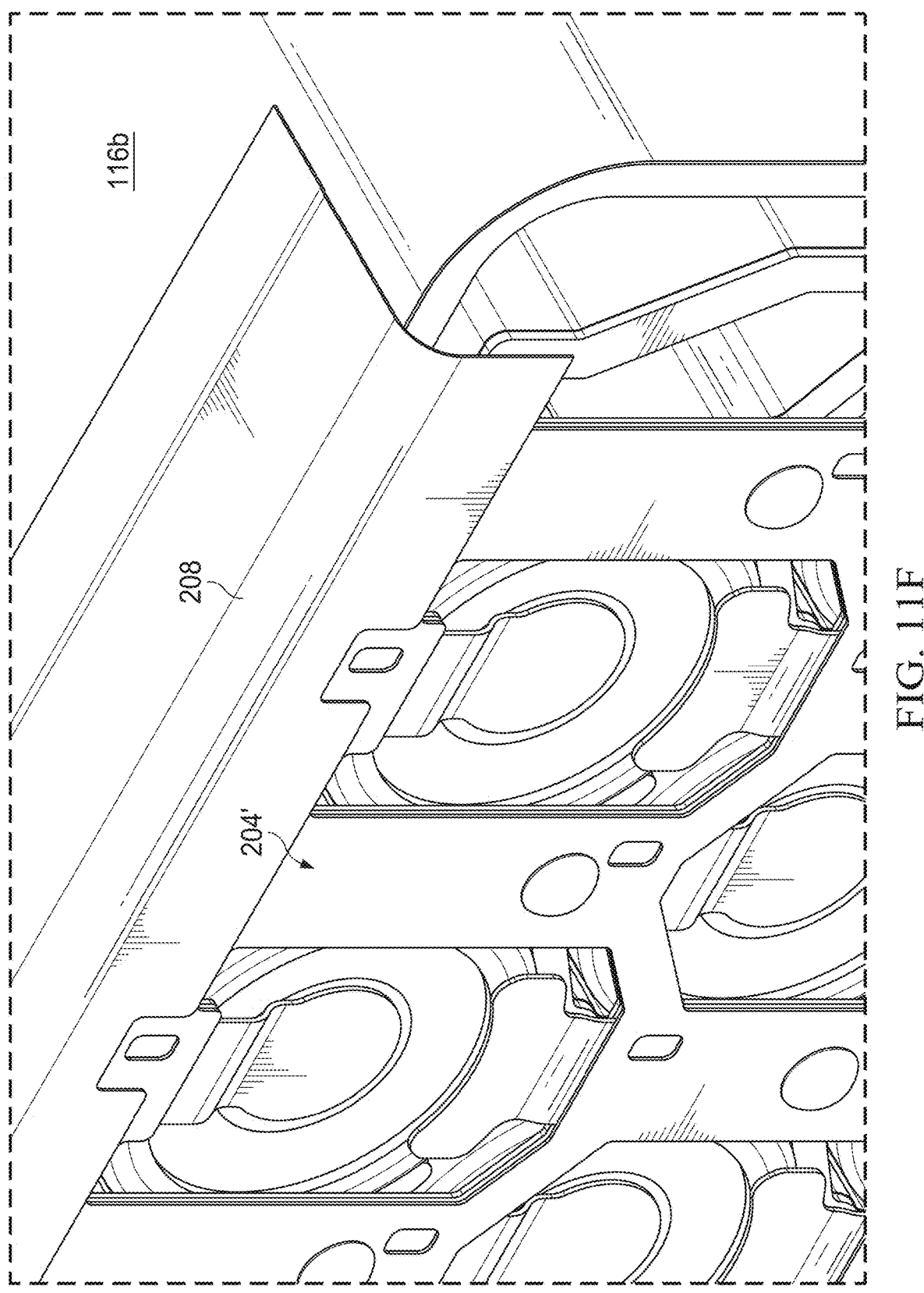

The terminal bars 116a-116b can carry currents for much larger numbers of batteries 104, but the terminal bars 116a-116b can easily be made wider and/or thicker in order to transport electrical currents without excessive heating. In some embodiments, each terminal bar 116a-116b may be formed from relatively thick material, such as a layer of aluminum that is about three millimeters thick. Also, in some embodiments, the terminal bars 116a-116b may be welded or otherwise attached to the connecting conductors 320a of the conductive structures 302 and 302' in the associated conductive interconnect layers 204 and 204'. As shown in FIG. 11F, a tape cover 210 may be placed over part of a terminal bar 116a-116b and part of the associated conductive interconnect layer 204 or 204' in order to provide protection and electrical isolation.

Although FIGS. 11A through 11F illustrate one example of a mechanism for electrically isolating a conductive interconnect layer 204 from batteries 104 (except through defined interconnects 312-316), various changes may be made to FIGS. 11A through 11F. For example, the openings 1102 of the conductive interconnect layer 204 may have one or more shapes other than hexagonal or honeycomb.

FIGS. 12A through 12D illustrate an example sensor assembly 120a in an interconnect assembly 100 and example connections of the sensor assembly 120a according to this disclosure. Note that the sensor assembly 120b may have a similar design as that shown here, but the sensor assembly 120b may be a mirror image of the sensor assembly 120a shown in FIG. 12A for use with the sub-module 102b (although different sensor assemblies may use different designs if needed or desired).

Figure 12A:
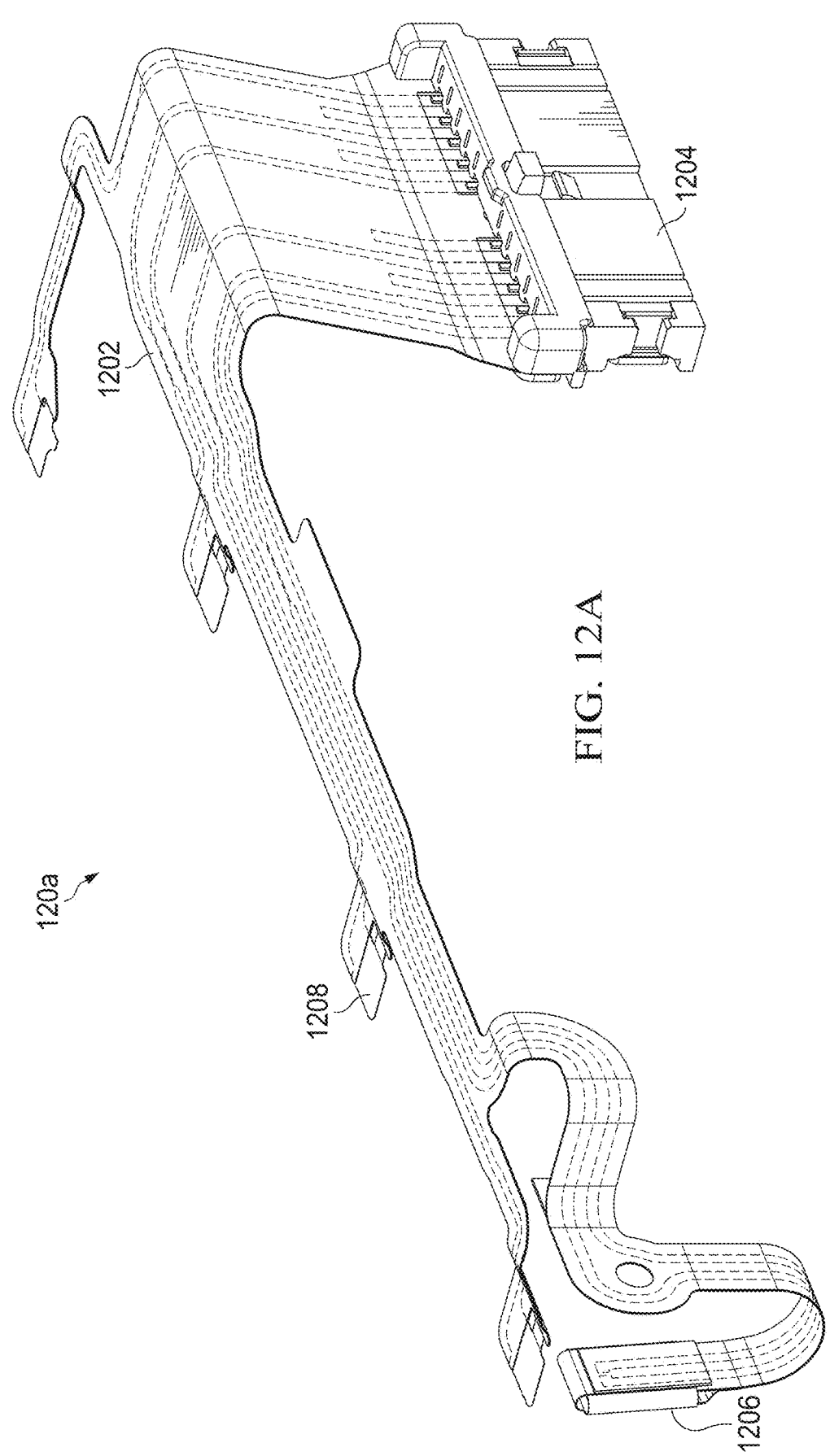
FIGS. 12A through 12D illustrate an example sensor assembly in an interconnect assembly and example connections of the sensor assembly according to this disclosure.

As shown in FIG. 12A, the sensor assembly 120a includes a ribbon cable 1202 and a connector 1204. The ribbon cable 1202 represents a flat structure that can carry wires and other components of the sensor assembly 120a. The connector 1204 represents an electrical interface between the sensor assembly 120a and the control board 118 or other device.

The ribbon cable 1202 is coupled to a thermistor 1206, which represents a resistor having a resistance that varies with temperature. The thermistor 1206 may be physically attached to or contact the side of a battery 104 as described below in order to sense the temperature of that battery 104. The ribbon cable 1202 is also coupled to multiple voltage contact points 1208, which represent double-sided exposed copper traces or other conductive structures that can be bonded or otherwise attached to various conductive tabs 324. Thus, the ribbon cable 1202 can be used to transport electrical signals between the control board 118 and the thermistor 1206/contact points 1208, which allows the control board 118 to obtain temperature and voltage measurements associated with the batteries 104.

Figure 12B:
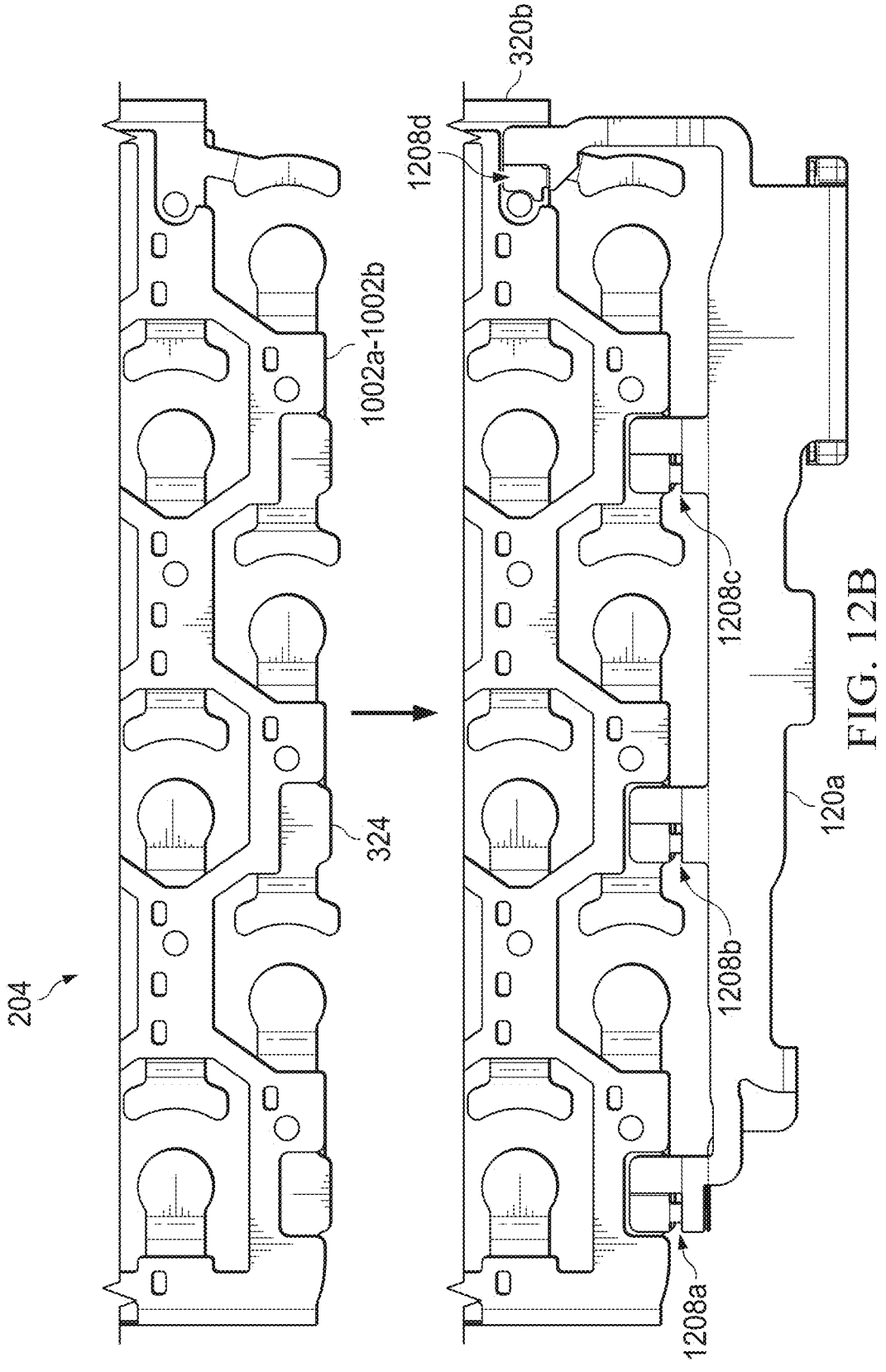

Example connections of the sensor assembly 120a to the conductive interconnect layer 204 are shown in FIG. 12B. In this example, the sub-module 102a includes three sets or "bricks" of batteries 104 (which are shown in FIGS. 5B through 5D), and the sensor assembly 120a includes three contact points 1208a-1208c that couple to three conductive tabs 324 of the conductive interconnect layer 204 (one for each brick of batteries 104). An additional contact point 1208d can be provided for positioning along the connecting conductor 320b of the conductive interconnect layer 204.

Figure 12C:
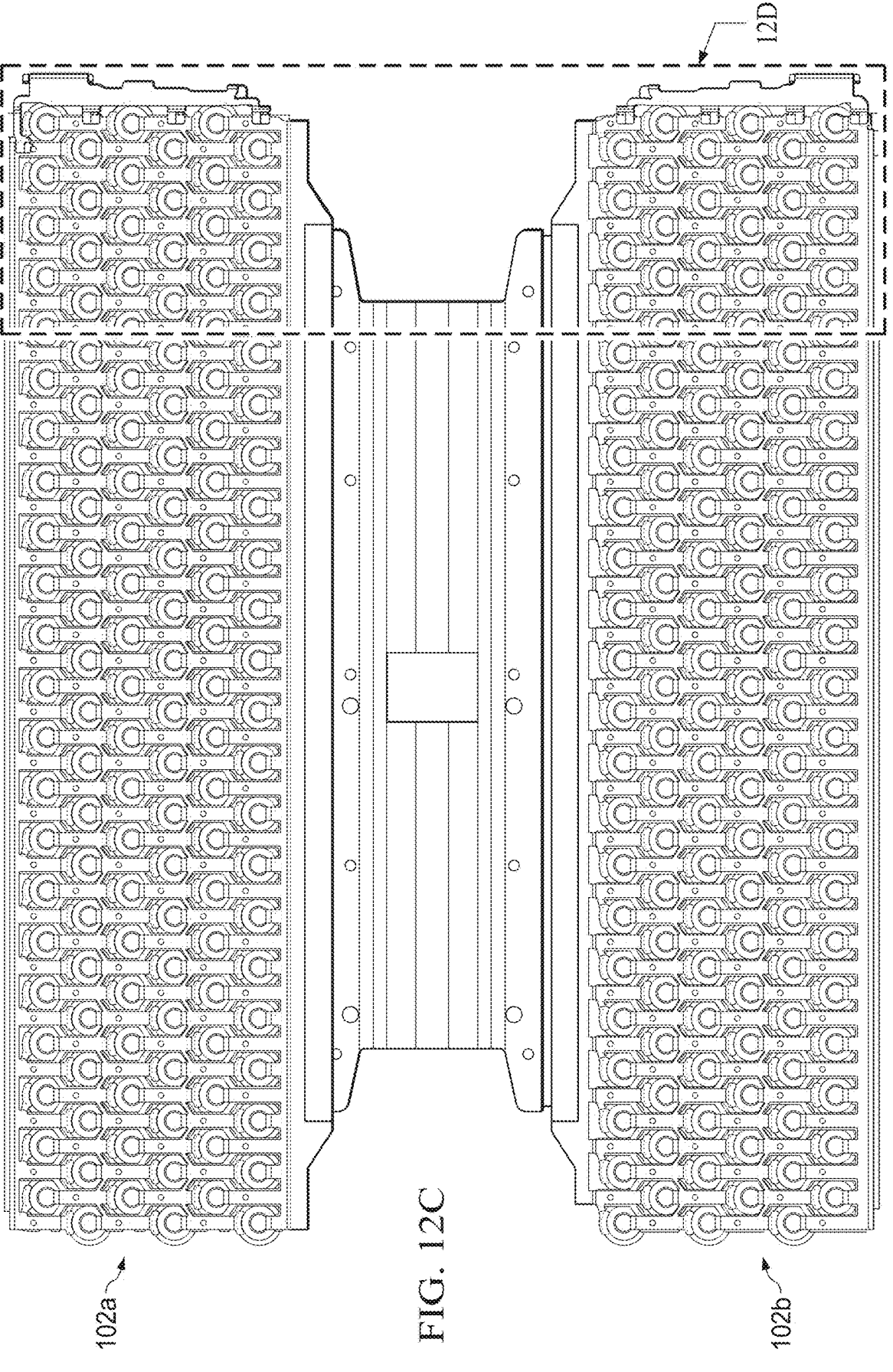
Figure 12D:
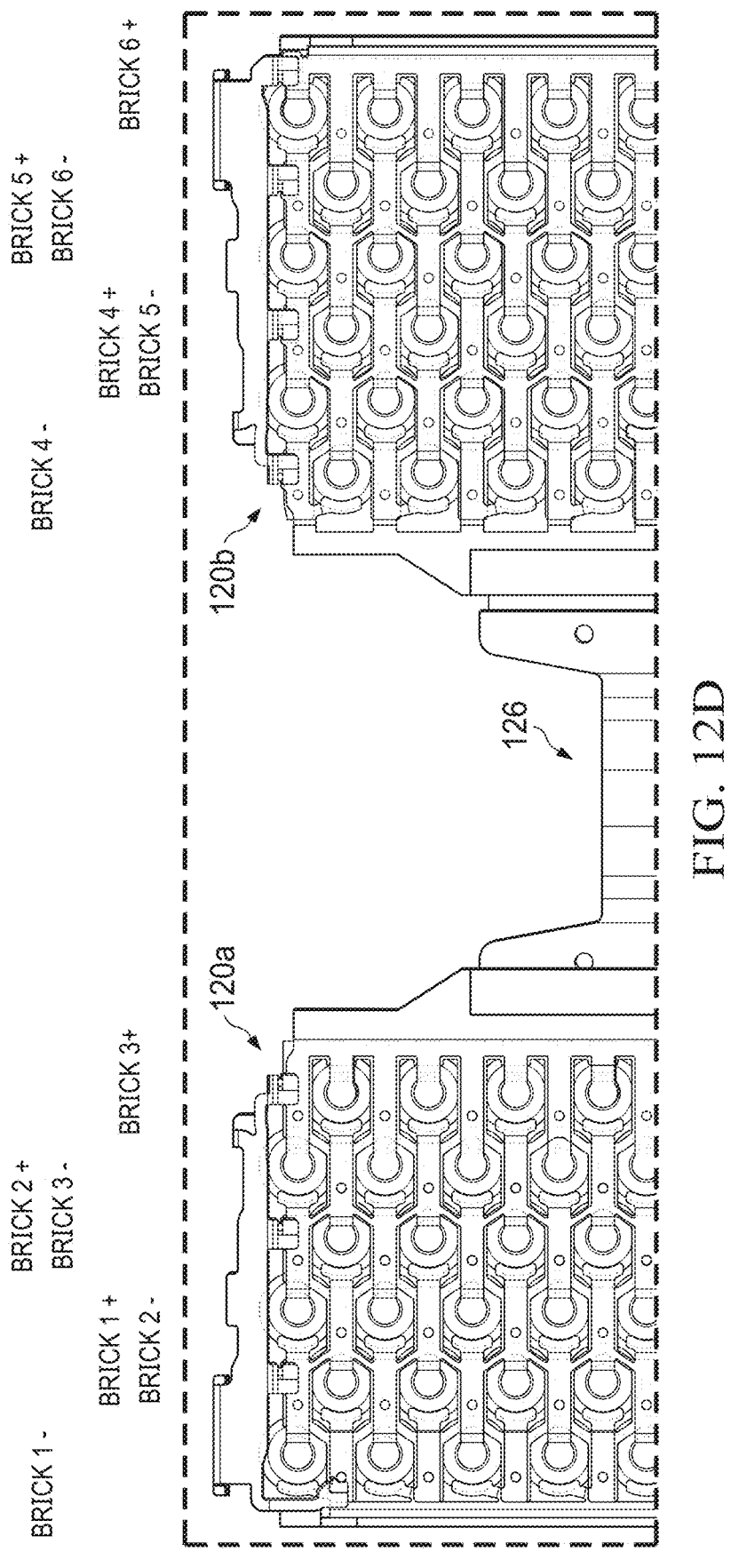

FIGS. 12C and 12D illustrate the connections of both sensor assemblies 120a-120b within the interconnect assembly 100 (assuming the interconnect assembly 100 is "unfolded" so that the sub-modules 102a-102b and the hot plate electrical connector 126 are arranged linearly for ease of illustration). Note that the "Brick 3+" and "Brick 4 −" voltage taps may essentially be redundant since those voltage taps are electrically connected by the hot plate electrical connector 126 without any additional batteries 104 between those voltage taps. Thus, in some cases, one of these voltage taps may be omitted or ignored. In other cases, this redundancy may be useful for detecting certain types of faults or other problems in the interconnect assembly 100, and both voltage taps may be used.

In some embodiments, each sensor assembly 120a-120b may be fabricated as a flexible printed circuit (FPC). The flat profiles of the flexible printed circuits, as well as the micron-scale thickness of their materials, add little mass to the overall assembly and provide versatility for packaging. Also, the flexibility of this design allows a portion of each sensor assembly 120a-120b containing the thermistor 1206 to be bent as shown and make contact directly with an outer surface of a battery 104.

Although FIGS. 12A through 12D illustrate one example of a sensor assembly 120a in an interconnect assembly 100 and one example of connections of the sensor assembly 120a, various changes may be made to FIGS. 12A through 12D. For example, each sensor assembly 120a-120b may include any desired number of thermistors and any desired number of voltage contact points. Also, nothing prevents a single sensor assembly that wraps partially or completely around the interconnect assembly 100 from being used.

FIGS. 13A through 13E illustrate an example mechanism for installing a thermistor 1206 of a sensor assembly 120a-120b on a battery 104 in an interconnect assembly 100 according to this disclosure. While the mechanism here is described as being used in the sub-module 102a, the same type of mechanism may be used in the sub-module 102b (although different sub-modules may use different mechanisms if needed or desired).

Figure 13A:
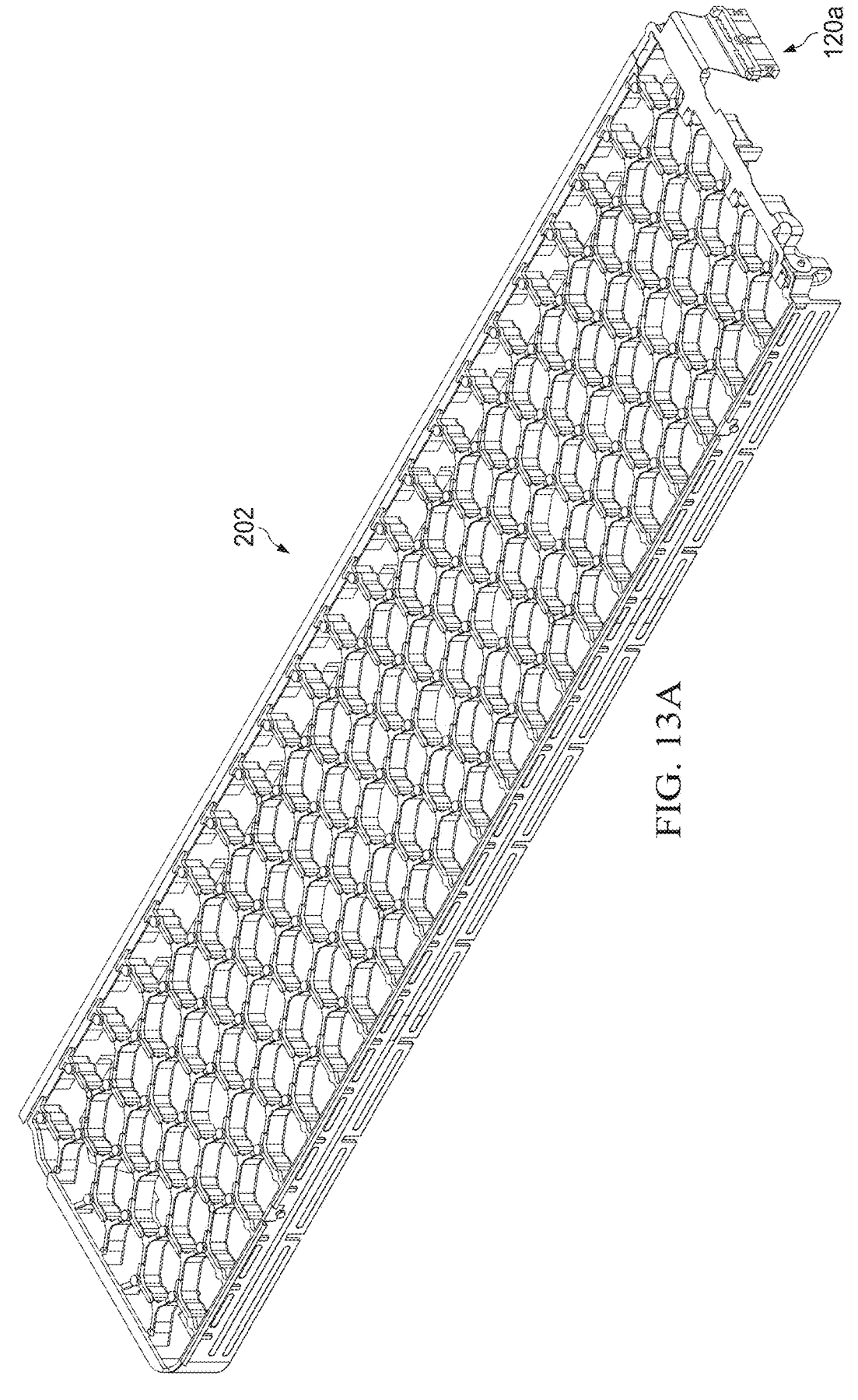
FIGS. 13A through 13E illustrate an example mechanism for installing a thermistor of a sensor assembly on a battery in an interconnect assembly according to this disclosure.
Figure 13C:
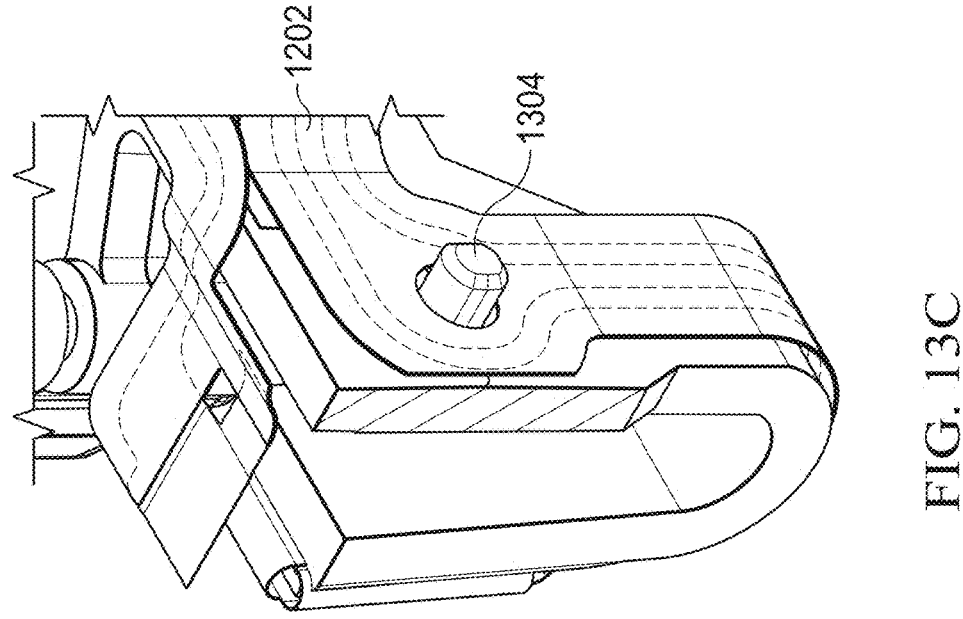
Figure 13B:
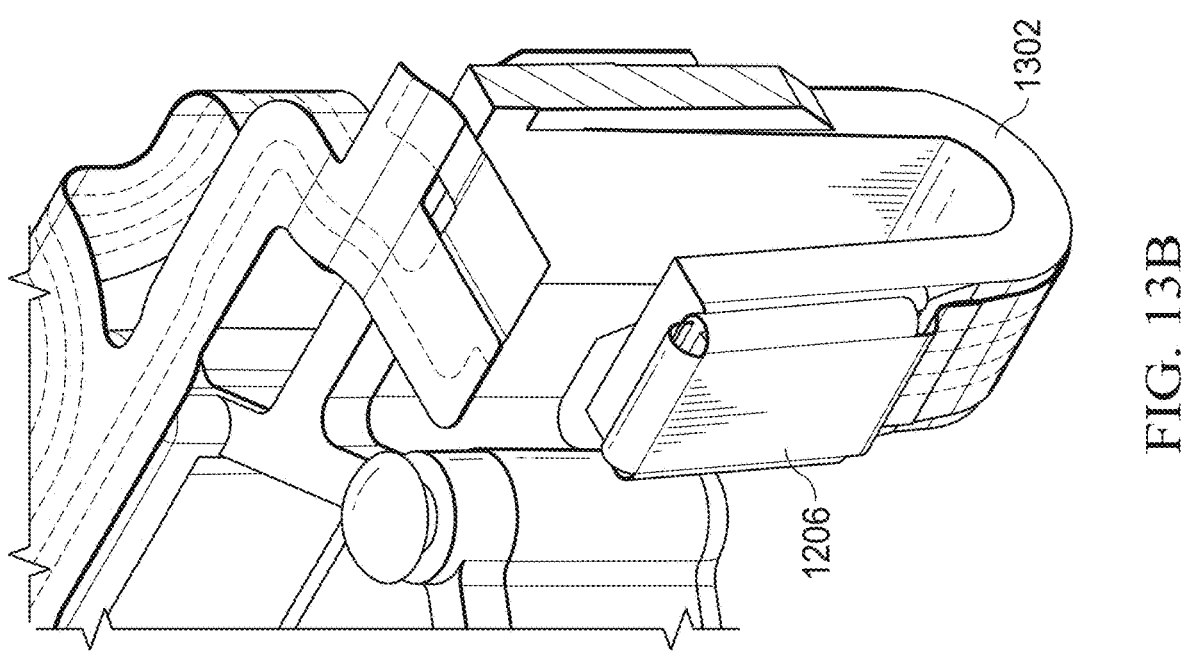

As shown in FIGS. 13A through 13C, a portion of the sensor assembly 120a can be placed around a curved projection 1302 (such as a U-shaped or J-shaped projection) extending from the interconnect retainer 202. If desired, an opening in the ribbon cable 1202 may receive a pin 1304 extending from a side of the curved projection 1302. In some cases, the thermistor 1206 or other portion(s) of the sensor assembly 120a may be held in place on the curved projection 1302 using a pressure-sensitive adhesive or other adhesive.

Figure 13D:
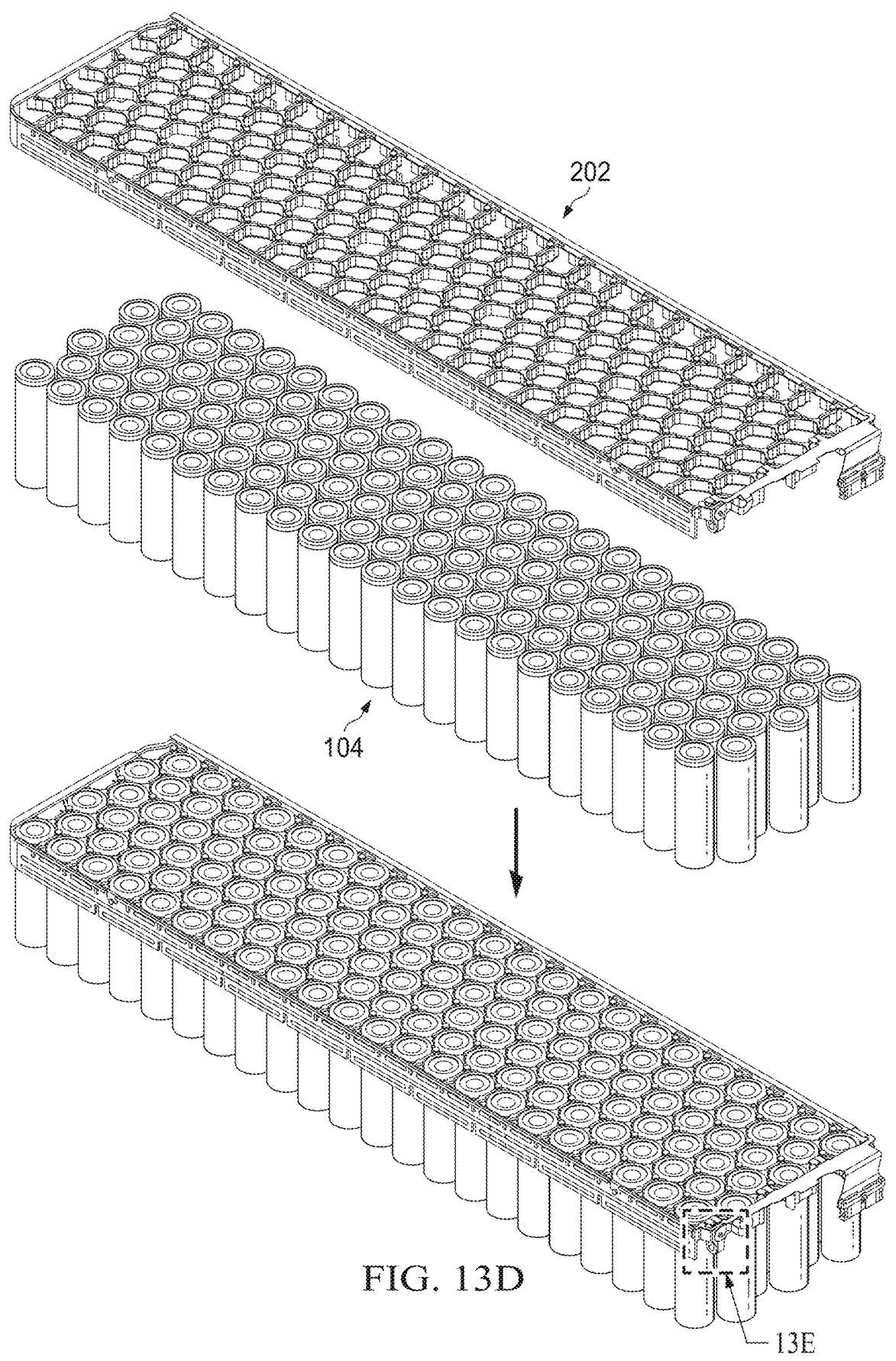
Figure 13E:
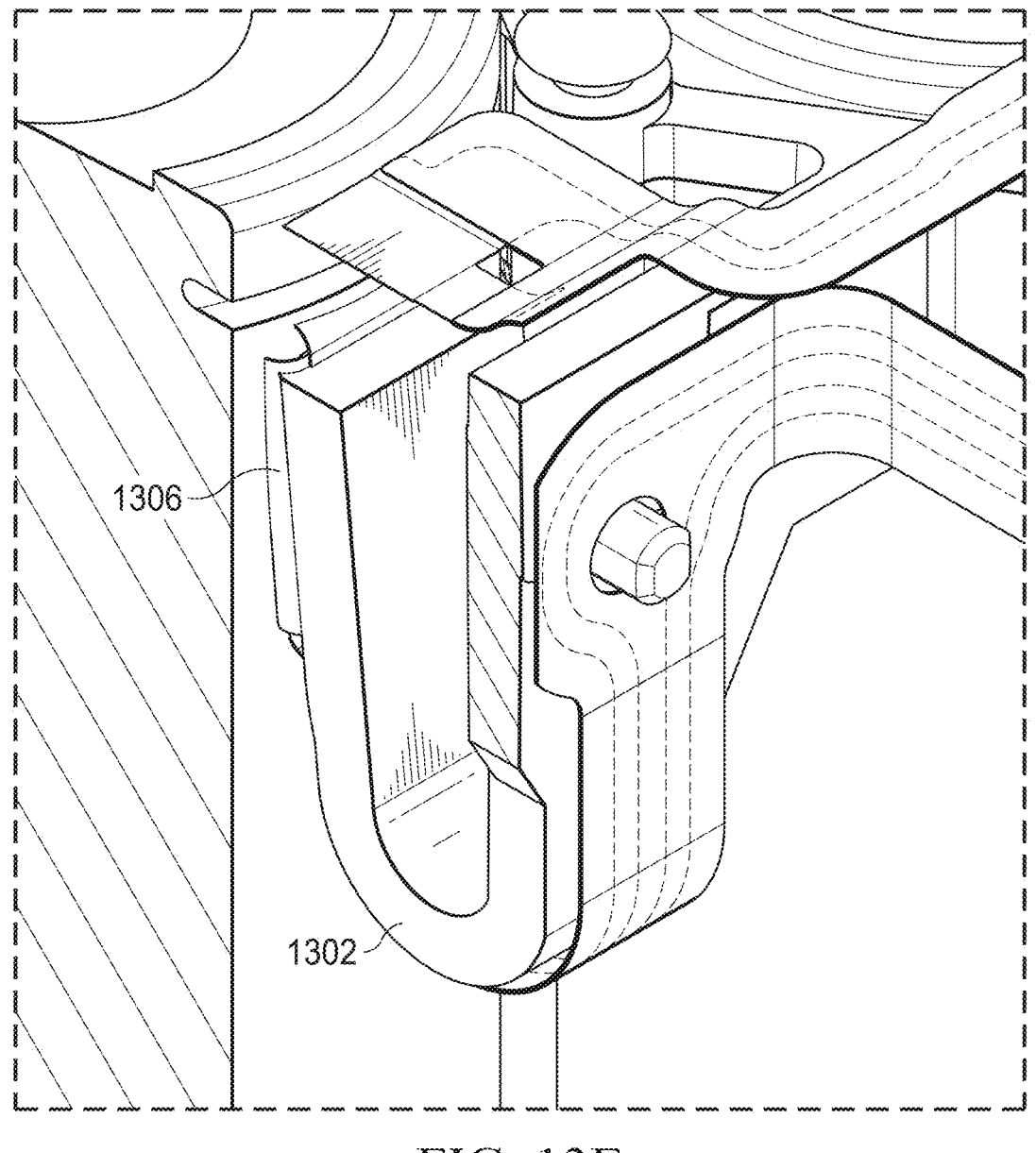

As shown in FIGS. 13D and 13E, the curved projection 1302 of the interconnect retainer 202 can function as a spring and push the thermistor 1206 into the side of a battery 104. A thermal pad 1306 may optionally be positioned between the thermistor 1206 and the battery 104, where the thermal pad 1306 is formed of a thermally-conductive material. The thermal pad 1306 can increase the cross-sectional area available for heat transfer and improve thermal conductivity between the thermistor 1206 and the battery 104. In some embodiments, the interconnect retainer 202 is formed from plastic, which can experience stress relaxation over time (which can decrease the spring force applied by the curved projection 1302 against the thermistor 1206 and onto the battery 104). Among other things, the thermal pad 1306 may be useful here to compensate for the reduction in thermal conductivity caused by the relaxing spring pressure. In other embodiments, the interconnect retainer 202 or the curved projection 1302 may be formed from other material that does not suffer from stress relaxation.

Although FIGS. 13A through 13E illustrate one example of a mechanism for installing a thermistor 1206 of a sensor assembly 120a-120b on a battery 104 of an interconnect assembly 100, various changes may be made to FIGS. 13A through 13E. For example, any other suitable mechanism, such as pressure-sensitive or other adhesive, may be used to install a thermistor 1206 of a sensor assembly 120a-120b on a battery 104.

Figure 14A:
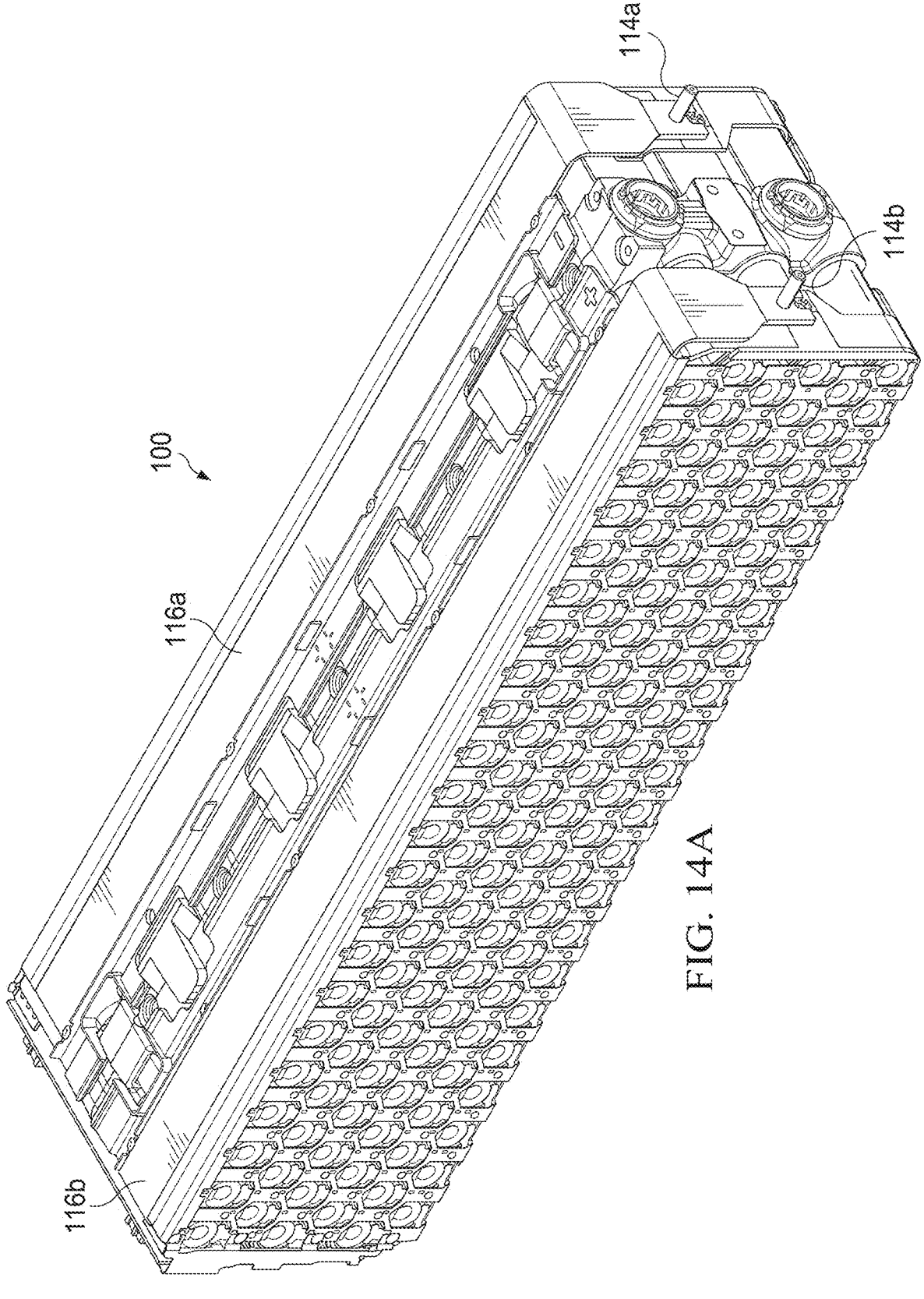
FIGS. 14A through 14C illustrate an example mechanism for coupling an interconnect assembly to a larger system according to this disclosure.
Figure 14B:
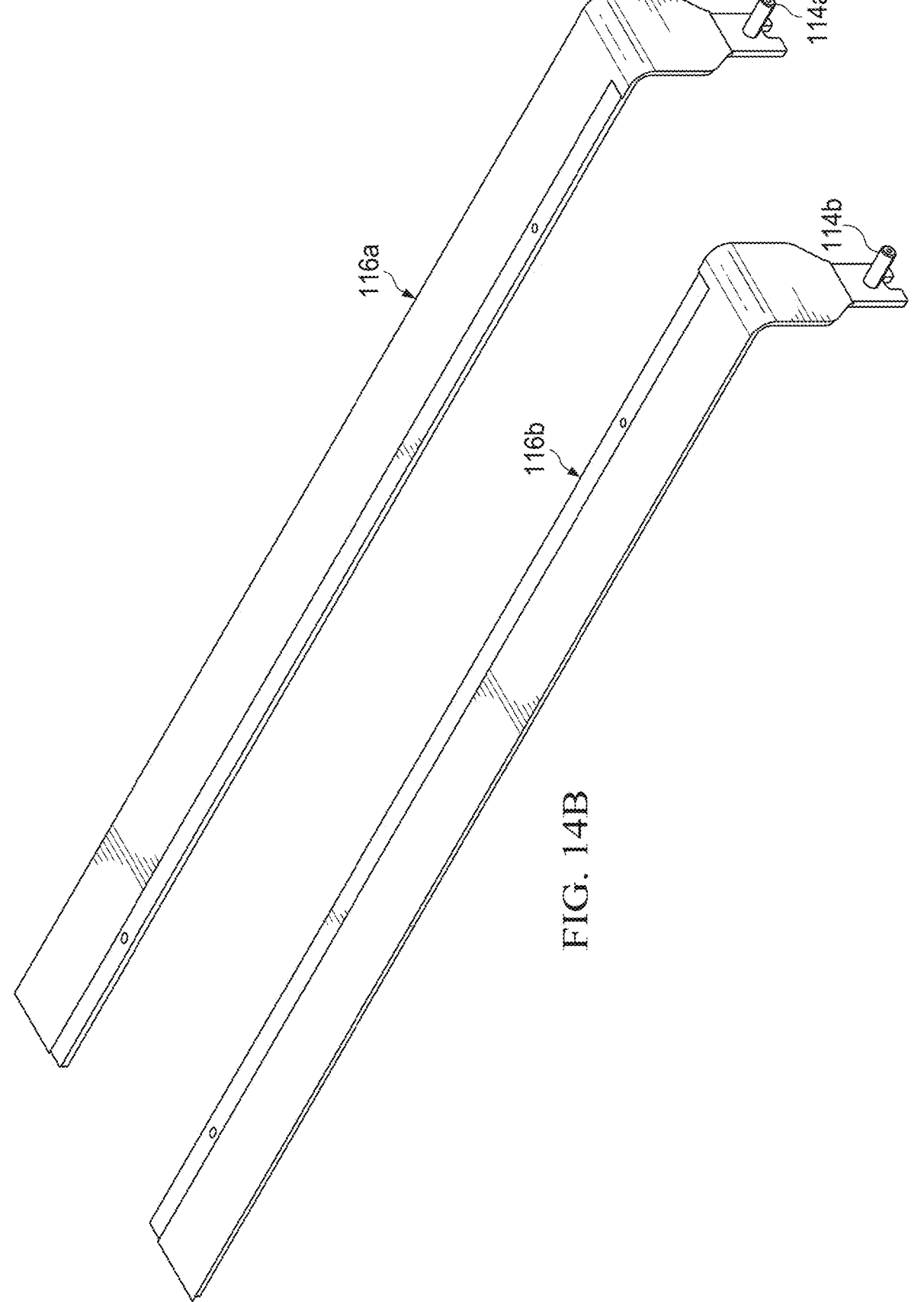
Figure 14C:
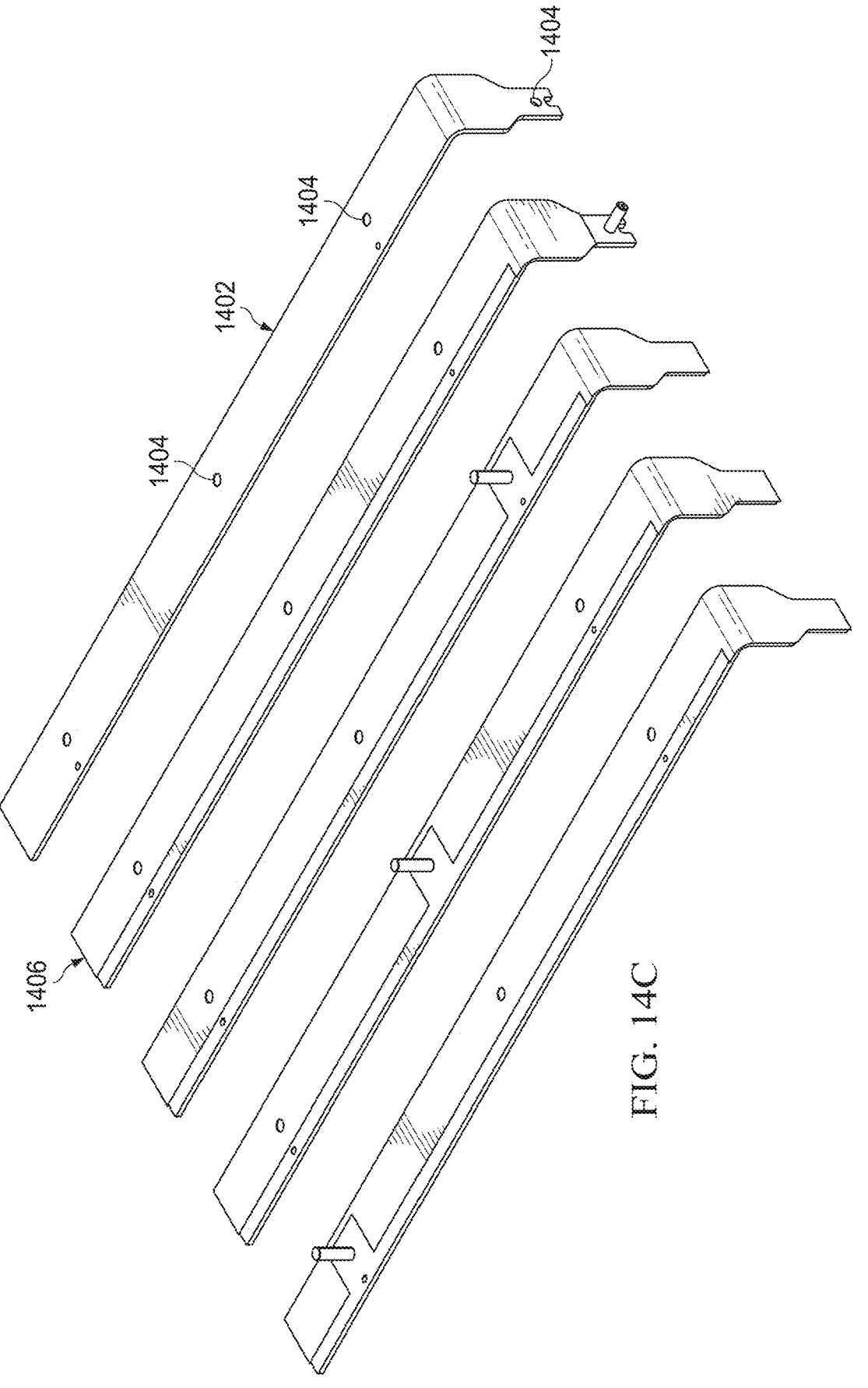

FIGS. 14A through 14C illustrate an example mechanism for coupling an interconnect assembly 100 to a larger system according to this disclosure. As described above, the terminal bars 116a-116b include or are coupled to the terminal connectors 114a-114b as shown in FIGS. 14A and 14B. In this design, the terminal bars 116a-116b can be suitably wide and/or thick to carry electrical currents to and from the terminal connectors 114a-114b and to provide adequate coupling points for external cables or other conductors. This approach eliminates the need for any extra parts or assemblies, other than the addition of the posts forming the terminal connectors 114a-114b. This helps to provide improved flexibility and reduced cost for the interconnect assembly 100.

This design also provides for quite a bit of flexibility in terms of locating the terminal connectors 114a-114b. Depending on the implementation, the terminal connectors 114a-114b may be located at any desired positions along the terminal bars 116a-116b. For example, as shown in FIG. 14C, a conductive portion 1402 of each terminal bar 116a-116b may be stamped or otherwise formed having multiple holes 1404, where each hole 1404 is configured to receive or otherwise be coupled to the corresponding terminal connector 114a-114b This allows the terminal connector 114a-114b to be positioned at multiple locations along the terminal bar 116a-116b. One or more insulative layers 1406 (such as insulative lamination) formed on one or more sides of the conductive portion 1402 of the terminal bar 116a-116b can vary as needed based on the actual location of the terminal connector 114a-114b. Note, however, that other embodiments of the terminal bars 116a-116b may lack multiple holes 1404.

Although FIGS. 14A through 14C illustrate one example of a mechanism for coupling an interconnect assembly 100 to a larger system, various changes may be made to FIGS. 14A through 14C. For example, each terminal bar 116a-116b may have any other suitable design, regardless of whether the terminal bars 116a-116b support one or multiple positions for the terminal connectors 114a-114b.

Figure 15A:
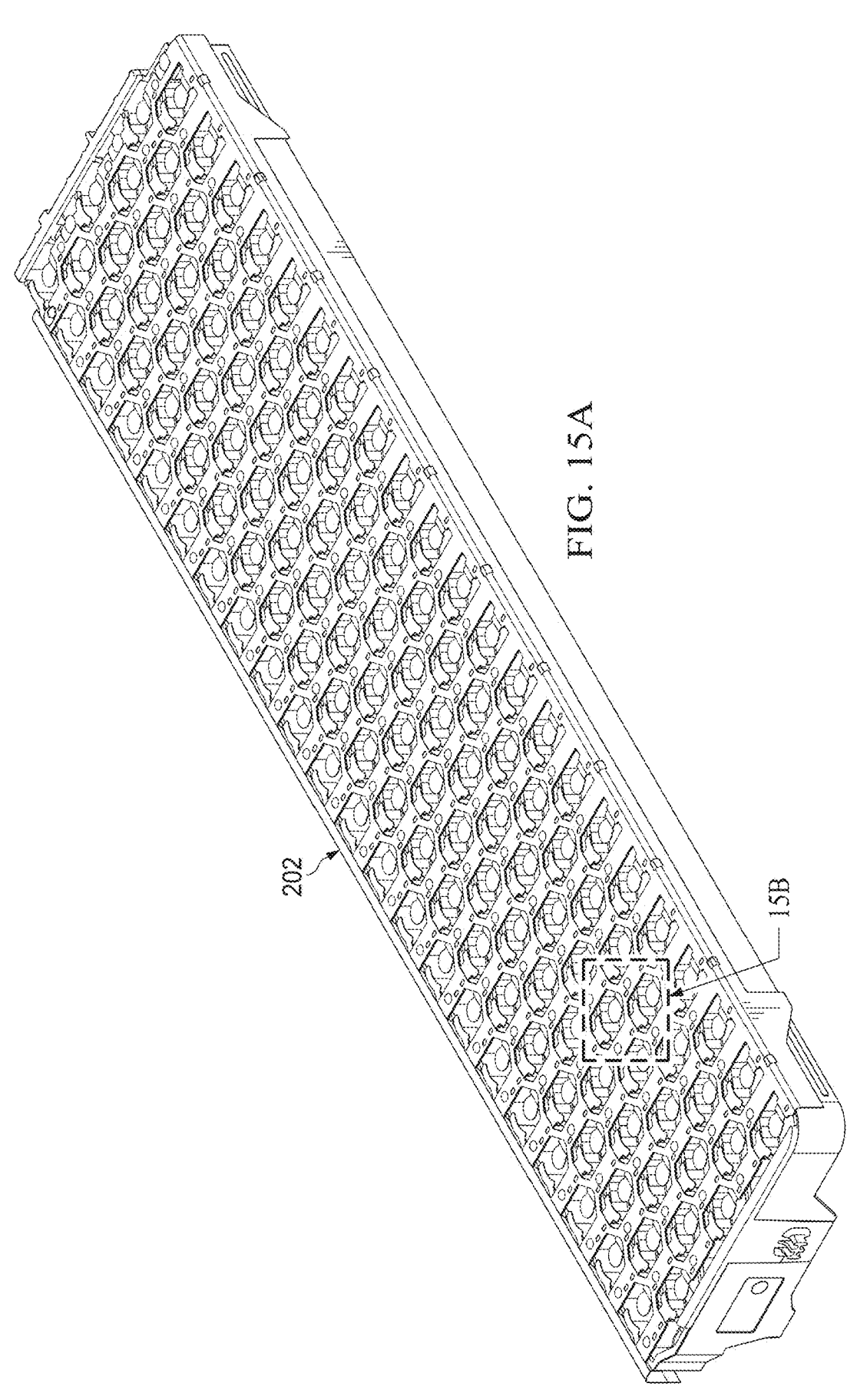
FIGS. 15A and 15B illustrate an example structural reinforcement for an interconnect assembly according to this disclosure.
Figure 15B:
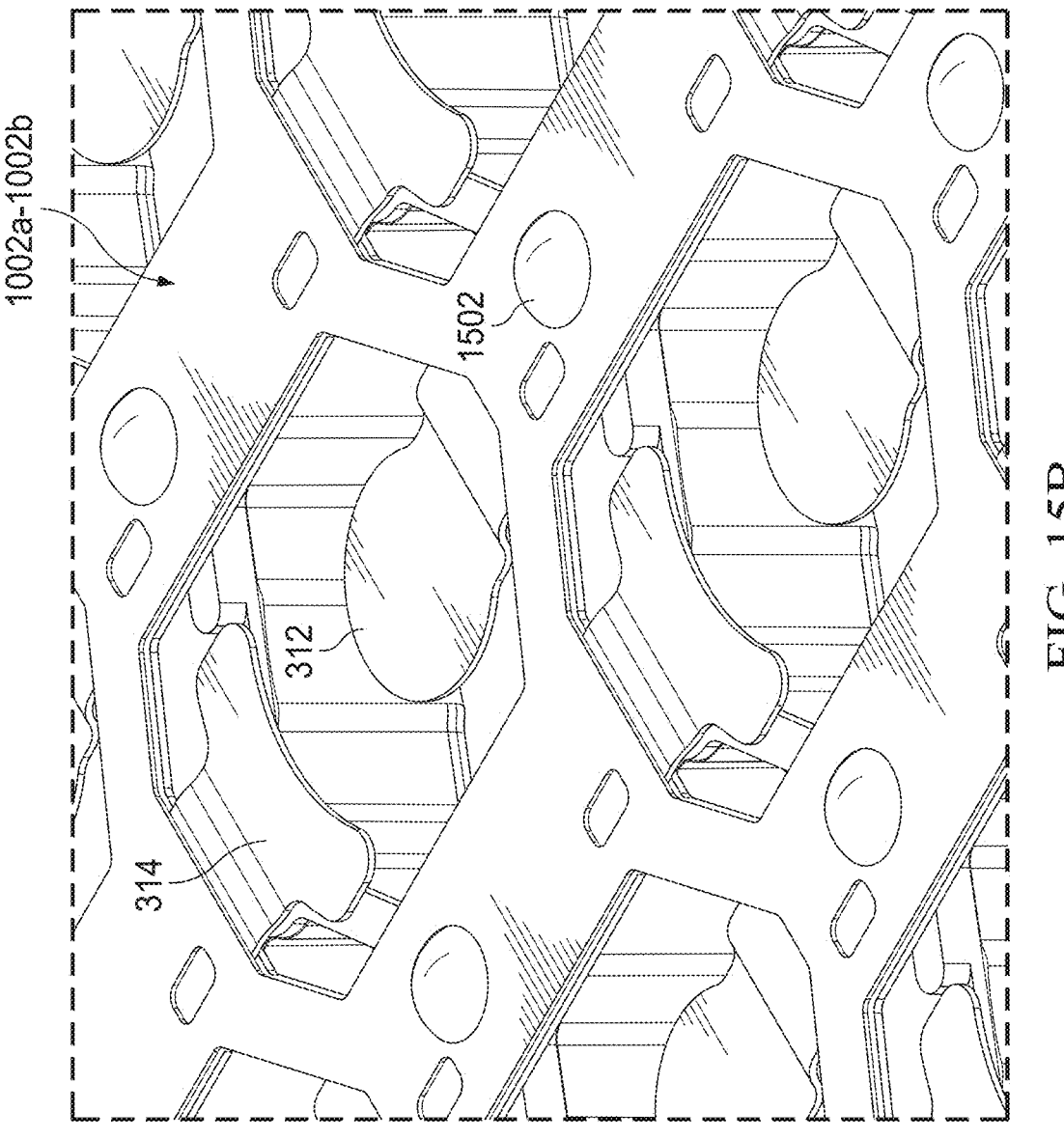

FIGS. 15A and 15B illustrate an example structural reinforcement for an interconnect assembly 100 according to this disclosure. As shown in FIGS. 15A and 15B, pins, screws, or other connectors 1502 can be passed through the openings 322 in the conductive interconnect layer 204 in order to secure the conductive interconnect layer 204 to the interconnect retainer 202. As can be seen in FIGS. 15A and 15B, this securely holds the conductive interconnect layer 204 in place, which allows the various interconnects 312-316 to be held securely in place. As a result, the various interconnects 312-316 can be bent downward in order to electrically contact and be physically coupled to the batteries 104. The connectors 1502 represent any suitable physical connections to the interconnect retainer 202. In some embodiments, the connectors 1502 represent plastic or other pins that can be deformed with heat, ultrasonic vibration, ultraviolet radiation, or other technique to form a domed head that restrains the conductive interconnect layer 204.

In addition to the structural reinforcement provided by the coupling of the conductive interconnect layer 204 to the interconnect retainer 202 (with a similar operation for the conductive interconnect layer 204' and the other interconnect retainer), the stiffening plates 122a-122b and 124a-124b can be attached along opposite sides of the interconnect assembly 100. The stiffening plates 122a-122b and 124a-124b can link the sub-modules 102a-102b to the coldplate 106, such as via structural adhesive joints, on either side of the interconnect assembly 100. Moving structural connections to the sides of the interconnect assembly 100 helps to reduce or avoid the need for widening spaces between the batteries 104 to fit structural components. This also reduces the need for precision application of adhesive in the adhesive layers 206 since the adhesive layers 206 are away from critical areas near the tops of the batteries 104.

Although FIGS. 15A and 15B illustrate one example of a structural reinforcement for an interconnect assembly 100, various changes may be made to FIGS. 15A and 15B. For example, other forms of structural reinforcement may be provided with or used by the interconnect assembly 100.

Figure 16A:
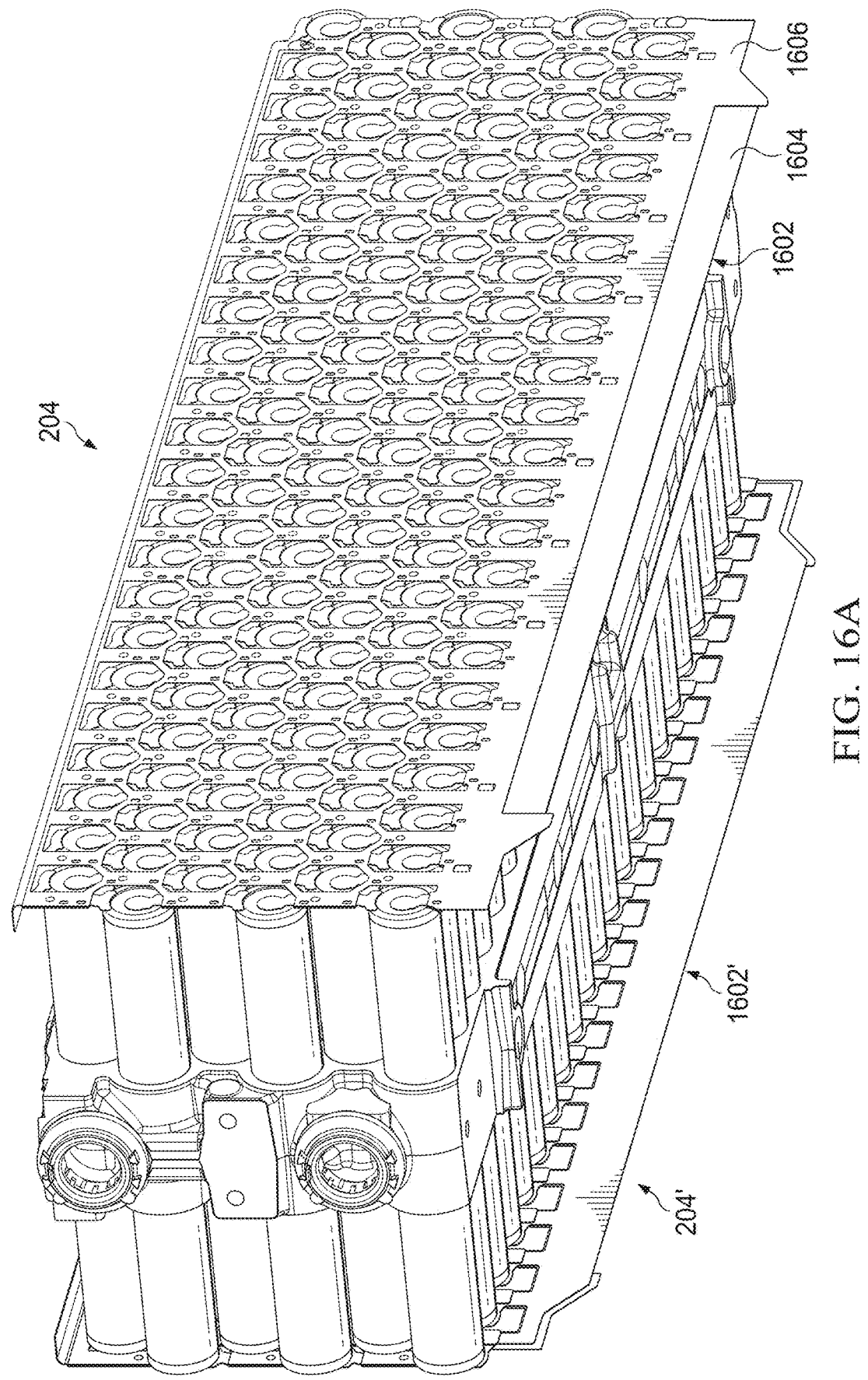
FIGS. 16A through 16F illustrate an example mechanism for coupling sub-modules of an interconnect assembly to a hot plate electrical connector of the interconnect assembly according to this disclosure.

FIGS. 16A through 16F illustrate an example mechanism for coupling sub-modules 102a-102b of an interconnect assembly 100 to a hot plate electrical connector 126 of the interconnect assembly 100 according to this disclosure. As shown in FIG. 16A, each of the conductive interconnect layers 204 and 204' may respectively include a coupling extension 1602 and 1602'. Each coupling extension 1602 and 1602' includes a conductive extension 1604, which may extend from or form a part of one of the connecting conductors 320b in the associated conductive layer 300 or 300'. Each coupling extension 1602 and 1602' also includes insulative extensions 1606, which may extend from or form a part of the insulative layers 1002a-1002b in the associated conductive interconnect layer 204 or 204'.

Figure 16B:
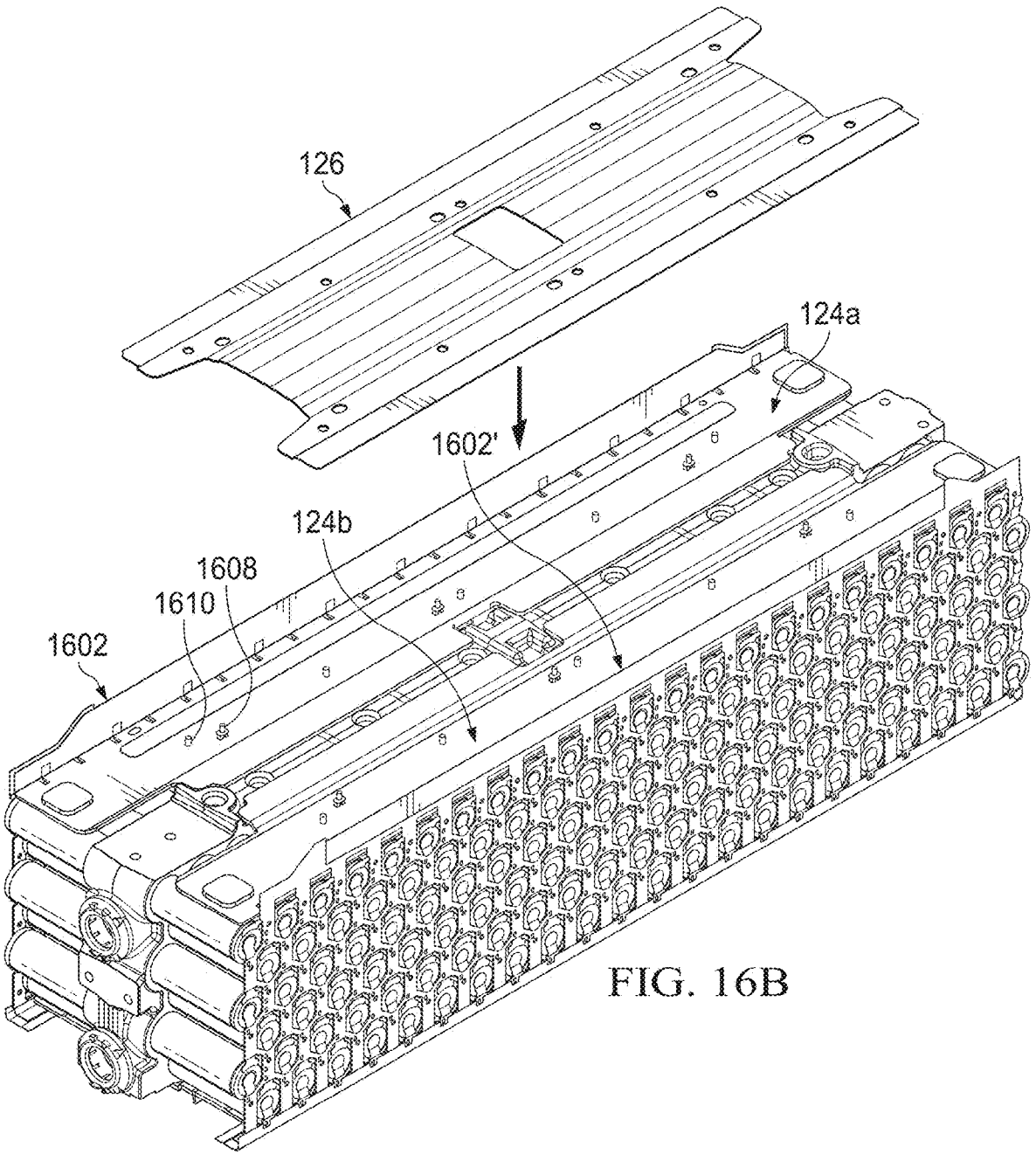
Figure 16C:
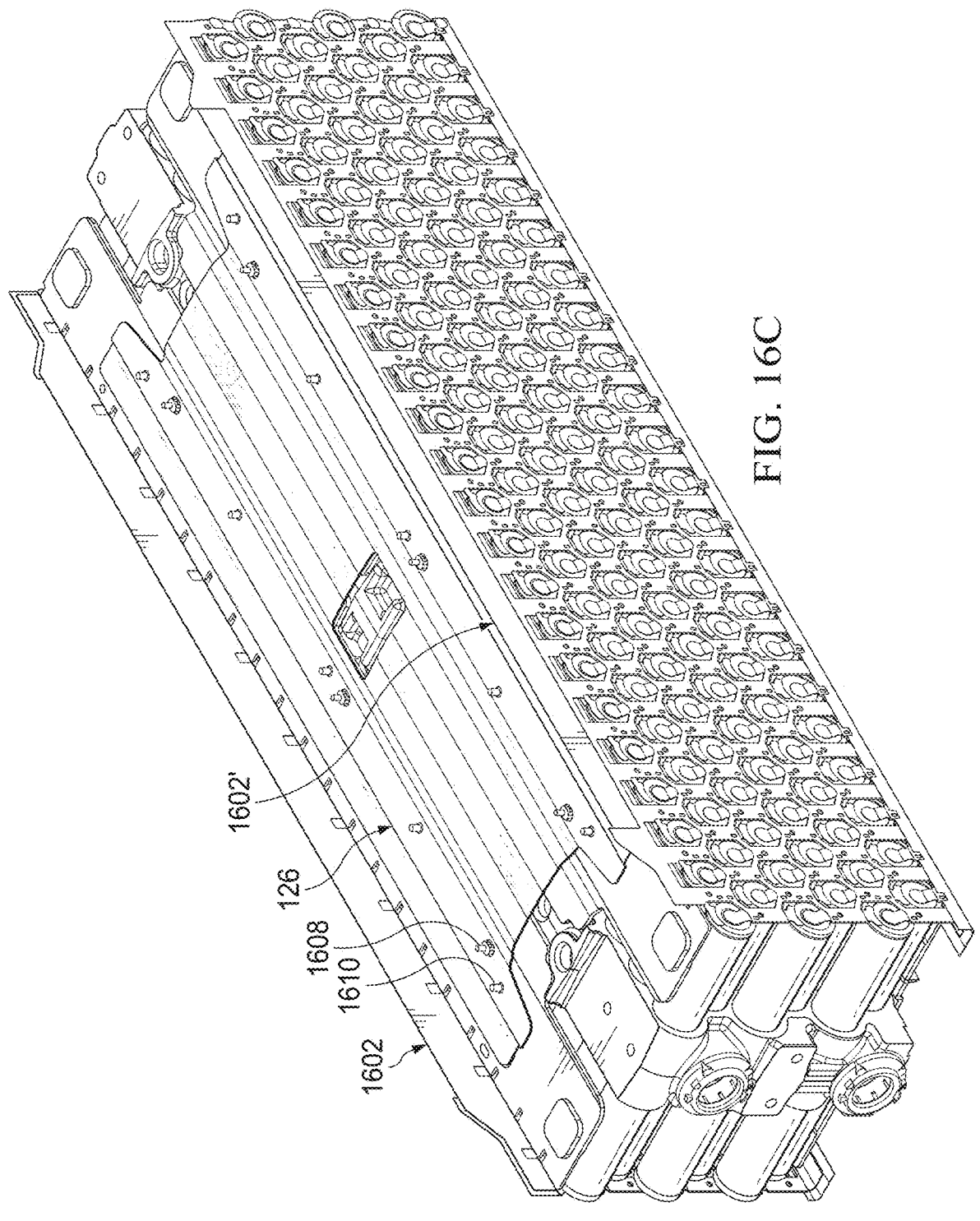

As shown in FIGS. 16B and 16C, the hot plate electrical connector 126 can be positioned onto the sub-modules 102a-102b and includes openings that allow pins 1608 and heat stake pins 1610 from the stiffening plates 124a-124b to pass through the hot plate electrical connector 126. The pins 1608 can be used for alignment and retention purposes, while the heat stake pins 1610 can be used later to physically secure the hot plate electrical connector 126 to the sub-modules 102a-102b.

Figure 16D:
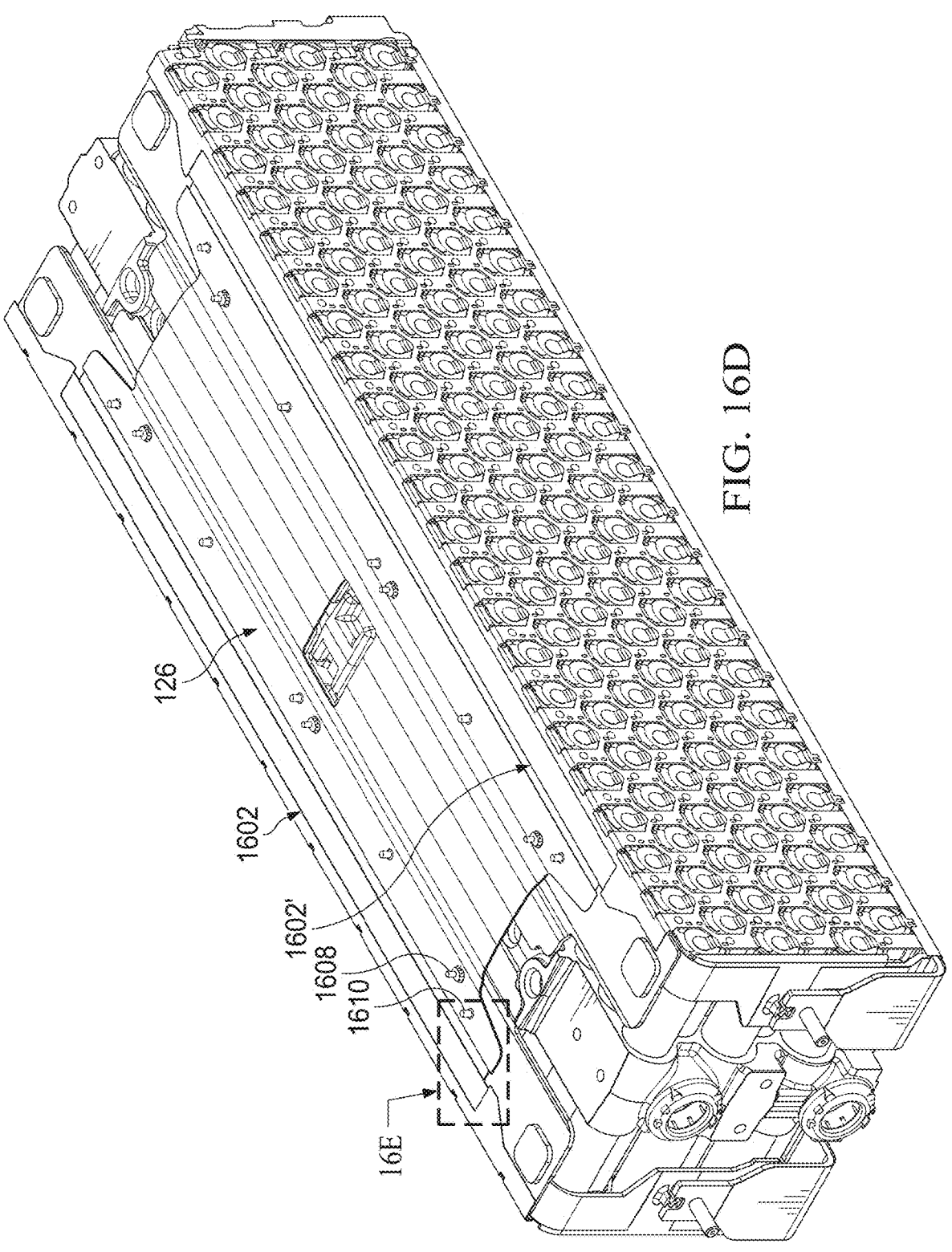
Figure 16E:
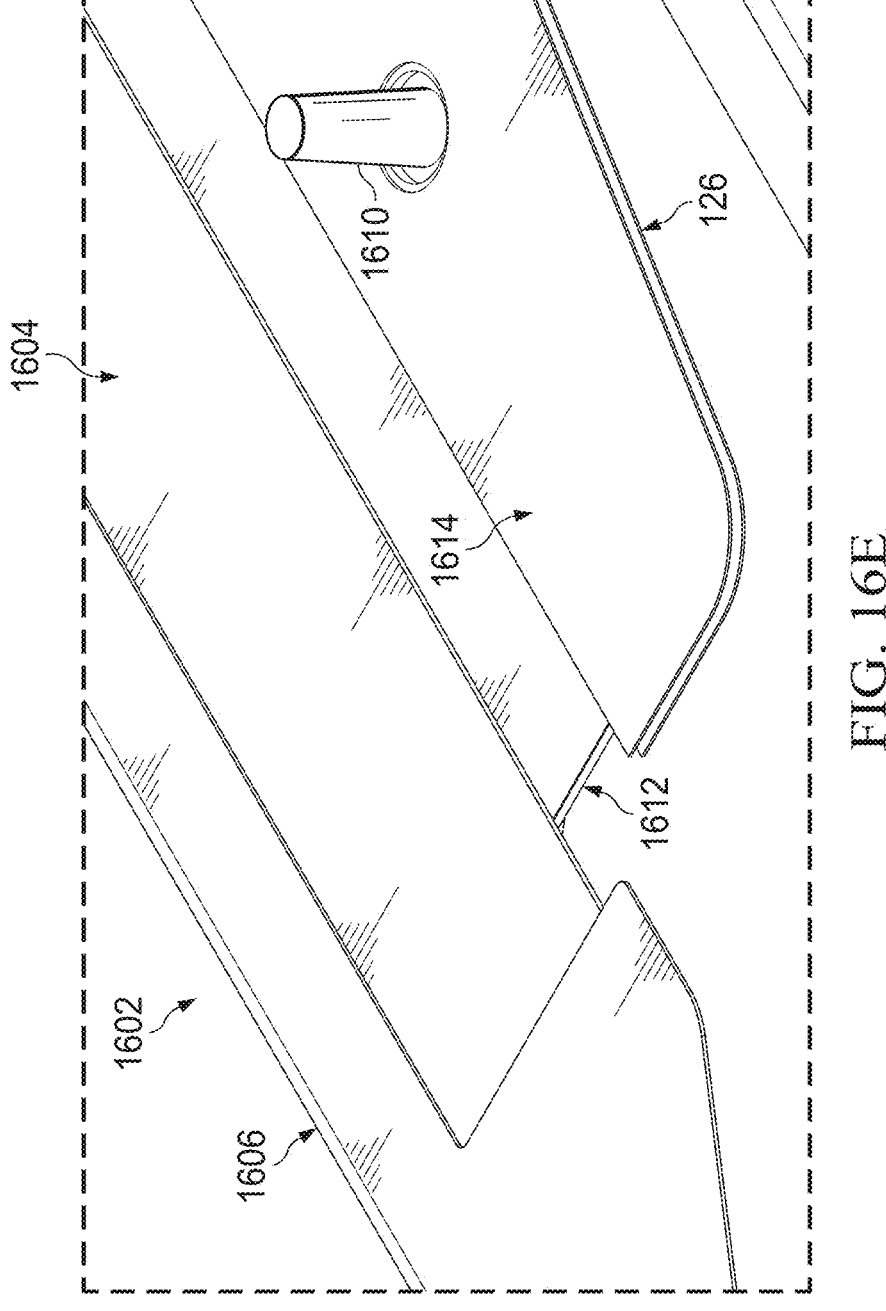
Figure 16F:
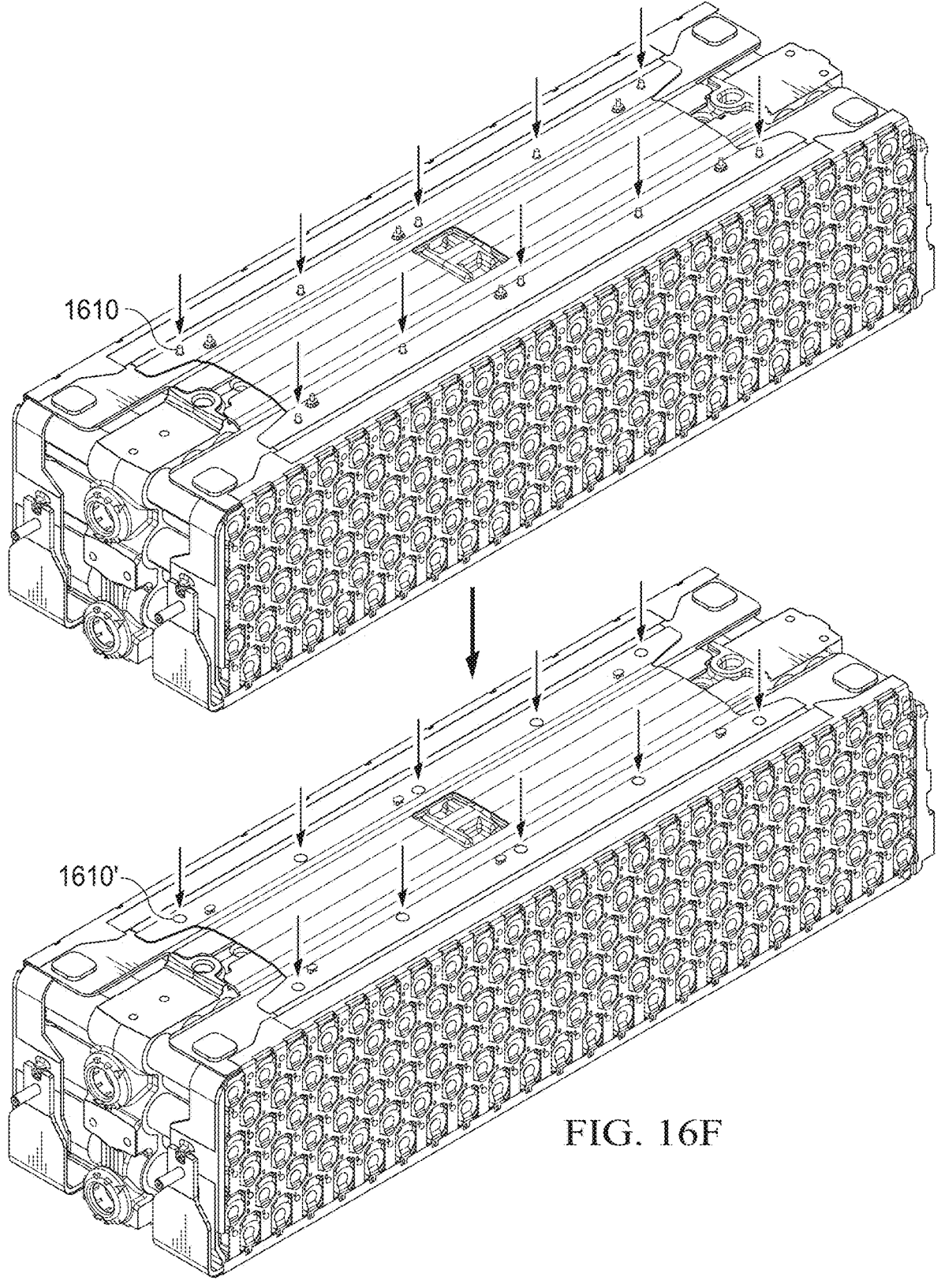

As shown in FIG. 16D, once the hot plate electrical connector 126 is positioned in place, the coupling extensions 1602 and 1602' can be folded or bent downward onto the hot plate electrical connector 126. This results in the arrangement shown in FIG. 16E, where the hot plate electrical connector 126 is shown as having a conductive layer 1612 that is mostly covered by laminated or other insulative layers 1614. However, an exposed portion of the conductive layer 1612 in the hot plate electrical connector 126 can contact and be coupled to the conductive extension 1604 of the coupling extension 1602. In some embodiments, laser welding may be used to couple the exposed portion of the conductive layer 1612 to the conductive extension 1604 of the coupling extension 1602, although other suitable techniques may be used. The same or similar arrangement can exist for the coupling extension 1602'. Note that since each conductive extension 1604 may be formed using a foil or is otherwise relative thin, the conductive layer 1612 in the hot plate electrical connector 126 can be thicker while still permitting the use of laser welding. As shown in FIG. 16F, heat, ultrasonic vibration, ultraviolet radiation, or other technique can be used to flatten exposed portions of the heat stake pins 1610, which produces flattened heat stake pins 1610'. The flattened heat stake pins 1610' can help to hold the hot plate electrical connector 126 in place on the sub-modules 102a-102b.

Figure 17A:
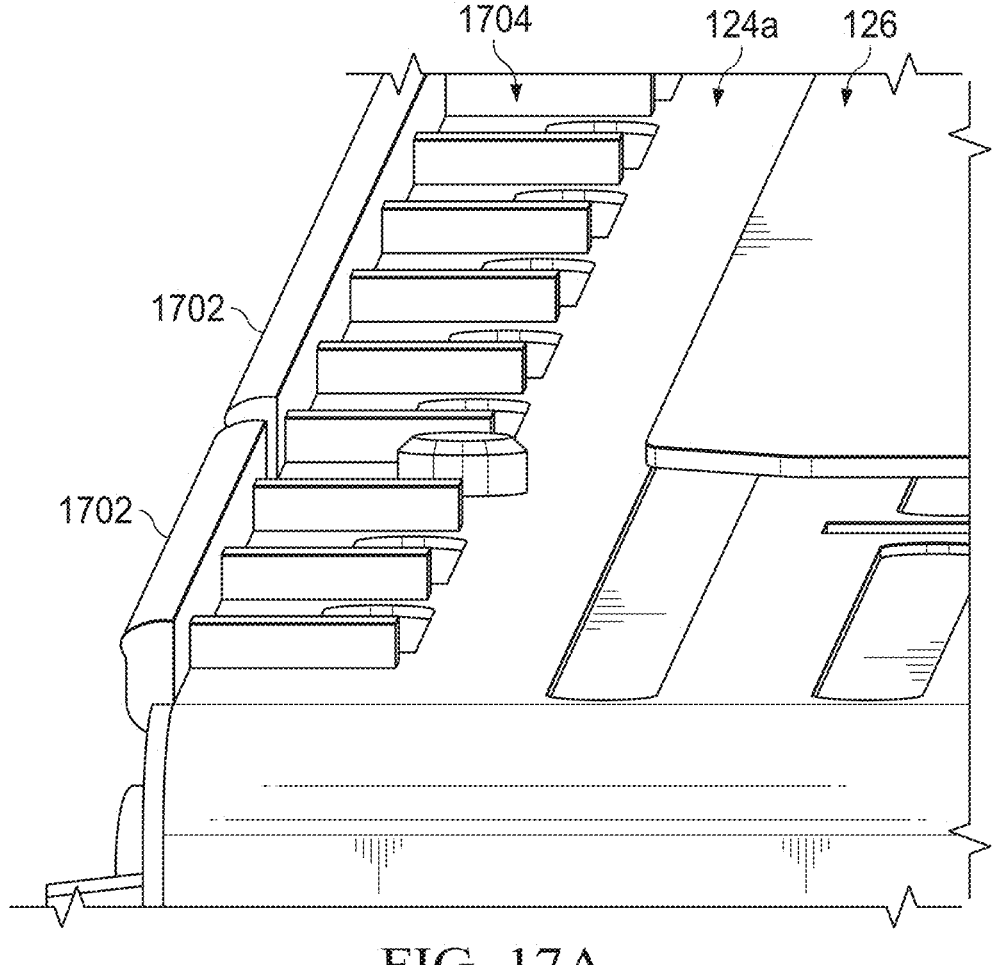
FIGS. 17A through 17C illustrate an example mechanism for maintaining electrical isolation of a connection to a hot plate electrical connector in an interconnect assembly according to this disclosure.
Figure 17B:
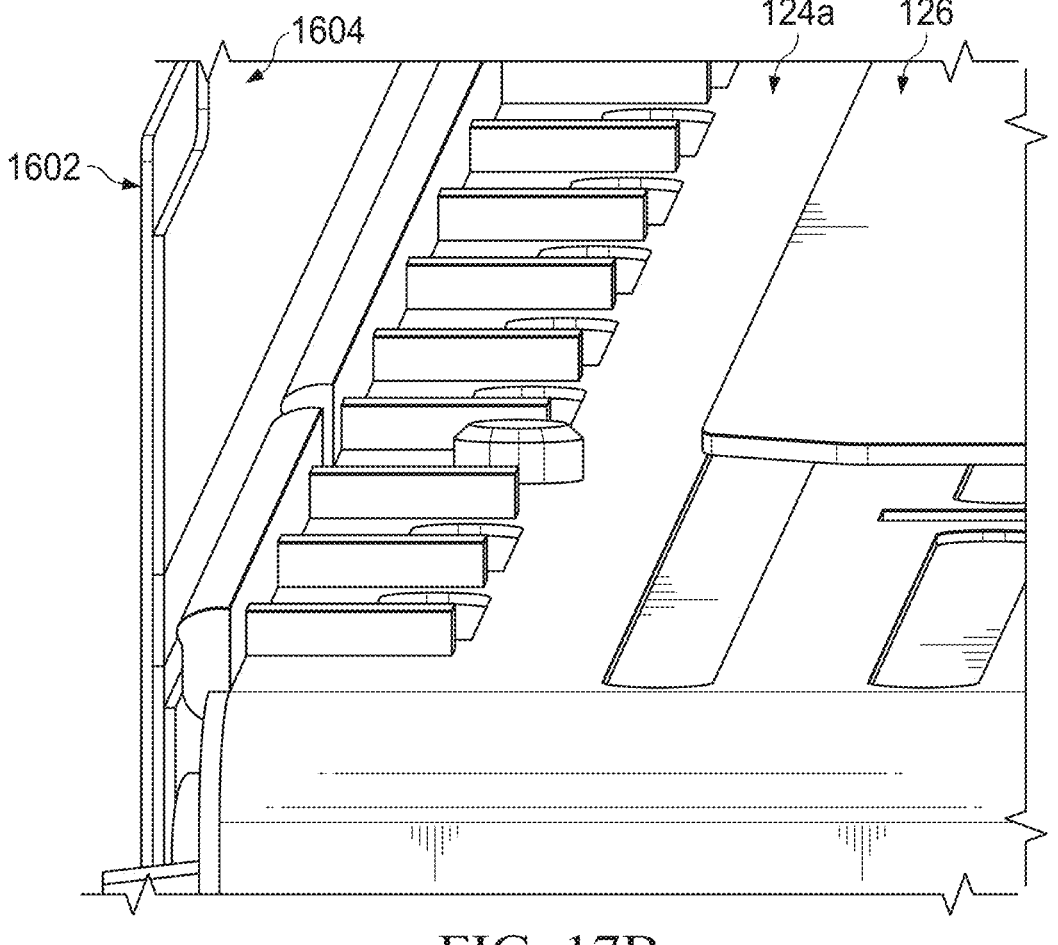
Figure 17C:
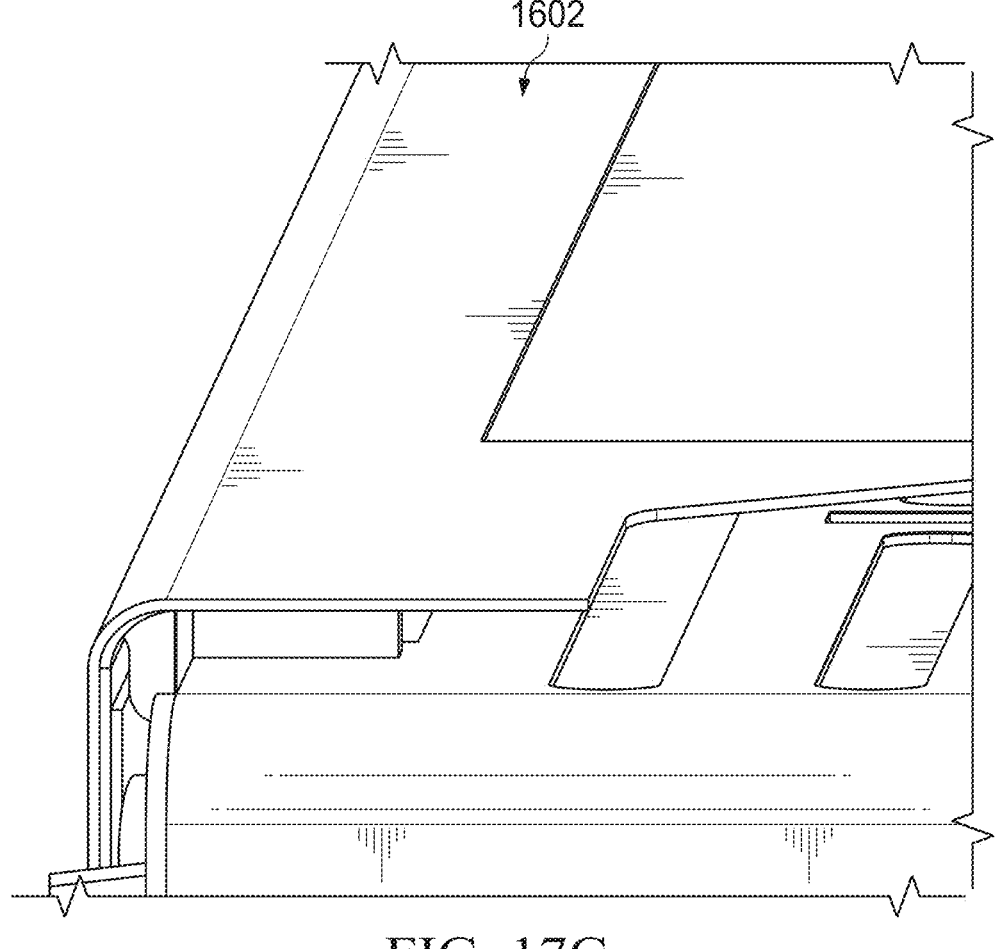

FIGS. 17A through 17C illustrate an example mechanism for maintaining electrical isolation of a connection to a hot plate electrical connector 126 in an interconnect assembly 100 according to this disclosure. The mechanism here is used with the coupling extension 1602, although the same or similar mechanism may be used with the coupling extension 1602'.

As shown in FIG. 17A, the stiffening plate 124a may include one or more fulcrum projections 1702, which can extend away from other portions of the stiffening plate 124a. The stiffening plate 124a also includes a number of fins 1704, which also extend away from other portions of the stiffening plate 124a. As shown in FIGS. 17B and 17C, the coupling extension 1602 can be bent around the fulcrum projections 1702, and the fins 1704 maintain a minimum desired separation between the coupling extension 1602 and the stiffening plate 124a. This can help to ensure that the hot plate electrical connector 126 is electrically coupled to the conductive extension 1604 of the coupling extension 1602 (and thereby to the conductive interconnect layer 204) without creating any short circuits. Also, the tips of the fulcrum projections 1702 can be rounded as shown here, which helps to define the inside bend radius of the coupling extension 1602.

Although FIGS. 16A through 16F illustrate one example of a mechanism for coupling sub-modules 102a-102b of an interconnect assembly 100 to a hot plate electrical connector 126 of the interconnect assembly 100, various changes may be made to FIGS. 16A through 16F. For example, any other suitable mechanism may be used to electrically couple the sub-modules 102a-102b and the hot plate electrical connector 126. Although FIGS. 17A through 17C illustrate one example of a mechanism for maintaining electrical isolation of a connection to a hot plate electrical connector 126 in an interconnect assembly 100, various changes may be made to FIGS. 17A through 17C. For instance, any other suitable mechanism may be used to maintain electrical isolation of the connection to the hot plate electrical connector 126.

Figure 18A:
FIGS. 18A through 18C illustrate example mechanisms for altering current distributions in an interconnect assembly according to this disclosure.
Figure 18B:
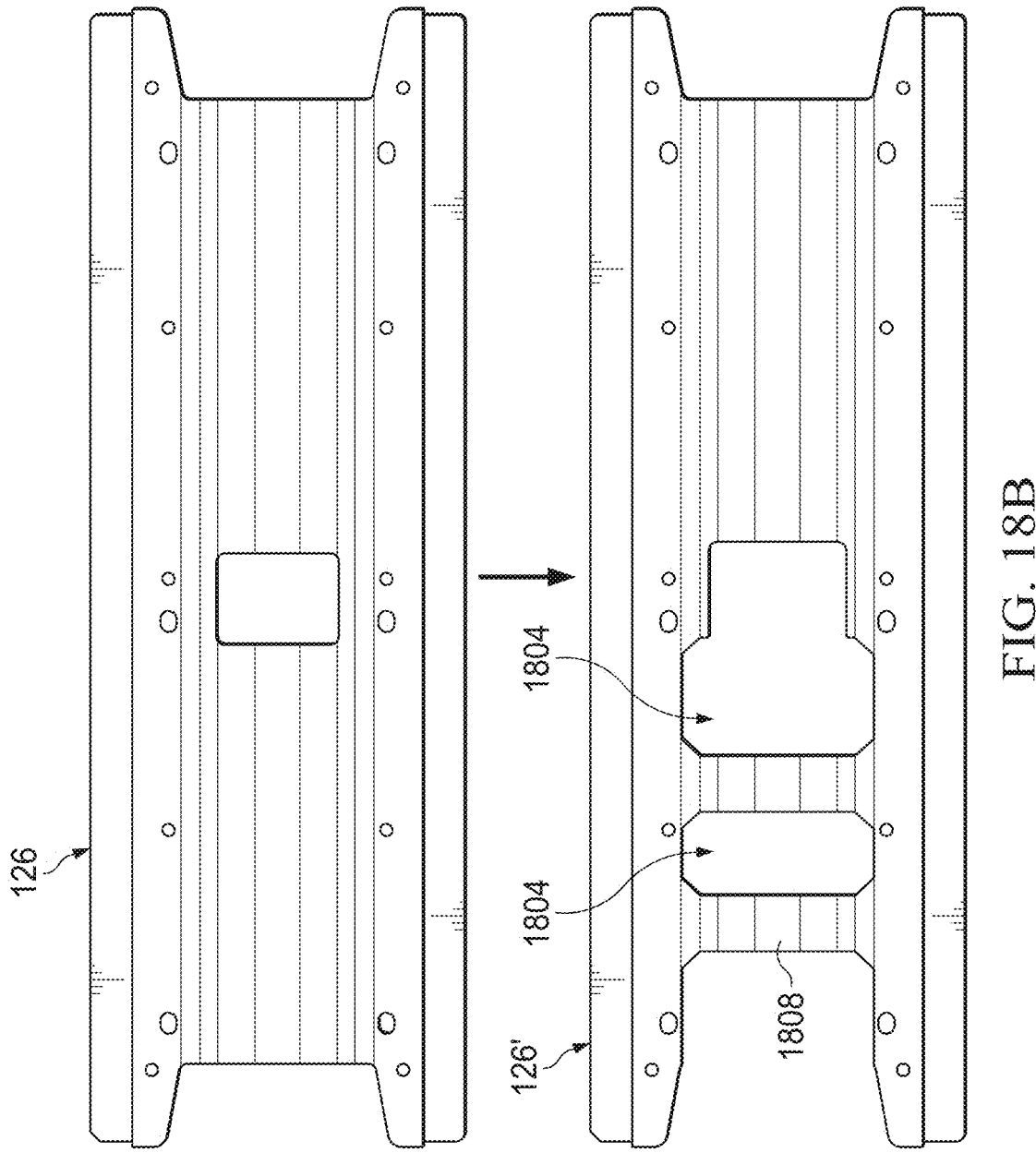
Figure 18C:
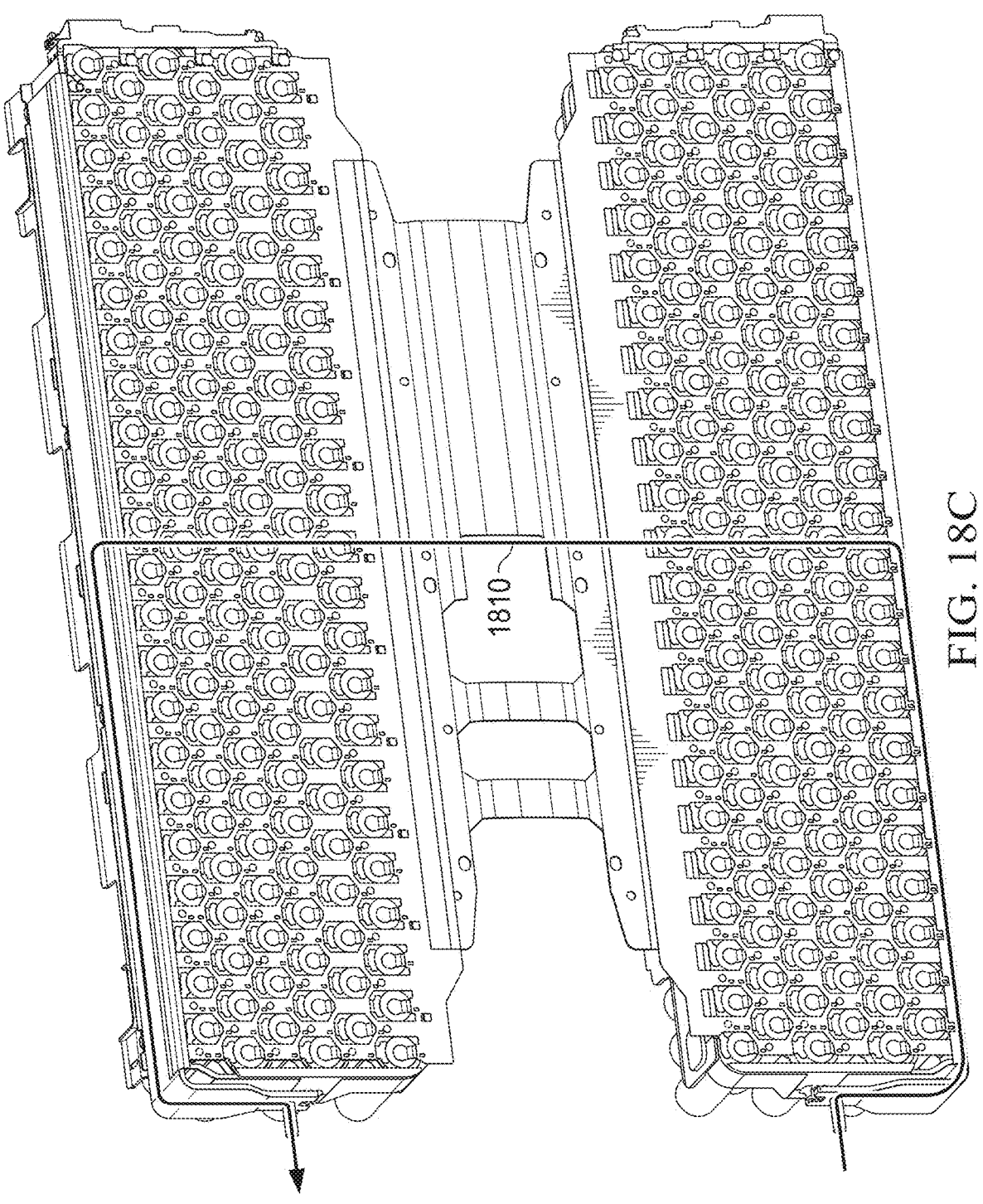

FIGS. 18A through 18C illustrate example mechanisms for altering current distributions in an interconnect assembly 100 according to this disclosure. During operation of the interconnect assembly 100 shown in FIGS. 1A through 1C, electrical current naturally follows the path of least resistance. In FIGS. 1A through 1C, this means that slightly more current may pass through the batteries 104 that are closest to the terminal connectors 114a-114b. As a result, these batteries 104 may be loaded somewhat more than other batteries 104. This can result in higher operating temperatures in these batteries 104, which may limit their power throughput and contribute to advanced cell aging or reduced cycle life.

As shown in FIG. 18A, each terminal bar 116a-116b may be modified to include various slots or openings 1802, thereby forming terminal bars 116a'-116b'. The openings 1802 can be used here to force more current to flow through portions of the terminal bars 116a'-116b' that are farther from the terminal connectors 114a-114b. As shown in FIG. 18B, the hot plate electrical connector 126 may also be modified to include different (more and/or larger) openings 1804, thereby forming a hot plate electrical connector 126'. The openings 1804 can be used here to force more current to flow through portions of the hot plate electrical connector 126' that are farther from the terminal connectors 114a-114b.

Note that the terminal bars 116a'-116b' still include small bridges 1806 between the openings 1802 and that the hot plate electrical connector 126' still includes small bridges 1808 between the openings 1804. These bridges 1806 and 1808 provide electrical pathways for some electrical currents to flow through the terminal bars 116a'-116b' and the hot plate electrical connector 126'. However, the cross-sections of the bridges 1806 and 1808 can be kept deliberately small to increase their resistances. This forces the majority of the electrical currents to flow around the openings 1802 in the terminal bars 116a'-116b' and around the openings 1804 in the hot plate electrical connector 126'.

The results of this are shown in FIG. 18C, where a path of least resistance 1810 between the terminal connectors 114a-114b now travels more through the centers of the sub-modules 102a-102b. This can help to more evenly balance the electrical currents passing through the batteries 104 in the sub-modules 102a-102b. Note that adding more openings 1802 and 1804 to push the path of least resistance 1810 even farther back into the sub-modules 102a-102b may be possible, but this can also increase Ohmic losses in the sub-modules 102a-102b.

Although FIGS. 18A through 18C illustrate example mechanisms for altering current distributions in an interconnect assembly 100, various changes may be made to FIGS. 18A through 18C. For example, other current distributions are possible with other arrangements of batteries 104. Also, there may be some applications where uneven current distributions in the batteries 104 are acceptable, in which case the mechanisms shown in FIGS. 18A and 18B may not be needed.

Figure 19A:
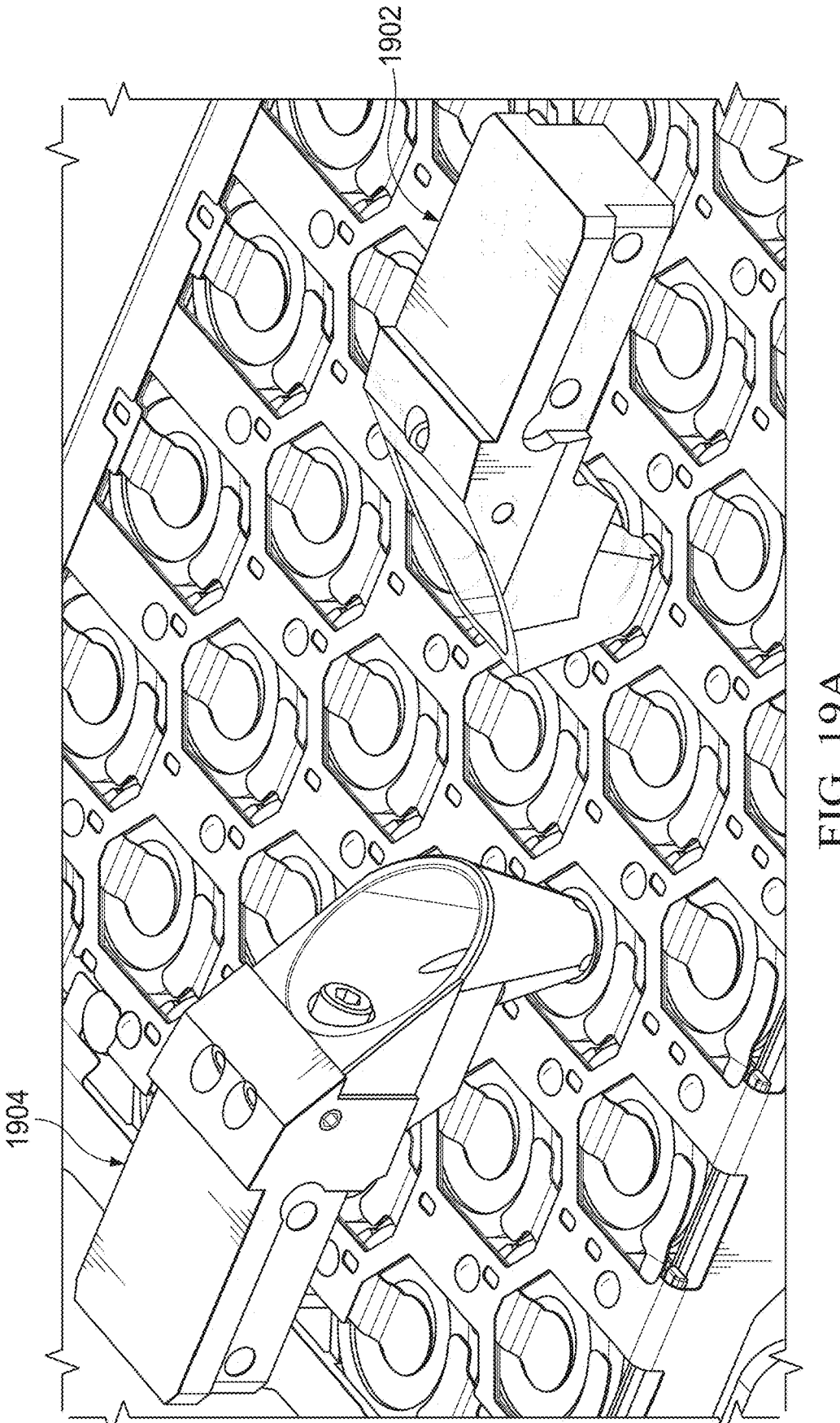
FIGS. 19A and 19B illustrate an example technique for laser welding of interconnects to batteries in an interconnect assembly according to this disclosure.
Figure 19B:
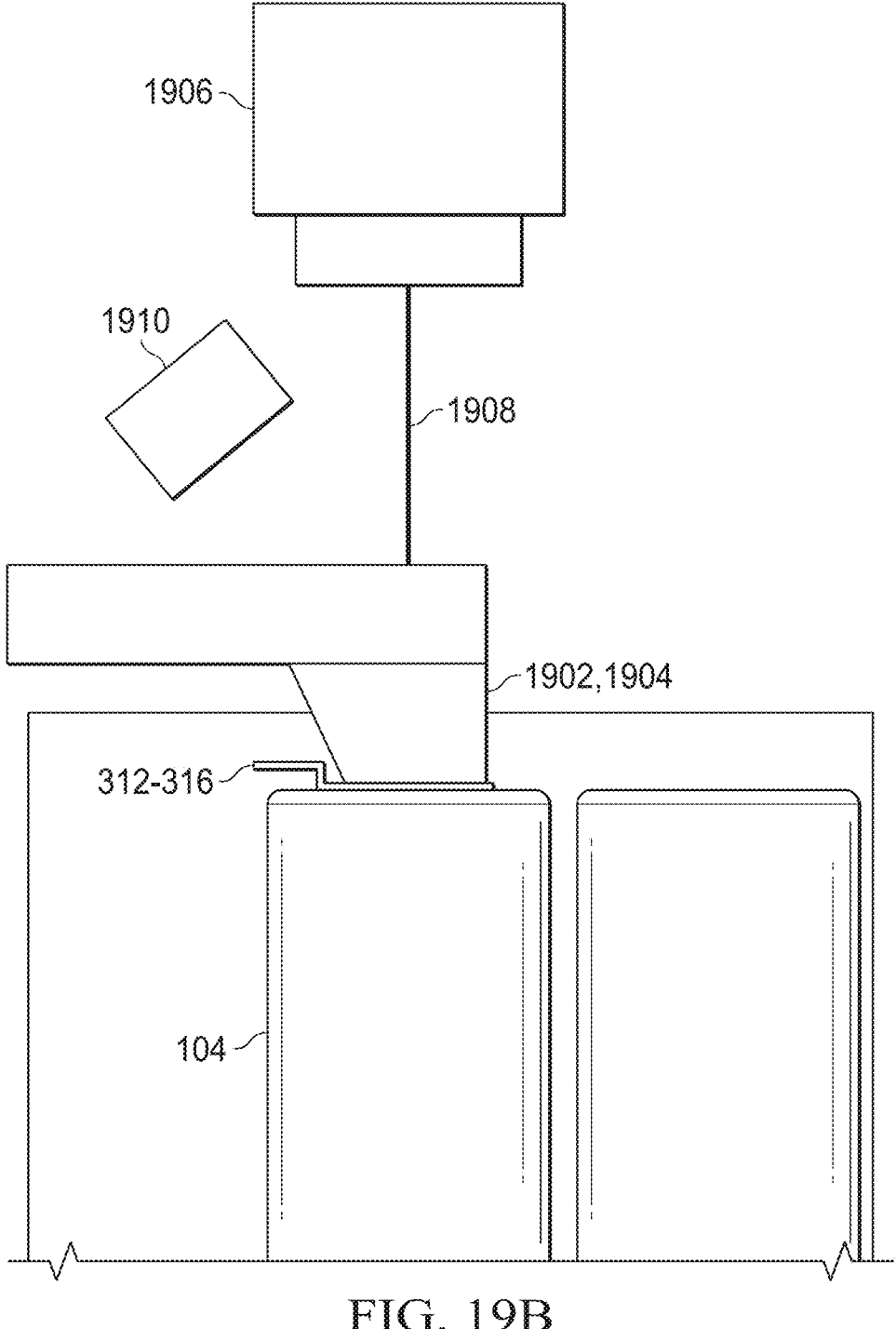

FIGS. 19A and 19B illustrate an example technique for laser welding of interconnects 312-316 to batteries 104 in an interconnect assembly 100 according to this disclosure. As shown in FIG. 4 above, each of the interconnects 312-316 may include two shallow bends in order to bring large portions of the interconnects 312-316 into suitable positions for attachment to the batteries 104. The use of shallow bends can help to reduce or avoid cracking or other damage to the interconnects 312-316. In some cases, the interconnects 312-316 may be coupled to the series connectors 310 as low as possible while still remaining above the top surfaces of the batteries 104.

The bending of the interconnects 312-316 can be accomplished as shown in FIGS. 19A and 19B using one or more clamps 1902-1904, each of which can include a passageway allowing a laser source 1906 to provide a welding laser beam 1908 through the clamp 1902-1904. The laser beam 1908 can thereby weld an interconnect 312-316 being depressed by the clamp 1902-1904 onto an underlying portion of a battery 104. Since each clamp 1902-1904 can depress a portion of the interconnect 312-316 being welded, this helps to ensure good physical contact between the interconnect 312-316 and the underlying portion of the battery 104. The design of the interconnect assembly 100 itself also provides adequate space for the clamps 1902-1904 to be used to weld the various interconnects 312-316 to the batteries 104.

Note that each of the interconnects 312-316 shown in FIG. 4 may have a small portion that projects substantially laterally from its associated series connector 310 prior to being bent downward. This can provide an amount of flexibility or bend relief in order to comply with the application of the clamps 1902-1904. In some cases, the portions of the interconnects 312-316 that project substantially laterally from the series connectors 310 may extend by about 0.5 to about 1.0 millimeters, although other lengths of these portions of the interconnects 312-316 may be used.

The interconnect retainer 202 (and the other interconnect retainer in the sub-module 102b) and the cell retainers 108a, 108b can also cooperate to help hold the batteries 104 in desired positions while reducing possible movements of the batteries 104. This can help to maintain tops of the batteries 104 substantially perpendicular to the welding laser beams 1908 used to weld the interconnects 312-316 to the batteries 104. For example, the cell retainer 108a and the interconnect retainer 202 (as well as the cell retainer 108b and the other interconnect retainer) can help reduce the possible variation in the positions of the batteries 104 within the interconnect assembly 100.

Figure 20:
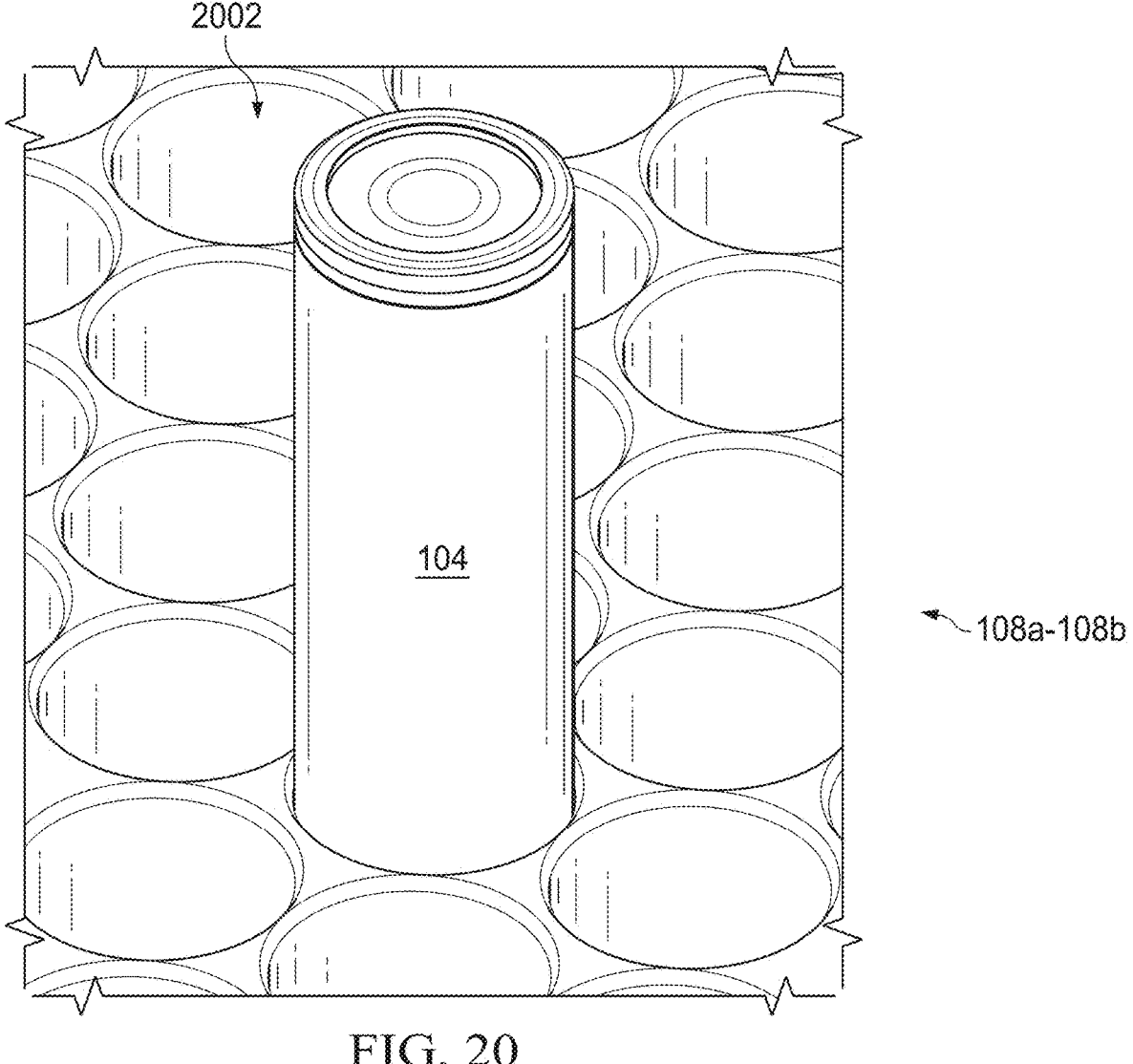
FIG. 20 illustrates an example portion of a cell retainer that forms part of a coldplate in an interconnect assembly according to this disclosure.

FIG. 20 illustrates an example portion of a cell retainer 108a, 108b that forms part of a coldplate 106 in an interconnect assembly 100 according to this disclosure. As shown in FIG. 20, each cell retainer 108a, 108b may include a number of recesses 2002, and each recess 2002 can be sized and shaped to receive an end portion of a battery 104. The spacing of the recesses 2002 defines the density of the batteries 104 in the interconnect assembly 100. In some embodiments, the recesses 2002 may be somewhat oversized relative to the outer diameters of the batteries 104, which may facilitate faster or easier insertion of the batteries 104 into the recesses 2002. While this may allow for some displacement of the batteries 104, the use of the interconnect retainer 202 (as well as the other interconnect retainer) as described below can help the batteries 104 to be suitably positioned for attachment to the interconnects 312-316.

FIGS. 21A through 21G illustrate an example portion of an interconnect retainer 202 for use in retaining batteries 104 in desired orientations within an interconnect assembly 100 according to this disclosure. While the interconnect retainer 202 is shown here, the same or similar structure may be used in the interconnect retainer of the sub-module 102b (although different interconnect retainers may be used if needed or desired).

Figure 21A:
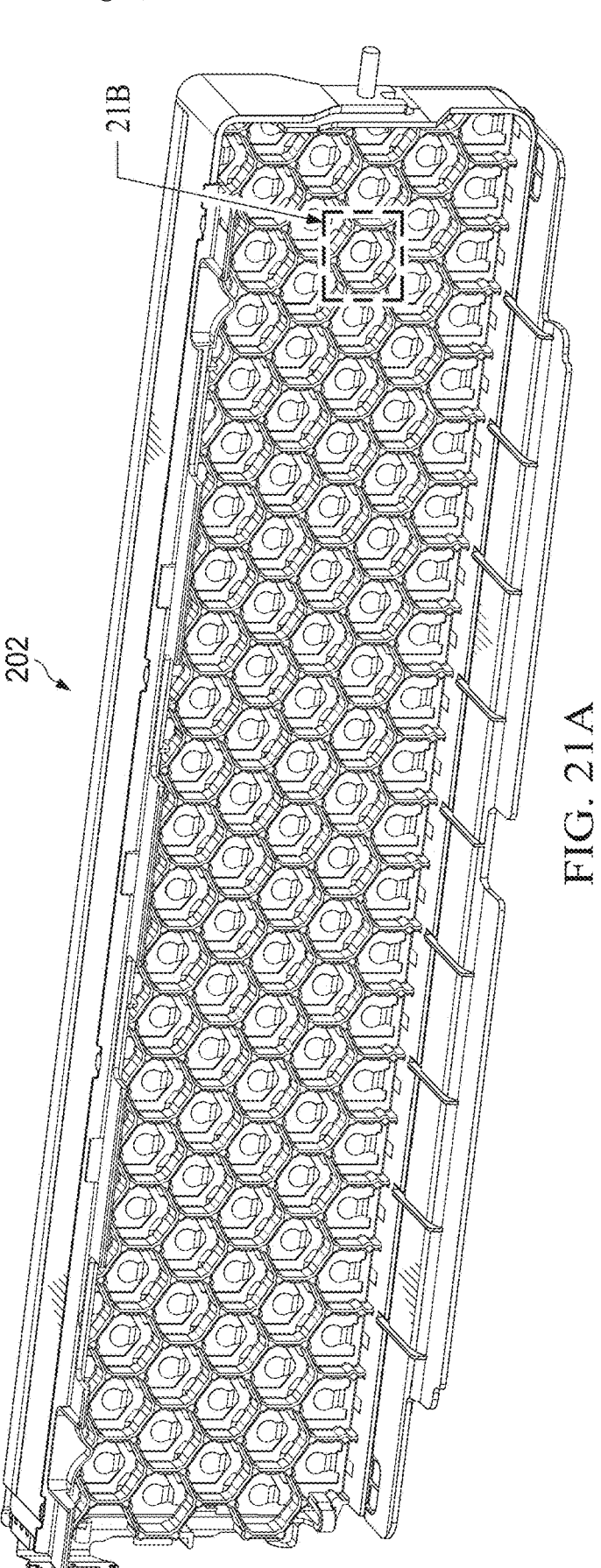
FIGS. 21A through 21G illustrate an example portion of an interconnect retainer for use in retaining batteries in desired orientations within an interconnect assembly according to this disclosure.
Figure 21B:
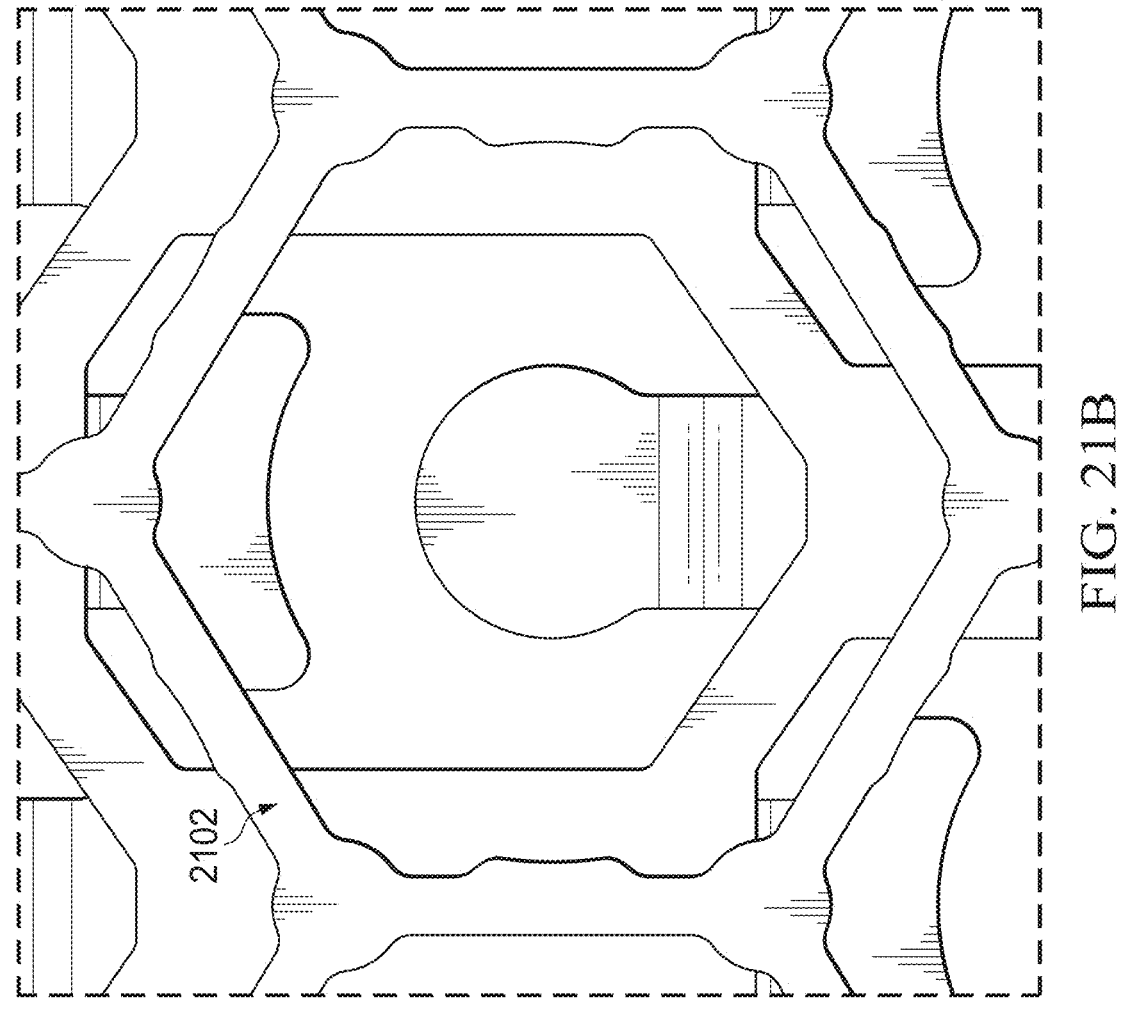
Figure 21C:
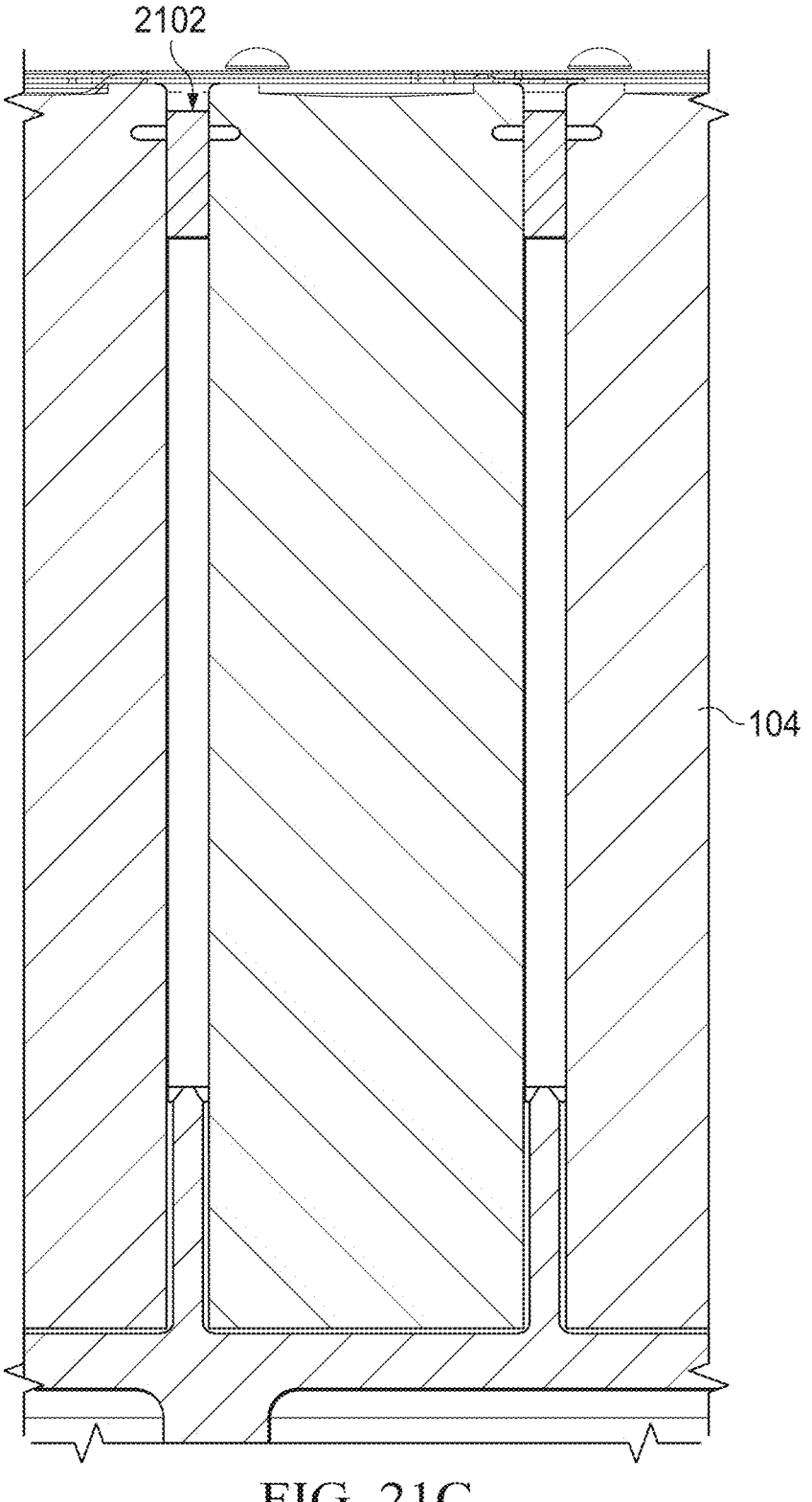

As shown in FIGS. 21A through 21C, the interconnect retainer 202 includes a number of hexagonal, honeycomb, or other structures 2102. Each structure 2102 is configured to receive a portion of a battery 104. The walls of the structures 2102 can be used to contact the sides or tops of the batteries 104 in order to help retain and reduce or prevent movement of the batteries 104 within the interconnect assembly 100. In some embodiments, the hexagonal shape of the structures 2102 helps to enable a more uniform nominal thickness in the interconnect retainers and limit cell friction. The nominal thickness of the walls of the structures 2102 may remain relatively constant, and this can be useful in various fabrication processes for the interconnect retainers, such as plastic injection molding, as it reduces uneven cooling in a mold and therefore reduces warp. This allows for tighter tolerances to be enforced without sacrificing part costs, which make this approach even more suitable for controlling the battery array composite tolerance.

Figure 21D:
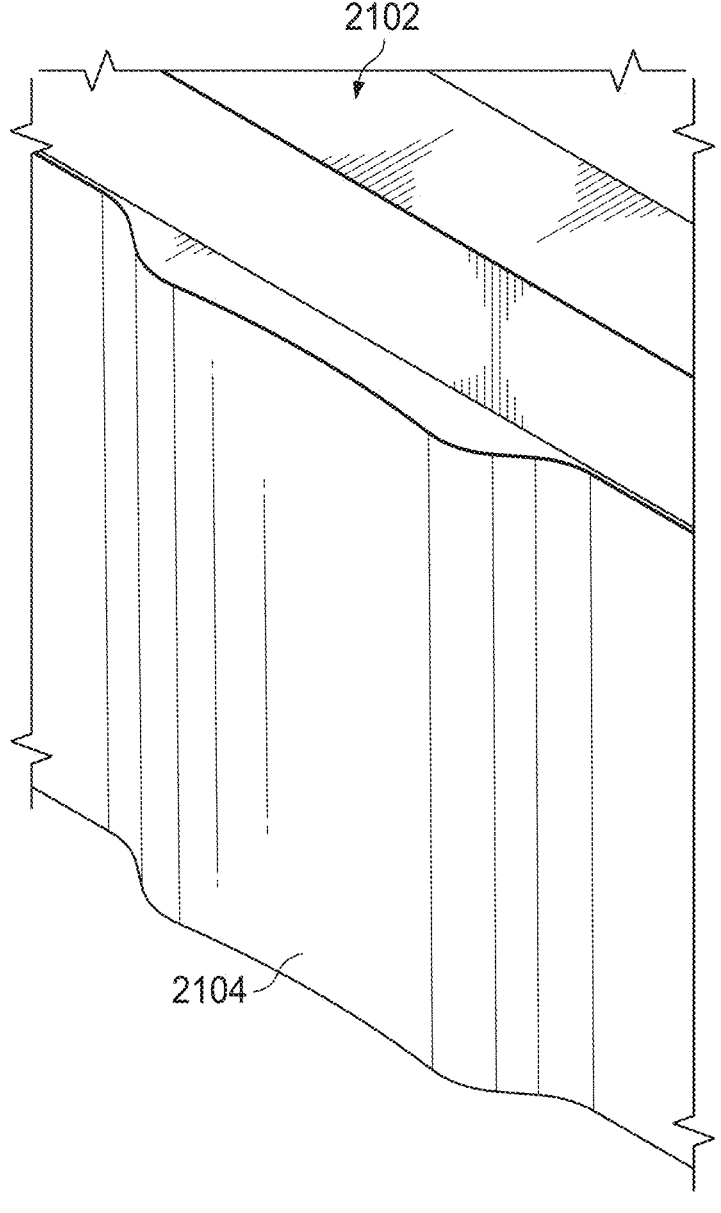
Figure 21E:
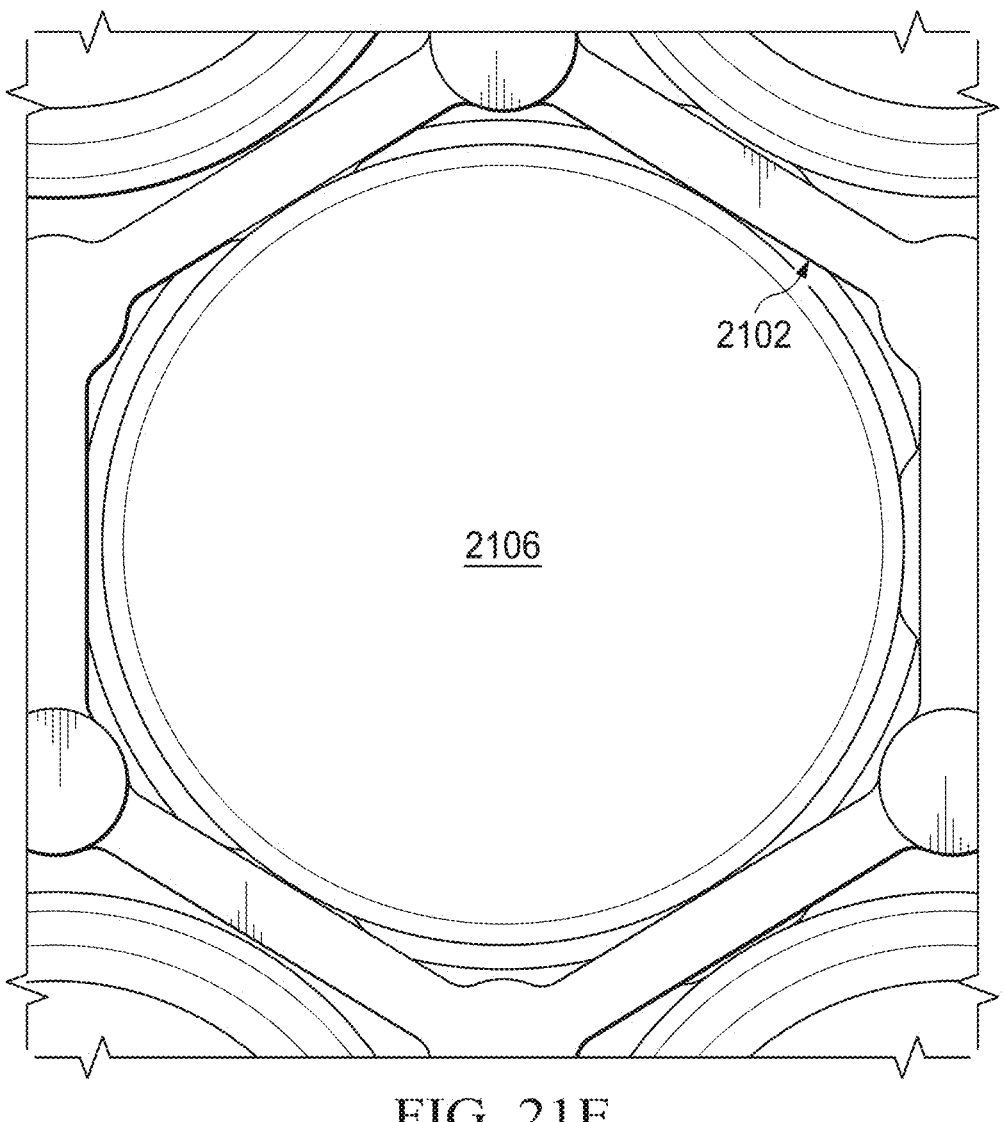
Figure 21F:
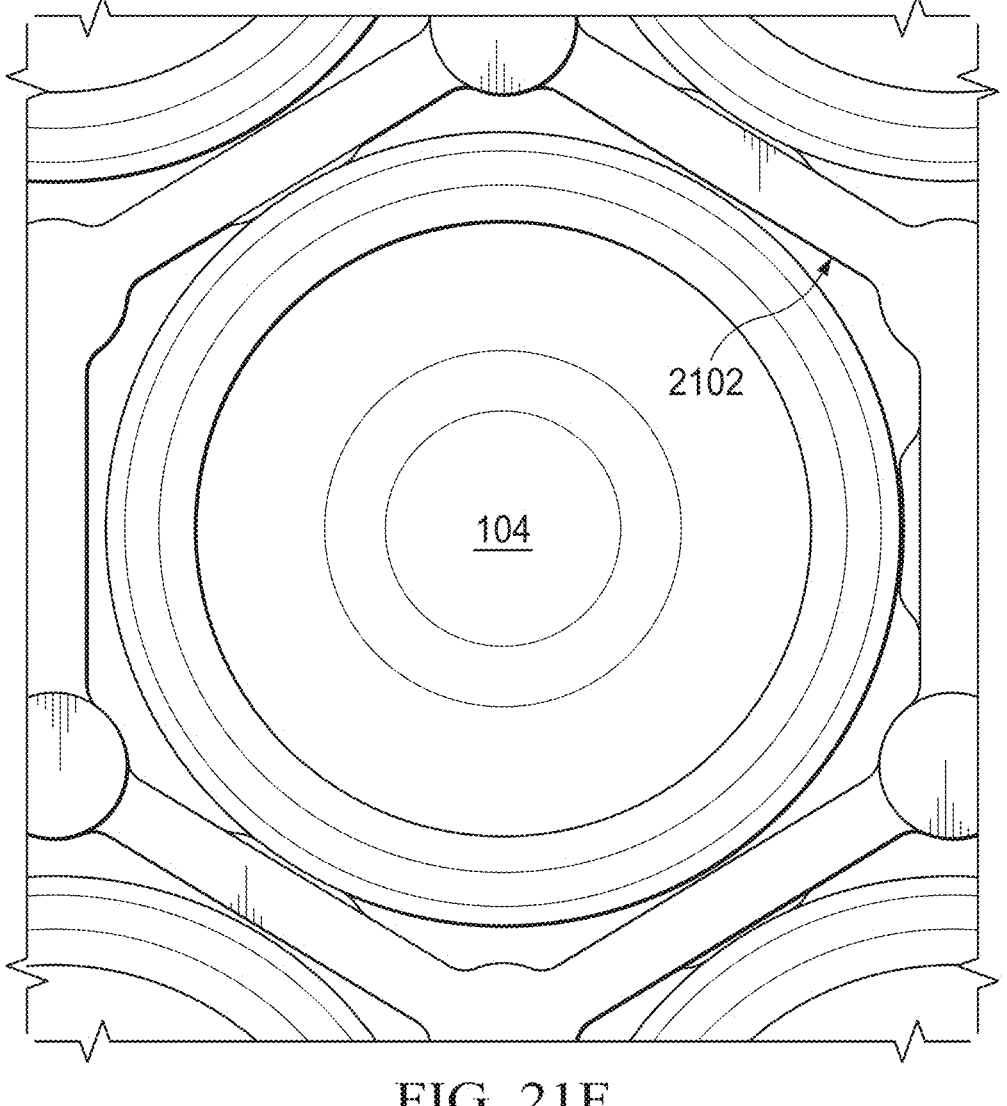
Figure 21G:
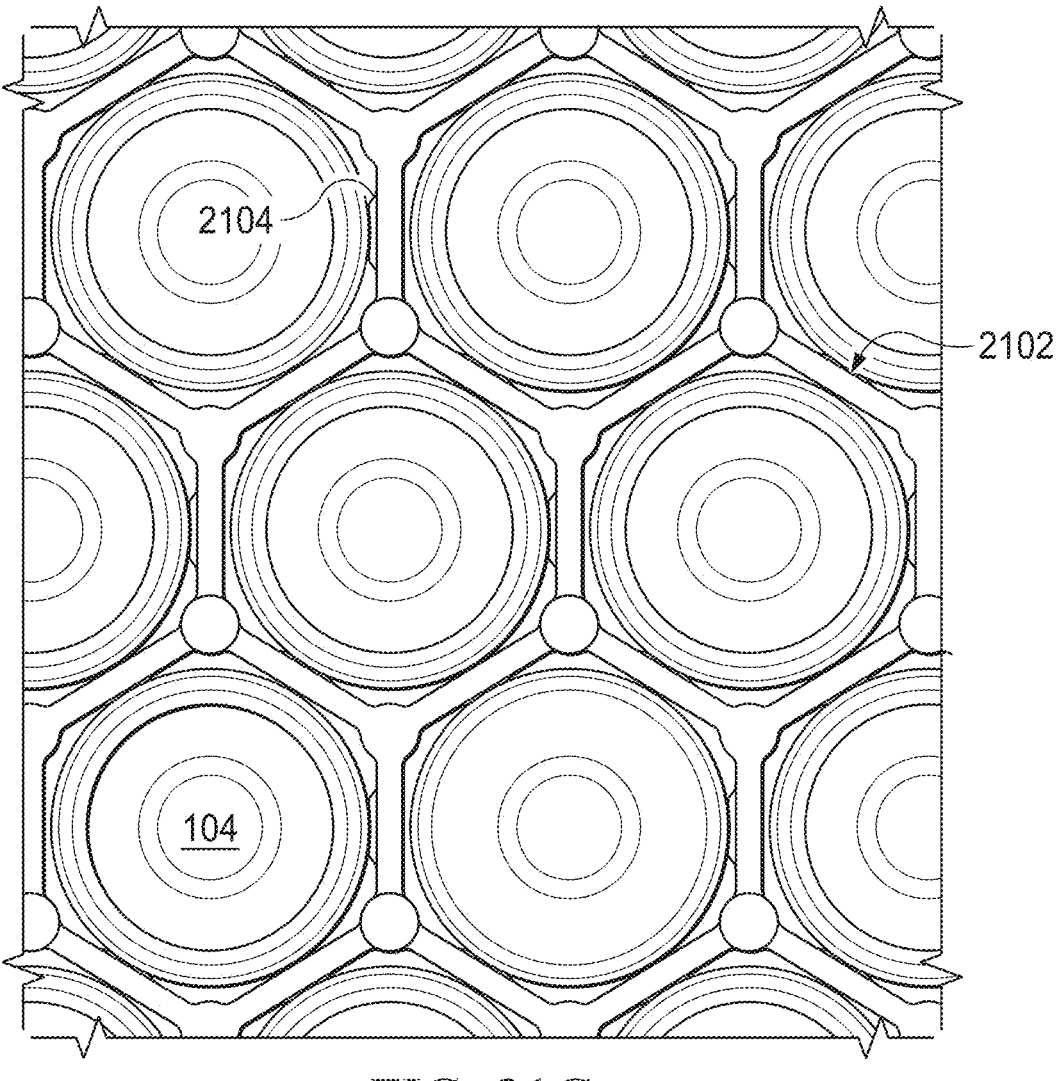

As shown in FIGS. 21D through 21F, lower portions of some of the structures 2102 include contact pads 2104, which represent curved or other portions of the structures 2102 that extend inward and that can physically contact sides/tops of the batteries 104. As shown here, when a battery 104 is inserted into a space 2106 within a structure 2102, multiple contact pads 2104 can be used to help hold the battery 104 at a desired location.

As shown in FIGS. 21D through 21G, the contact pads 2104 may be located on walls of the structures 2102 such that only one contact pad 2104 is located on any given wall of the structures 2102. In other words, two contact pads 2104 may not be installed 1800 from one another on the same wall of any structure 2102. As a result, each wall of the structures 2102 (even if positioned between two batteries 104) may have only one contact pad 2104 that contacts only one of the two batteries 104. This allows the structures 2102 to retain the batteries 104 in place while permitting some deformations of the walls of the structures 2102 due to insertion of the batteries 104. Thus, for example, if the wall of one structure 2102 is deformed (pushed outward) when one battery 104 is installed, the neighboring battery 104 can still be installed effectively since there is no contact pad being pushed inward.

Even if some very small displacements to the tops of the batteries 104 may exist in the interconnect assembly 100, a manufacturing or processing system may be configured to accommodate these displacements. For example, a vision system 1910 as shown in FIG. 19B may be used to identify the locations of the cathodes 402 and anodes 404 of the batteries 104 in order to facilitate accurate welding of the interconnects 312-316 to the cathodes 402 and anodes 404. For example, in some cases, the vision system 1910 may use the outer diameter of the batteries 104 to identify weld locations. In other cases, each battery 104 may include a cell gasket that is visible along the inner edge of the battery's anode 404, and the vision system 1910 may use the locations of the cell gaskets to identify weld locations.

Note that the ability to use features like outer diameters or cell gasket locations depends on the ability of the vision system 1910 to actually view those features of the batteries 104. In the various embodiments of the interconnect assembly 100 described above, the outer diameters and/or cell gaskets of the batteries 104 may be viewed much more easily compared to other approaches. This helps to facilitate manufacture of the interconnect assembly 100 in a more automated manner.

Although FIGS. 19A and 19B illustrate one example of a technique for laser welding of interconnects 312-316 to batteries 104 in an interconnect assembly 100, various changes may be made to FIGS. 19A and 19B. For example, any other suitable technique may be used to attach interconnects 312-316 to batteries 104 in an interconnect assembly 100. Although FIG. 20 illustrates one example portion of a cell retainer 108a, 108b that forms part of a coldplate 106 in an interconnect assembly 100 and FIGS. 21A through 21G illustrate one example portion of an interconnect retainer 202 for use in retaining batteries 104 in desired orientations within an interconnect assembly 100, various changes may be made to FIGS. 20 and 21A through 21G. For instance, the cell retainers 108a, 108b may have any suitable numbers and arrangements of recesses 2002 for batteries 104. Also, the structures 2102 of each interconnect retainer may have one or more shapes other than hexagonal or honeycomb. In addition, other embodiments may include multiple contact pads 2104 on individual walls of the structures 2102.

Figure 22:
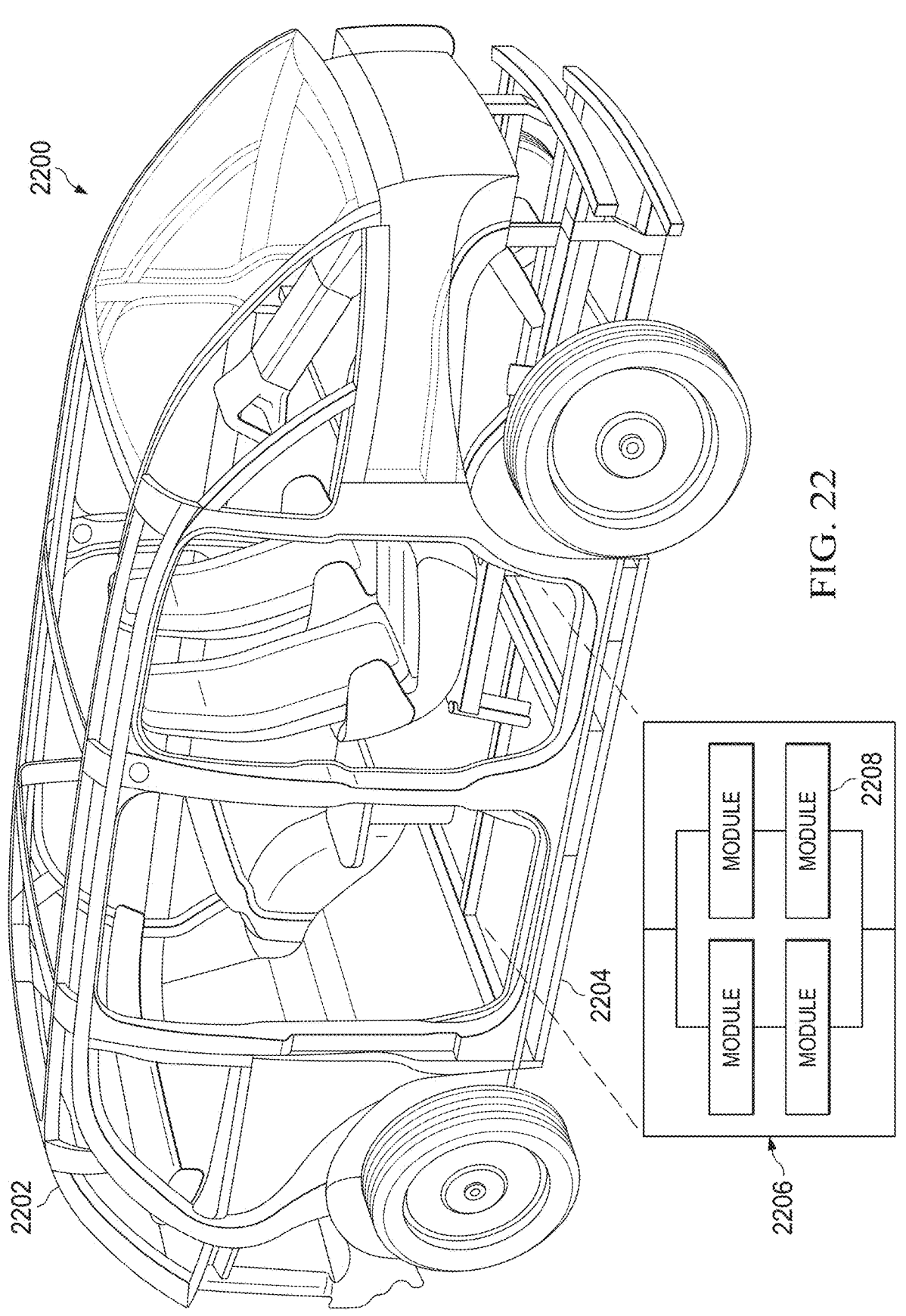
FIG. 22 illustrates an example electric vehicle containing one or more interconnect assemblies according to this disclosure.

FIG. 22 illustrates an example electric vehicle 2200 containing one or more interconnect assemblies according to this disclosure. As shown in FIG. 22, the electric vehicle 2200 generally includes a vehicle body 2202 attached to a vehicle base 2204 (which is also sometimes referred to as a skateboard). The vehicle body 2202 in this example takes the form of a passenger van, although vehicle bodies for other types of vehicles (such as sedans, trucks, or other vehicle types) may be used. The vehicle base 2204 includes many of the components used to move and stop the electric vehicle 2200, such as one or more electric motors, brake systems, suspensions, transmissions, and other components.

In this example, the vehicle base 2204 includes a battery subsystem 2206, which includes one or more power supply modules 2208. The battery subsystem 2206 is generally responsible for providing electrical power from the one or more power supply modules 2208 to other components of the electric vehicle 2200 during use. The battery subsystem 2206 is also generally responsible for recharging the one or more power supply modules 2208.

Each power supply module 2208 may represent an instance of the interconnect assembly 100, which can be coupled to each other or to other components of the electric vehicle 2200 using their terminal connectors 114a-114b. As shown here, if multiple power supply modules 2208 are present, one or more power supply modules 2208 may be coupled in series and/or one or more power supply modules 2208 may be coupled in parallel. The series and parallel couplings of the power supply modules 2208 can vary based on, among other things, the electrical voltage and electrical current that can be provided by each power supply module 2208 and the electrical voltage and electrical current needed by the electric vehicle 2200.

Although FIG. 22 illustrates one example of an electric vehicle 2200 containing one or more interconnect assemblies, various changes may be made to FIG. 22. For example, one or more interconnect assemblies 100 may be used in any other suitable vehicles. Also, one or more interconnect assemblies may be used to provide electrical power to any other suitable device or system.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An interconnect assembly configured to receive and retain a plurality of batteries, the interconnect assembly comprising:

a plurality of electrically coupled sub-assemblies, each comprising a retainer configured to receive portions of the plurality of batteries, a conductive interconnect layer carried by the retainer and comprising a conductive layer carried between first and second insulative layers, the conductive layer having a plurality of interconnects configured to couple to the plurality of the batteries, and a terminal bar configured to transport electrical currents to and from the conductive interconnect layer; and a hot plate electrical conductor electrically coupled to the plurality of sub-assemblies, the hot plate electrical conductor having an opening therein configured to cause a path of least electrical resistance through the plurality of sub-assemblies to pass through a middle portion of the hot plate electrical conductor.

2. The interconnect assembly of claim 1, wherein each conductive layer further comprises a plurality of series connectors, each configured to electrically couple the plurality of batteries; and wherein the plurality of interconnects extend from the plurality of series connectors to the plurality of batteries and electrically couple the plurality of series connectors to the plurality of batteries.

3. The interconnect assembly of claim 2, wherein each conductive layer further comprises a plurality of balancing conductors, each configured to transport electrical current between the plurality of series connectors.

4. The interconnect assembly of claim 2, wherein each of the plurality of series connectors is configured to one of electrically couple two batteries in two adjacent rows of batteries; and electrically couple the plurality of batteries in a plurality of rows of batteries each separated by an offset row of batteries.

5. The interconnect assembly of claim 1, wherein the conductive layer comprises a plurality of conductive structures, a first conductive structure thereof comprising a first interconnect from among the plurality of interconnects coupled to cathodes of the plurality of batteries, a second conductive structure of the plurality thereof comprising a second interconnect from among the plurality thereof coupled to anodes of the plurality of batteries, and a third conductive structure of the plurality thereof between the first and second conductive structures and comprising a third interconnect from among the plurality thereof coupled to cathodes of the plurality of batteries.

6. The interconnect assembly of claim 5, wherein the plurality of conductive structures are coupled to different sets of parallel-coupled ones of the plurality of batteries; and wherein the plurality of conductive structures are coupled in series with one another.

7. The interconnect assembly of claim 1, wherein each terminal bar comprises a terminal connector configured to electrically couple the interconnect assembly to a larger system; and wherein each terminal bar has a plurality of openings therein.

8. The interconnect assembly of claim 1, further comprising a coldplate between the plurality of sub-modules and having a plurality of recesses therein to receive additional portions of the plurality of batteries.

9. The interconnect assembly of claim 1, further comprising a sensor assembly including a ribbon cable carrying a thermistor and a plurality of voltage contact points, the thermistor configured to sense a temperature in the interconnect assembly; and the plurality of voltage contact points configured to be coupled to conductive tabs of each conductive interconnect layer and receive voltages at the conductive tabs.

10. The apparatus of claim 9, wherein each retainer comprises a curved projection configured to push the thermistor into a side of one of the plurality of batteries.

11. The apparatus of claim 1, wherein each retainer comprises a plurality of walled structures configured to contact the plurality of batteries; at least some of the plurality of walled structures comprising walls having contact pads extending inward from the walls and configured to contact the batteries.

12. The apparatus of claim 11, wherein the contact pads are arranged such that each wall of the plurality of walled structures has a single contact pad.

13. The interconnect assembly of claim 1, wherein each terminal bar has an opening therein configured to cause a path of least electrical resistance through the plurality of sub-assemblies to pass through a middle portion of the hot plate electrical conductor.

* * * * *